United States Patent
Lightfoot, Jr. et al.

(10) Patent No.: US 8,152,999 B2
(45) Date of Patent: Apr. 10, 2012

(54) MEMBRANE CASCADE-BASED SEPARATION

(75) Inventors: Edwin N. Lightfoot, Jr., Madison, WI (US); Michael C. Cockrem, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 1139 days.

(21) Appl. No.: 11/557,003

(22) Filed: Nov. 6, 2006

(65) Prior Publication Data

US 2008/0237110 A1 Oct. 2, 2008

Related U.S. Application Data

(63) Continuation-in-part of application No. 11/134,553, filed on May 20, 2005, now Pat. No. 7,141,171.

(60) Provisional application No. 60/573,506, filed on May 21, 2004, provisional application No. 60/660,698, filed on Mar. 11, 2005.

(51) Int. Cl.
- *A61M 1/16* (2006.01)
- *C02F 9/00* (2006.01)
- *B01D 61/00* (2006.01)

(52) U.S. Cl. .......... 210/195.2; 210/257.2; 210/651; 210/641; 210/652

(58) Field of Classification Search ............. 210/195.2, 210/650–654, 321.6, 321.75, 634, 257.2, 210/321.8, 321.89, 641; 426/271, 645
See application file for complete search history.

(56) References Cited

U.S. PATENT DOCUMENTS

| | | | | |
|---|---|---|---|---|
| 3,707,770 A | * | 1/1973 | Timmins et al. | 426/271 |
| 4,478,719 A | * | 10/1984 | Michele et al. | 210/641 |
| 4,728,430 A | * | 3/1988 | DiLeo et al. | 210/639 |
| 4,863,609 A | * | 9/1989 | Schnabel et al. | 210/641 |
| 5,112,489 A | * | 5/1992 | Hartmann | 210/637 |
| 5,306,427 A | * | 4/1994 | Xu | 210/640 |
| 5,338,457 A | * | 8/1994 | Capozzola et al. | 210/652 |
| 5,338,553 A | * | 8/1994 | Johnson et al. | 426/36 |
| 5,354,945 A | * | 10/1994 | Detering et al. | 523/310 |
| 5,447,635 A | * | 9/1995 | Viscardi et al. | 210/636 |
| 5,575,918 A | * | 11/1996 | Virnig et al. | 210/652 |
| 5,598,244 A | * | 1/1997 | Johansson | 396/495 |
| 5,685,990 A | * | 11/1997 | Saugmann et al. | 210/650 |
| 5,693,229 A | * | 12/1997 | Hartmann | 210/650 |
| 5,958,244 A | * | 9/1999 | Hartmann | 210/650 |
| 5,958,245 A | * | 9/1999 | Martin et al. | 210/652 |
| 6,245,304 B1 | * | 6/2001 | Jansen et al. | 422/198 |
| 6,383,380 B1 | * | 5/2002 | Kopf | 210/198.2 |
| 6,635,296 B1 | * | 10/2003 | Nissen et al. | 426/422 |
| 7,141,171 B2 | * | 11/2006 | Lightfoot, Jr. | 210/641 |
| 7,255,792 B2 | * | 8/2007 | Livington | 210/652 |

OTHER PUBLICATIONS

Raja Ghosh, "Novel cascade ultrafiltration membrane configuration for continuous, high resolution protein-protein fractionation: a simulation study", Journal of Membrane Science 2269 2003) 85-99.*

* cited by examiner

*Primary Examiner* — Ana Fortuna

(74) *Attorney, Agent, or Firm* — Quarles & Brady LLP

(57) ABSTRACT

The present invention provides counter flow cascade separation systems useful to separate solute/solute pairs present in a solvent. The separation systems include a series of interconnected stages with each stage comprising a diafilter preferentially permeable for one solute. Solute/solute pairs are preferentially separated by the diafilter into permeate and retentate flows. Stages are combined to form separation systems capable of operation approaching an ideal cascade.

15 Claims, 38 Drawing Sheets

Molar Fluxes: $N_i \propto c_i S_i v$ $$N_A / N_B = Y_A$$
$$= (c_A / c_B)(S_A / S_B)$$
$$= X_A \Phi_A$$
$$\Phi = S_A / S_B$$

Separation factor:

$$Y_n / X_n = \alpha$$

$$y_{n+1} = x_{n-1}$$

|  | Membrane with nominal 100 kDa Cut | | Membrane with nominal 30 kDa Cut | | Soluté Molecular Weight | Solute Concentration | | |
|---|---|---|---|---|---|---|---|---|
|  | Sieving Factor | Separation Factor | Sieving Factor | Separation Factor |  |  |  |  |
|  | $S\alpha$ or $S\beta$ | $\Phi = S\alpha / S\beta$ | $S\alpha$ or $S\beta$ | $\Phi = S\alpha / S\beta$ | gram/mol | gram / liter | mmol / liter | Mole Fraction |
| α-Lactalbumin | 0.67 |  | 0.23 |  | 14,000 | 1.500 | 0.1071 | 0.194 |
|  |  | 4.1875 |  | 20.90909 |  |  |  |  |
| β-Lactoglobulin | 0.16 |  | 0.011 |  | 18,000 | 8.000 | 0.4444 | 0.806 |
| Bovine Serum Albumin | 0.009 |  | 0 |  |  | 0.0000 | 0.0000 | 0.0000 |
| TOTAL |  |  |  |  |  | 9.5000 | 0.5516 | 1.0000 |

FIG. 10

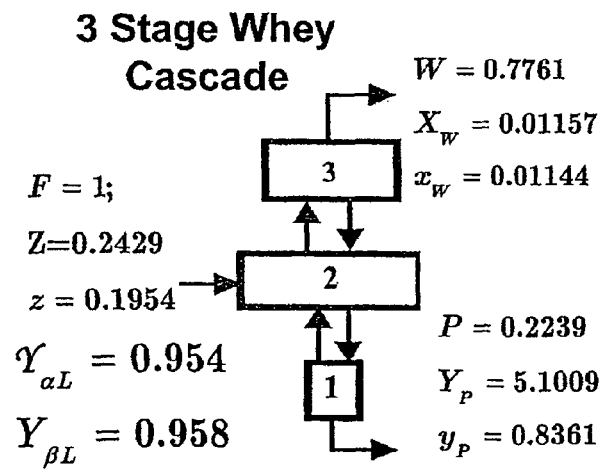

FIG. 11

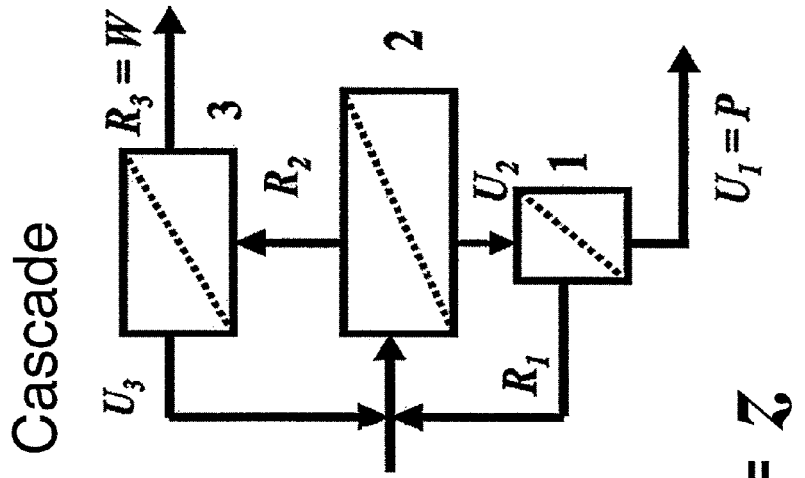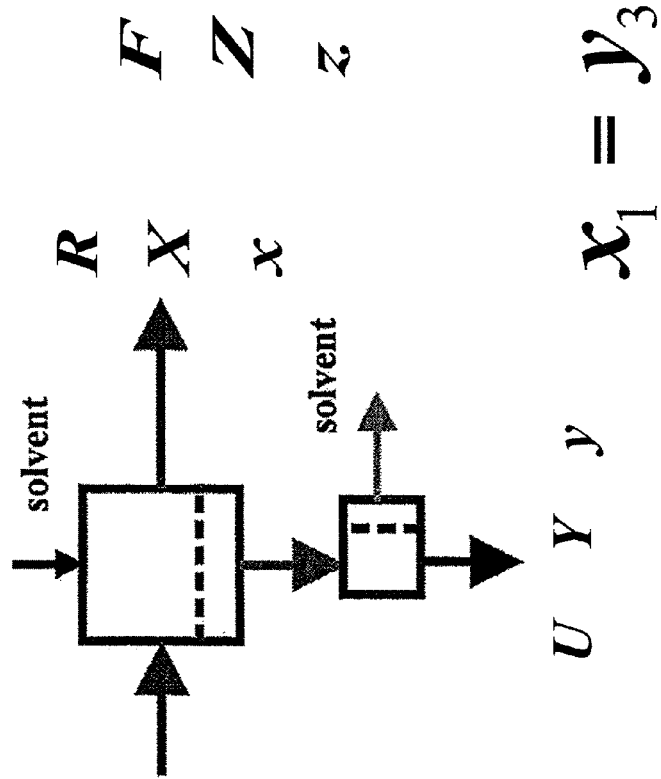
Fig. 16

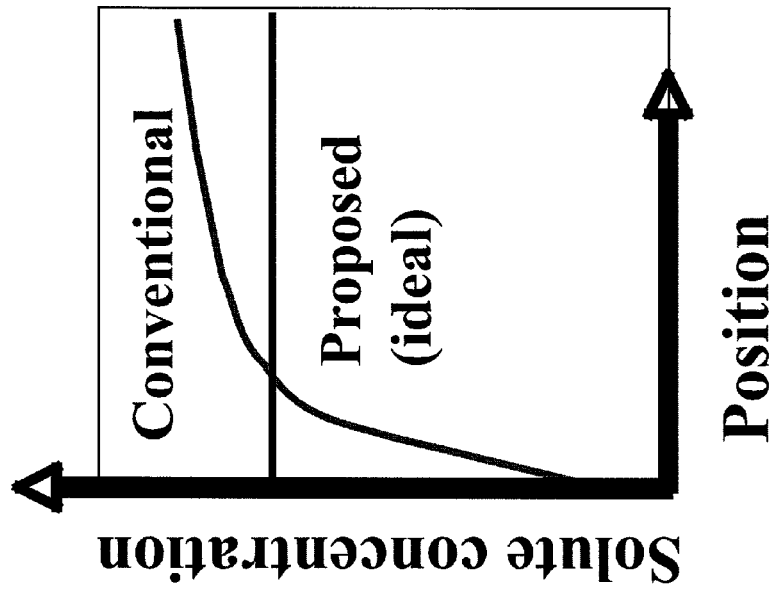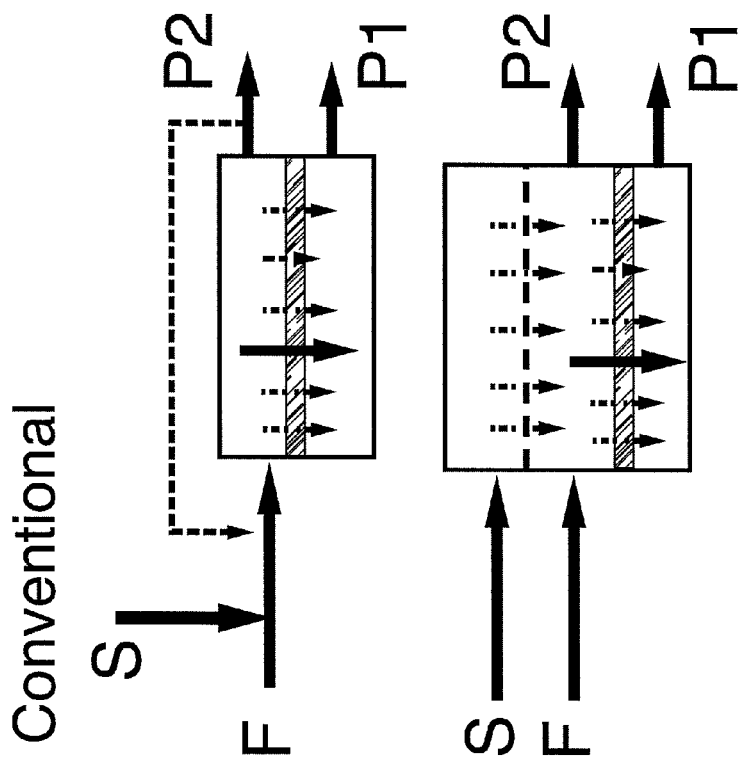
Fig. 18

[continuous solvent addition]

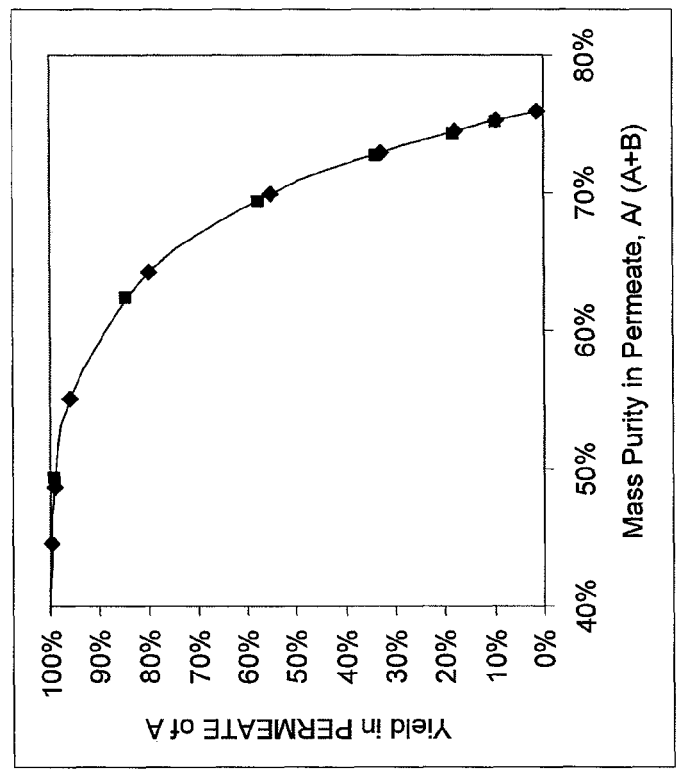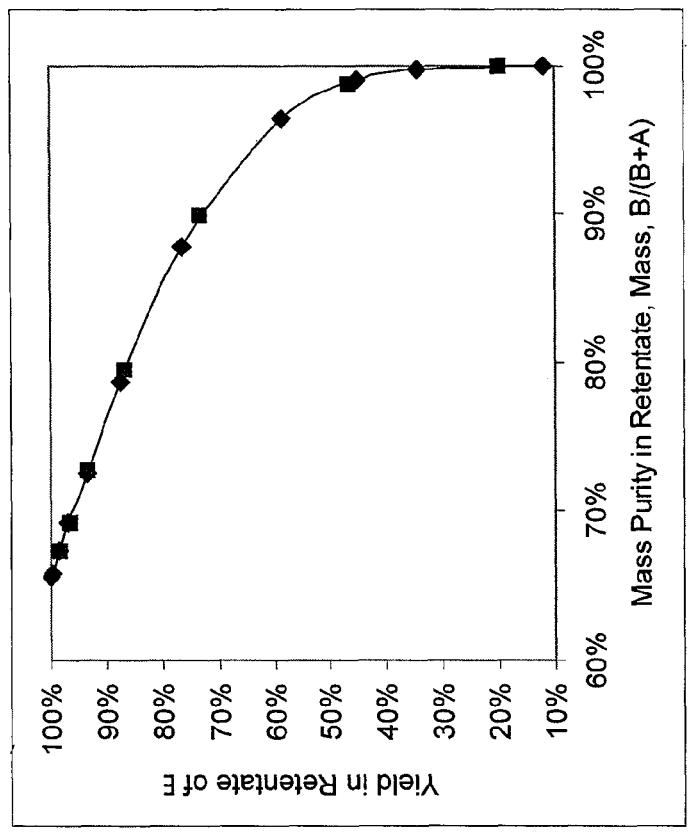
Fig. 36

MEMBRANE CASCADE-BASED SEPARATION

CROSS-REFERENCE TO RELATED APPLICATIONS

The present application is a continuation-in-part of U.S. patent application Ser. No. 11/134,553, filed May 20, 2005, now U.S. Pat. No. 7,141,171, which claimed the benefit of U.S. Provisional application 60/573,506, filed May 21, 2004 and U.S. Provisional application 60/660,698, filed Mar. 11, 2005, all of which are incorporated herein by reference in their entirety for all purposes.

FIELD OF THE INVENTION

This invention relates generally to membrane cascades for separating constituents of a fluid solution. The invention is more specifically directed to membrane-based modules and the use of same in countercurrent cascade systems to separate at least one solute from at least a second solute, with all such solutes generally being present in a solvent.

BACKGROUND OF THE INVENTION

Process chromatography in its many variant forms has become the dominant downstream processing tool for difficult separations in biotechnology, but it is inherently expensive and is not used to a significant extent for commercial scale separations in any other industry. In particular, process chromatography is not used significantly in food processing or petrochemical technology. Chromatography depends upon concentration diffusion between stationary and mobile phases, and, as commercial interest shifts toward larger substrates such as plasmids and viruses, diffusion tends to become slower and to make separations increasingly difficult.

At the same time, many other potentially competitive techniques have been developing, and engineers have finally begun to show real initiative for process development in a variety of biological applications. Lightfoot, E. N., and J. S. Moscariello, 2004, Bioseparations, *Biotech. and Bioeng.* 87: 259-273. Increasingly efficient renaturation of proteins from inclusion bodies shows promise of replacing the capture steps now performed by batch adsorption chromatography in a variety of applications, and crystallization appears to be increasing in importance for finer separations. Simulated moving beds are receiving increased attention.

Membrane filtrations are already providing increased competition to chromatography for the polishing stages of downstream processing, and they are becoming more and more selective, even for such large molecules as proteins. Cheang, B., and A. L. Zydney, 2004, A two-stage ultrafiltration process for fractionation of whey protein isolate, *J. Mem. Sci.* 231: 159-167. Several investigators report the use of simple two-stage cascades, but these cascades do not incorporate counterflow principles.

There is also increasing interest in continuous downstream processing for which chromatography is ill suited. Use of simulated moving beds, the only continuous process currently available, is both cumbersome and poorly suited to feedback control. To date, these devices have been limited to very clean stable systems, for example in the resolution of enantiomers from highly purified racemic mixtures. Finally, there is increasing interest in larger entities such as nucleic acids and viruses, and these have such low diffusivities that the choice of suitable adsorbents is severely limited. Pressure induced flow across selective membranes however can increase transport rates by convection relative to those for diffusion alone. Bird, R. B., W. E. Stewart, and E. N. Lightfoot. 2002, "Transport Phenomena", Wiley.

A new look at downstream processing is warranted, and membrane cascades may provide new and important methods for separating components from mixtures. Membrane selectivities are rapidly increasing, and there is now a wealth of practical operating experience available for purposes of preliminary design. Moreover, membranes are available for dealing with an extremely wide range of molecular weights, from small monomeric molecules to mammalian cells. Moreover, the technology of dealing with membrane cascades was very highly developed during the 1940s in connection with the effusion process for uranium isotope fractionation. Von Halle, E, and J. Schachter, 1998, "Diffusion Separation Methods", in Kirk-Othmer Encyclopedia of Chemical Technology, 4th Ed., J. Kroschwitz, Ed., Wiley. Even very simple cascades have not been widely used in biotechnology, however, in large part because of control problems and lack of operating experience. Membrane cascades thus present a promising field for research and development. A logical starting point for investigation will be the ideal cascade theory of isotope separations. As described below, isotope separations have much in common with potential biological applications.

It is desirable to start with simple prototype systems and then move by degrees to more complex systems in more promising situations. Fortunately, there are some simple applications where useful results can be obtained rather simply. One can then gain experience and at the same time produce economic processes. There are guides in the literature to aid in this stepwise approach. There are several examples of essentially binary protein solutions (e.g., Cheang and Zydney, *J. Mem. Sci.* 231 (2004)). Another logical starting point would be the tryptophan resolution of Romero and Zydney as the components are inexpensive and stable, and assays are unusually simple. Moreover, one needs only an ultrafiltration membrane under situations where sensitivity to minor changes in behavior is probably insignificant-one can concentrate here on solvent problems and development of a reliable control strategy. One can then proceed to other well-documented and simple separations such as removal of dimers from monomeric bovine serum albumin (BSA). After that, one can begin in earnest on systems where a more complex cascade is particularly desired.

Many cascade separation systems have been proposed, but none apparently incorporating the ideal cascade approach where design strategy is divided into: (i) separation of the solutes of interest using a solvent-free description; and (ii) solvent management.

SUMMARY OF THE INVENTION

The present invention is directed to counter flow cascade separation systems for separating a solute/solute pair in a solvent. A counter flow cascade separation system according to the invention comprises a series of interconnected stages in which each stage includes a diafilter that accepts a flow stream containing a solute/solute pair in a solvent. The diafilter is preferentially permeable for a first solute of the solute/solute pair and the diafilter preferentially passes the first solute to a permeate flow while preferentially retaining the remaining solute in a retentate flow. The stage further includes an ultrafilter that accepts from the diafilter the permeate flow wherein the ultrafilter is selectively permeable to the solvent but not the remaining solute contained in the permeate flow. Stages of the system are interconnected so that each stage beyond an first stage accepts an intermixed flow stream formed by combining retentate flow and permeate flow from different stages wherein intermixed retentate flow and permeate flow each have the solute/solute pair present in substantially the same molar ratio. The solute/solute pair is thusly separated by counter flow cascade through the interconnected series of stages.

In preferred embodiments, the system consists of three interconnected stages. Preferred systems according to the invention recycle solvent collected by ultrafilters and route that solvent back to a flow stream. In certain embodiments, a system according to the invention includes at least one stage that further comprises a macroporous membrane capable of distributing solvent evenly over the diafilter.

In another embodiment, the invention provides a method for separating a solute/solute pair in a solvent. Such a method includes steps of routing a flow stream containing a solute/solute pair in a solvent to a diafilter that is preferentially permeable for a first solute of the solute/solute pair. The diafilter preferentially passes the first solute to a permeate flow while preferentially retaining the remaining solute in a retentate flow. The permeate flow is then routed to an ultrafilter that is selectively permeable to the solvent but not the remaining solute contained in the permeate flow in order that excess solvent contained in solvent is removed from the permeate flow.

The permeate flow and retentate flow are routed to successive interconnected stages wherein the stages beyond a first stage accept an intermixed flow stream formed by combining retentate flow and permeate flow from different stages. The intermixed retentate flow and permeate flow each have the solute/solute pair present in substantially the same molar ratio and operation of the system approaches an ideal cascade.

The invention is further directed to a stage in a counter flow cascade separation system for use in separating a solute/solute pair in a solvent. Such a stage includes a diafilter that accepts a flow stream containing a solute/solute pair in a solvent. The diafilter is preferentially permeable for a first solute of the solute/solute pair wherein the diafilter preferentially passes the first solute to a permeate flow while preferentially retaining the remaining solute in a retentate flow. The stage further includes an ultrafilter that accepts from the diafilter the permeate flow wherein the ultrafilter is selectively permeable to the solvent but not the remaining solute contained in the permeate flow. The stage is capable of separating the solute/solute pair into the permeate flow and retentate flow and the ultrafilter removes excess solvent from the permeate flow.

In yet other embodiments, the invention is directed to multistage cascade separation systems for separating a first solute species from a second solute species in a solvent that comprise a series of interconnected stages in which each stage includes: (a) a feed for accepting a flow stream containing first solute species and second solute species in a solvent; (b) a selectively permeable membrane in communication with the feed, the selectively permeable membrane capable of preferentially rejecting the first solute species relative to the second solute species, wherein said second species is preferentially conveyed in a permeate flow to a different interconnected stage and the first solute species is preferentially conveyed in a retentate flow to yet a different interconnected stage; wherein said stages are interconnected so that each stage beyond a first stage accepts an intermixed flow stream formed by combining retentate flow and permeate flow from different stages, the intermixed flow stream containing the first and second solute species in substantially the same mass ratio of first species to second species and said species exit the system at different terminal stages.

As well, the invention encompasses a multistage cascade separation system using at each stage a membrane-containing separation step that preferentially rejects at least a first species relative to at least a second species while substantially permeating at least a third species which acts as a solvent. Such a system comprises: (a) at least two stages, wherein each stage includes a selectively permeable membrane; and (b) at least one recycle stream from one stage to another stage. All flow streams that contain the first and second species that are fed to any individual stage, whether they are a recycled permeate flow stream from another stage or a recycled retentate flow stream from another stage or fresh feed flow stream, have substantially the same mass ratio of the first species to the second species within that individual flow stream.

In certain embodiments, each stage's selectively permeable membrane is independently selected from the group consisting of an ultrafiltration membrane, microfiltration membrane, reverse osmosis membrane, and nanofiltration membrane. Selectively permeable membrane construction may be, but is limited to, polymeric, ceramic, or metal construction.

In other embodiments, at least one of the stages comprises a selectively permeable membrane that is an ultrafiltration or nanofiltration membrane and the system is operated such that the first species, second species, and solvent are in vapor phase, and wherein the vapor phase is partially or fully condensed, the resulting condensate routed to another stage in the cascade.

The system may also include at least one of the stages which contains a solvent recovery unit in addition to the selectively permeable membrane, wherein the selectively permeable membrane preferentially rejects at least the first species relative to the second species while substantially permeating solvent and the solvent recovery unit separates at least a portion of the solvent from both of said species. Preferred solvent recovery units comprise a membrane or an evaporator.

Some embodiments include stages configured for solvent addition. The solvent may be provided in a recycle stream generated by filtration or evaporation of one or more permeate streams.

In certain preferred embodiments, the cascade contains two stages, the first stage receiving a flowstream that is an intermixed feed stream and retentate recycle stream from a second stage, the first stage generating a permeate flow and retentate flow that is directed to the second stage, the second stage generating said retentate recycle stream and a permeate flow that is a cascade system product stream.

In other preferred embodiments, the cascade contains two stages, the first stage receiving a retentate stream from a second stage, the first stage generating a permeate recycle stream and a retentate flow that is a cascade system product stream, and a second stage that receives a feed stream and a permeate recycle stream from said first stage and generates a retentate recycle stream and a permeate flow that is a cascade system product stream.

The system is not limited to two stages and may, in alternative embodiments, include three, four, five or more interconnected stages.

Certain embodiments are configured such that, in any given stage, the selectively permeable membrane is operated in substantially unidirectional single pass flow operation. Solvent may, optionally, be added incrementally to any given stage during the substantially unidirectional single pass flow operation.

Certain embodiments are configured such that, in any given stage, the selectively permeable membrane is operated in substantially recycle flow (CSTR) operation.

The invention further encompasses systems and methods where an additional species is added to the multi-component mixture, the additional species being rejected by all of the selectively permeable membranes in the system such that the additional species acts to retard the permeation of first or second species. The additional species may be a colloidal particle, nanoparticle, or microparticle that preferentially interacts with either the first species or the second species. The additional species may be in the form of a liquid micelle.

As can be appreciated, the invention extends to the use of all described and claimed systems and devices, and includes a process of separating a first solute from a second solute that includes the step of directing a multicomponent mixture containing a first solute and second solute to a multistage cascade separation system that performs at each stage a membrane-containing separation step that preferentially rejects at least the first species relative to at least the second species while substantially permeating at least a third species which acts as a solvent. A preferred system for use in the process has: (a) at least two stages, wherein each stage includes a selectively permeable membrane; and (b) at least one recycle stream from one stage to another stage. All flow streams that contain the first and second species that are fed to any individual stage, whether they are a recycled permeate flow stream from another stage or a recycled retentate flow stream from another stage or fresh feed flow stream, have substantially the same mass ratio of the first species to the second species within that individual flow stream. Use of the system thereby facilitates separation of first solute from second solute.

In another aspect, the present invention provides a module designed for batch cascade operation, comprising: a diafilter fed from a stirred reservoir, the retentate stream generated by the diafilter being continuously returned to the stirred reservoir, and stirred reservoir volume is maintained approximately constant by addition of solvent from an exterior source wherein the total retentate stream provided by the module is the solution remaining in the stirred reservoir at the end of the operation, and the total permeate is the volume of permeate produced by the operation.

In certain embodiments, the solvent added to the reservoir is at least partially obtained by solvent removal from the permeate stream leaving the diafilter. The module may be optionally configured so that solvent is continually added to the retentate stream within the diafilter and total volumetric flow rate of retentate remains approximately constant throughout the diafilter. The diafilter may include two or more individual diafilters in series with solvent added to the emerging retentate stream of each to restore the volumetric feed rate to the next diafilter to approximately that fed to the first.

In yet another aspect, the invention is directed to a separation system for separating a multicomponent mixture, the system comprising at least two stages, each said stage including a selectively permeable membrane that preferentially rejects a first species relative to a second species while substantially permeating a solvent, wherein said stages are interconnected such that each stage receives a feed stream that has substantially the same mass ratio of the first species to the second species.

Another aspect of the invention encompasses an a multistage cascade separation system having at each stage an electrodiffusion device separation step that preferentially transports at least a first species relative to at least a second species. Such a system includes: (a) at least two stages, wherein each stage includes an electrodiffusion device; and (b) at least one recycle stream from one stage to another stage. All flow streams that contain the first and second species that are fed to any individual stage, whether they are a recycled permeate flow stream from another stage or a recycled retentate flow stream from another stage or fresh feed flow stream, have substantially the same mass ratio of the first species to the second species within that individual flow stream. Each of the electrodiafiltration device comprises: (i) a feed; (ii) a retentate compartment; (iii) a permeate compartment; (iv) a selectively permeable membrane positioned between said retentate compartment and permeate compartments; and (v) a retentate/permeate channel pair positioned opposite the selectively permeable membrane. The retentate/permeate channel pair is capable of generating an electric field perpendicular to a flow direction of a filtrate flow directed through the selectively permeable membrane and the retentate/permeate channel pair selectively reinforces or hinders convection induced solute migration through the selectively permeable membrane.

In certain devices according to the invention, a plurality of retentate/permeate channel pairs are provided in a stack in which said retentate/permeate channel pairs are separated by interspaced selectively permeable membranes that are electrically conductive so that electric current flows across each retentate/permeate channel pair perpendicular to the flow direction of the filtrate flow directed through each said selectively permeable membrane. In preferred embodiments, the stack is in the form of spiral produced by rolling a single stack, the electric current provided radial across the stack during operation of the device.

Other objects, features and advantages of the present invention will become apparent after review of the specification, claims and drawings.

BRIEF DESCRIPTION OF THE DRAWINGS

FIG. 10 depicts in tabular form values related to the fractionation of alpha-lactalbumin and beta-lactoglobulin, as derived in the example section.

FIG. 11 illustrates a three stage cascade and factors for the separation of alpha-lactalbumin from beta-lactoglobulin, for example both present in cheese whey, based on the values listed in FIG. 10

FIG. 16 illustrates a basic module and cascade operation.

FIG. 18 illustrates solvent distribution in convention versus ideal systems.

FIG. 36 provides data related to yield/purity tradeoff in an exemplary diafiltration operation.

DETAILED DESCRIPTION OF THE INVENTION

In the invention disclosed herein, membranes are combined to carry out dialfiltration (DF) and ultrafiltration (UF) operations in such manner to approach and/or achieve an ideal cascade. The reasons for using membranes are their rapidly increasing selectivity and productivity, as well as their insensitivity to diffusion. Various membranes known in the art may be utilized to carry out the present invention but will meet the following general design parameters. Diafilters useful in the present invention are selectively permeable to one solute of a selected solute/solute pair. Ultrafilters useful in the present invention are permeable to solvent but not to either solute of the selected solute/solute pair. The cascade method presented here is based on ideal counterflow. The major considerations are resolution and solvent conservation. The fundamental operation of diafiltration and ultrafiltration does not appear to have previously been recognized. A major advantage of the DF-UF combination is that it facilitates the separate design of the solute-solute separation and solvent management. It thus reduces the number of possibilities that must be considered.

Figure 1A:
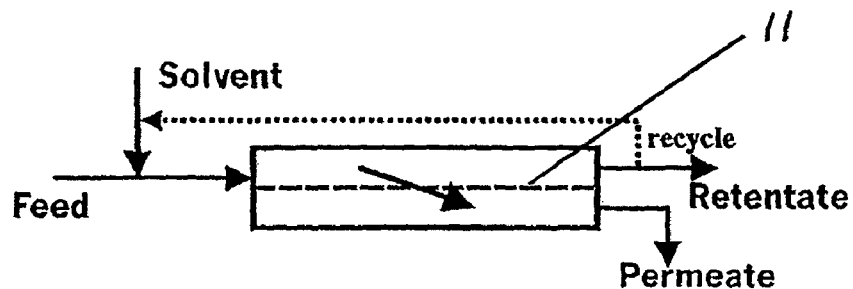
FIG. 1(A) depicts a conventional membrane separation of a feed stream into retentate and permeate streams using a single membrane 11 with the optional routing of solvent back to a feed stream. In contrast.
Figure 1B:
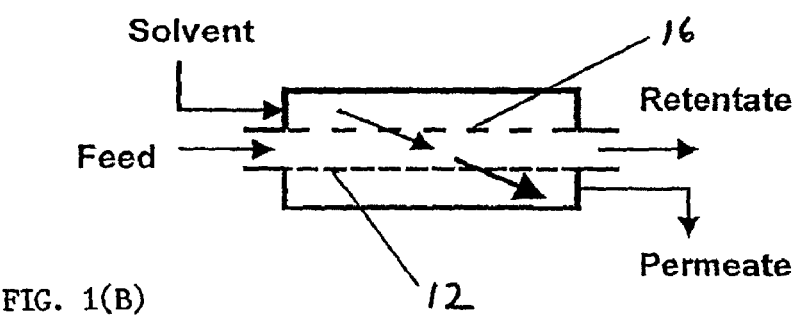
FIG. 1(B) illustrates a membrane-based separation according to the present invention utilizing an additional macroporous membrane to distribute solvent over a volume of a retentate-containing compartment and underlying diafilter.
Figure 2:
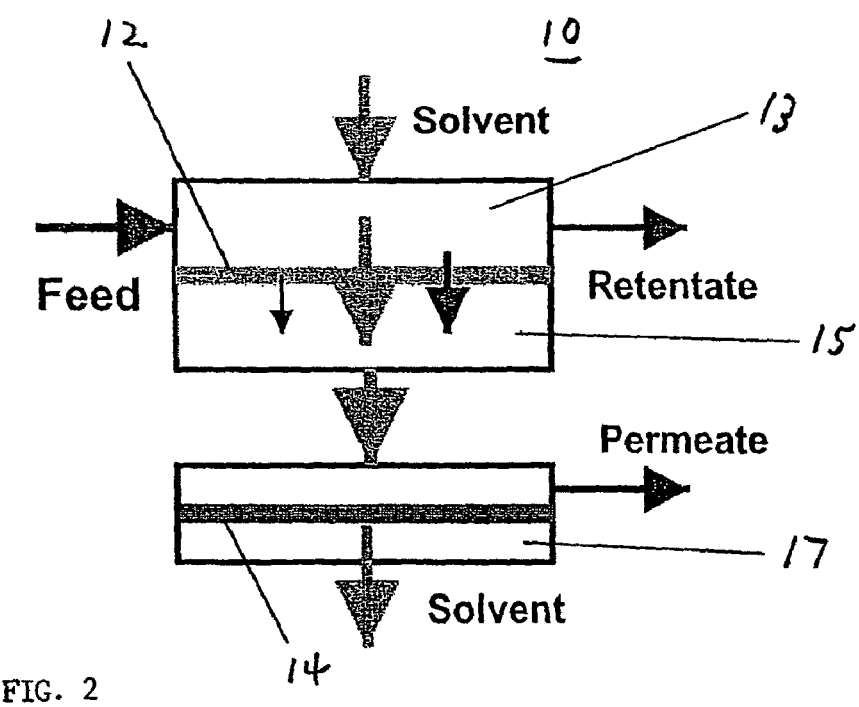
FIG. 2 illustrates the fundamental operation of stage 10 according to the invention that includes a diafilter 12 and ultrafilter 14 combination.

The design strategy used by the inventor in arriving at the present invention consisted of: (i) recognizing the dual solvent role, as both a convective transporter and as a separating agent; (ii) splitting the problem and the solution into two parts—specifically into fractionation of solutes and solvent management. More specifically, the inventor has discovered a novel membrane-based separation cascade system wherein the solvent is used as both a convective transporter and as a separating agent. This cascade-based system can be used for separating two solutes as a solute/solute pair (solute 1 and 2; retentate and permeate; waste and permeate) from a feed stream. FIG. 1(A) depicts a conventional membrane separation of a feed stream into retentate and permeate streams using a single membrane 11 with the optional routing of solvent back to a feed stream. In contrast, FIG. 1(B) illustrates a membrane-based separation according to the present invention utilizing multiple membranes to generate retentate and permeate streams. The solutes are initially contained in the feed stream, and the solvent can be added either to the entering feed stream or, as shown in FIG. 1(B), spatially distributed over a retentate-containing compartment. FIG. 2 illustrates the fundamental operation of stage 10 according to the invention that includes a diafilter 12 and ultrafilter 14 combination.

In a first filtration step shown in FIG. 2, a diafiltration membrane 12 is capable of separating the feed stream into permeate and retentate (waste). The retentate remains in the feed stream-containing compartment 13 and can be recovered. The permeate and the solvent pass into the permeate-containing compartment 15 and are subject to second filtration step.

Figure 3:
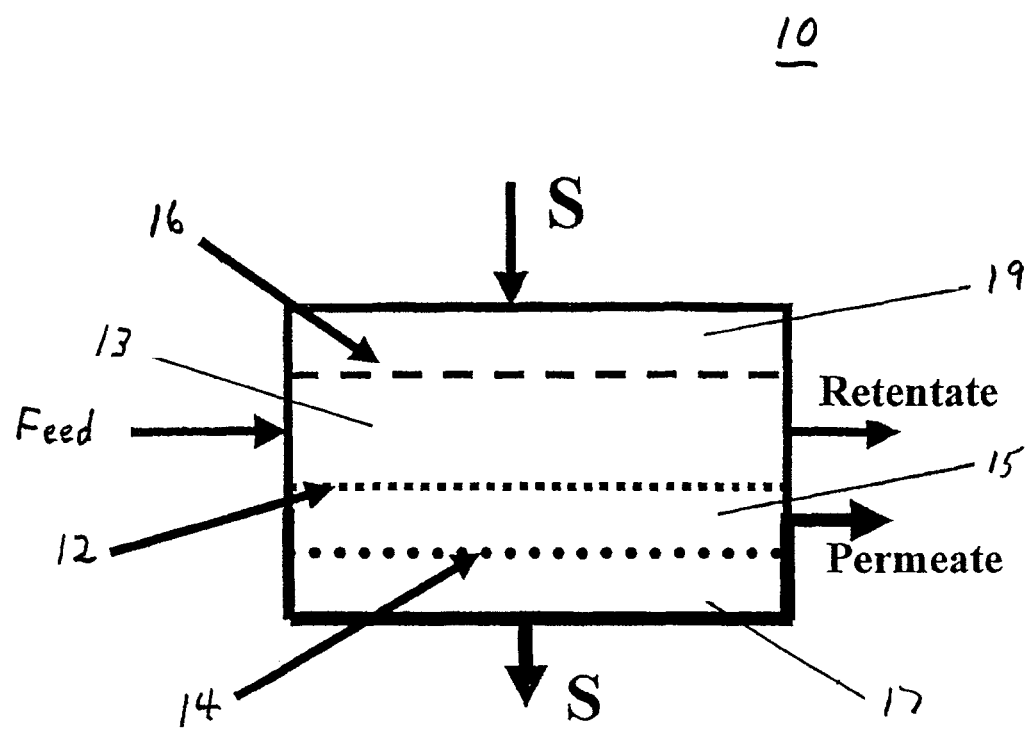
FIG. 3 shows an embodiment of a stage 10 according the invention which includes diafilter 12, ultrafilter 14 and optional macroporous membrane 16 in a single housing.
Figure 4:
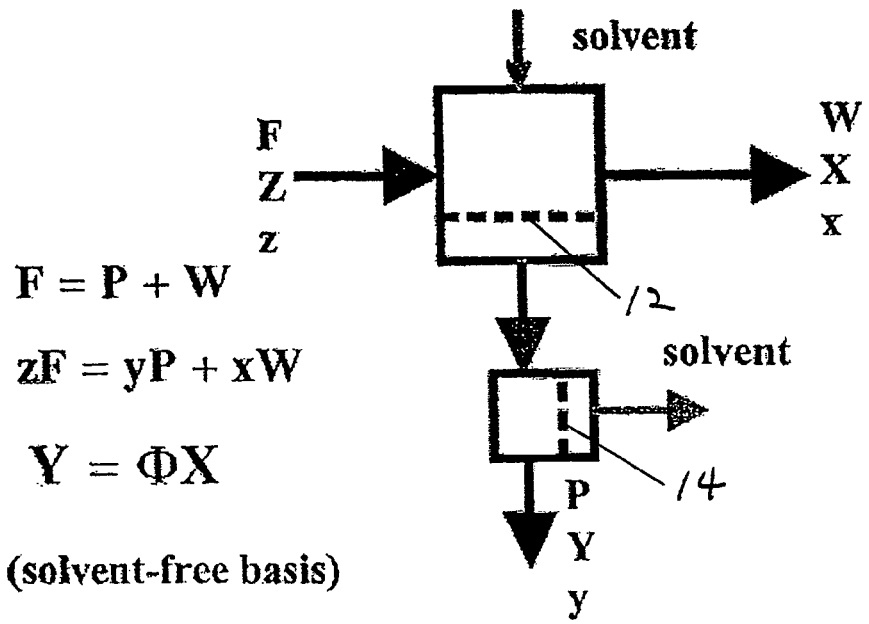
FIG. 4 depicts a diafilter 12/ultrafilter 14 combination according to the invention and related mathematical relationship of feed (F), moles of product (P) and waste (W) based on a solvent-free system.

Still referring to FIG. 2, an ultrafiltration membrane 14 is positioned between the permeate-containing compartment 15 and a second solvent-containing compartment 17. The purpose of ultrafiltration membrane 14 is to remove excess solvent from the permeate, and it should be essentially impermeable to either of the solutes to be separated from one another. As a result of this filtration step, the permeate becomes separated from the solvent. Ultrafilter 14 may be contained with diafilter 12 in the same housing, as shown in FIG. 3, or, alternatively, ultrafilter 14 may provided in a separate housing from diafilter 12, as FIG. 4 depicts.

Figure 5:
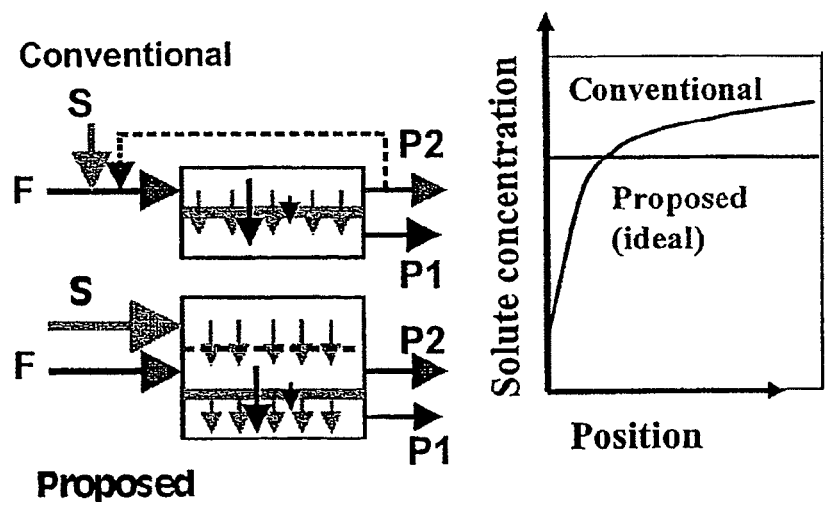
FIG. 5 illustrates solute concentration dynamics for conventional separation versus separation based on the invention.

Configurations according to the invention lessen the amount of solvent consumed for a given amount of solute transported across the membrane and decreases the ranges of upstream solute concentrations. This is because all solvent consumed by diafiltration must be supplied at the inlet, using the conventional design, rather than introduced locally for solute transport, as in the proposed new design. Since the ratio of water to solute transport increases with dilution, there is an excess of solvent initially, and perhaps too little toward the exit of conventional equipment. FIG. 5 illustrates solvent flow differences between conventional and the presently-disclosed system. In addition, FIG. 5 compares solute concentration along a membrane for conventional and the present system.

Solvents are typically highly purified sterile water blended with pH buffers and represent a major cost of diafiltration. Decreasing solvent use thus directly reduces the cost of the diafiltration process. In addition removal of excess solvent either increases required membrane area, raising capital costs directly, or requires higher trans-membrane pressures, raising operating costs. Finally, excess solvent must be removed from the filtrate, typically by ultrafiltration, and this represents an additional cost. In general some upstream compositions are more desirable than others, and it is desirable to depart as little as possible from these optimum levels.

Uniform conditions within a diafiltration stage can also be approached by rapid recirculation through a conventional apparatus, as shown by the dotted line in FIG. 1A, but this requires repeated pumping and can damage sensitive materials such as proteins.

Figure 6:
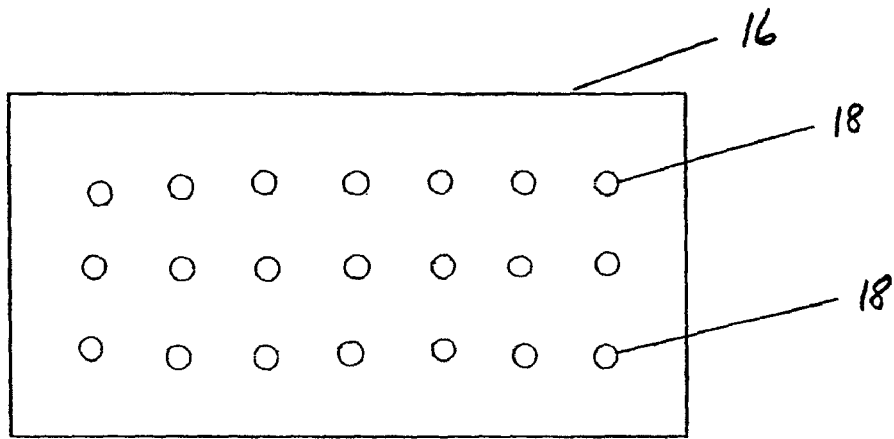
FIG. 6 shows a macroporous membrane 16 with equally spaced apertures 18 useful in certain embodiments of the invention.

In certain embodiments, a macroporous membrane 16 is included upstream of the described diafiltration membrane 12, as shown in FIG. 3. Macroporous membrane 16 is positioned between a first solvent-containing compartment 19 and the feed stream-containing compartment 13. Macroporous membrane 16 is capable of selectively-passing the solvent from the solvent-containing compartment 19 to the feed stream-containing compartment 13. The purpose of macroporous membrane 16 is to control the spatial distribution of solvent into the feed stream-containing compartment 13. The macroporous membrane 16 should not permit entrance of feed solution from the permeate compartment. This latter constraint can be met by ensuring that pressure at all points in the upper compartment is always greater than in the adjacent feed stream. It can for example be assured by using a positive displacement solvent pump and designing the system so that pressure drop across the upper surface is greater than the pressure drop in the feed stream. An exemplary macroporous membrane 16 with a plurality of apertures 18 is shown in FIG. 6. Macroporous membranes may be fabricated from a sintered granular plate, a tight screen, or other materials. One of ordinary skill in the art will know to vary the number as well as the size of perforations without departing from the spirit of the invention. Important for practicing the invention is that the distances in the lateral and flow directions between perforations should be small compared to the corresponding dimensions of the stage.

Figure 9A:
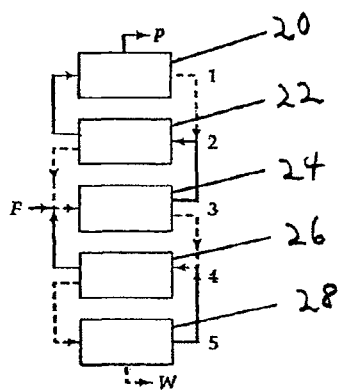
FIG. 9(A) depicts the general linear counterflow of a cascade separation according to the present invention. Stages 20, 22, 24, 26 and 28, shown in box form, each comprise diafilter and ultrafilter.

An ideal counterflow cascade is illustrated in the flow diagram depicted in FIG. 9A in which the DF/UF units 20, 22, 24, 26 and 28 are shown as blocks. The flow diagram depicted is based on solvent free streams. In a fashion analogous to other linear counterflow cascades the permeate from each stage enters the retentate compartment of the next above stage while the retentate flow enters the retentate compartment of that immediately below. Thus, two streams enter each stage except those at the two ends of the cascade and three to the feed stage. The cascade is termed "ideal" if the solvent free compositions of the two entering streams are identical. This situation and its physical significance on separation are illustrated by the graph in FIG. 9(B).

Figure 9B:
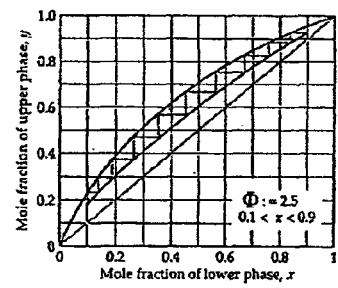
FIG. 9(B) shows a graphical representation of the ideal solute separation achieved by the counterflow cascade of FIG. 9(A).

Accordingly, the present invention is directed to counter flow cascade separation systems for separating a solute/solute pair in a solvent. A counter flow cascade separation system according to the invention comprises a series of interconnected stages in which each stage includes a diafilter that accepts a flow stream containing a solute/solute pair in a solvent. The diafilter is preferentially permeable for a first solute of the solute/solute pair and the diafilter preferentially passes the first solute to a permeate flow while preferentially retaining the remaining solute in a retentate flow. The stage further includes an ultrafilter that accepts from the diafilter the permeate flow wherein the ultrafilter is selectively permeable to the solvent but not the remaining solute contained in the permeate flow. Stages of the system are interconnected so that each stage beyond an first stage accepts an intermixed flow stream formed by combining retentate flow and permeate flow from different stages wherein intermixed retentate flow and permeate flow each have the solute/solute pair present in substantially the same molar ratio. The solute/solute pair is thusly separated by counter flow cascade through the interconnected series of stages. FIG. 9(A) provides a flow diagram illustrating the above-described system and, in addition, FIG. 9(B) illustrates the results of the present system on stage-to-stage solute concentration.

In preferred embodiments, the system consists of three interconnected stages. Preferred systems according to the invention recycle solvent collected by ultrafilters and route that solvent back to a flow stream. In certain embodiments, a system according to the invention includes at least one stage that further comprises a macroporous membrane capable of distributing solvent evenly over the diafilter.

In another embodiment, the invention provides a method for separating a solute/solute pair in a solvent. Such a method includes steps of routing a flow stream containing a solute/solute pair in a solvent to a diafilter that is preferentially permeable for a first solute of the solute/solute pair. The diafilter preferentially passes the first solute to a permeate flow while preferentially retaining the remaining solute in a retentate flow. The permeate flow is then routed to an ultrafilter that is selectively permeable to the solvent but not the remaining solute contained in the permeate flow in order that excess solvent contained in solvent is removed from the permeate flow.

The permeate flow and retentate flow are routed to successive interconnected stages wherein the stages beyond a first stage accept an intermixed flow stream formed by combining retentate flow and permeate flow from different stages. The intermixed retentate flow and permeate flow each have the solute/solute pair present in substantially the same molar ratio and operation of the system approaches an ideal cascade.

The invention is further directed to a stage in a counter flow cascade separation system for use in separating a solute/solute pair in a solvent. Such a stage includes a diafilter that accepts a flow stream containing a solute/solute pair in a solvent. The diafilter is preferentially permeable for a first solute of the solute/solute pair wherein the diafilter preferentially passes the first solute to a permeate flow while preferentially retaining the remaining solute in a retentate flow. The stage further includes an ultrafilter that accepts from the diafilter the permeate flow wherein the ultrafilter is selectively permeable to the solvent but not the remaining solute contained in the permeate flow. The stage is capable of separating the solute/solute pair into the permeate flow and retentate flow and the ultrafilter removes excess solvent from the permeate flow.

In a following example, the inventor first explains how binary stages (also termed "splitters") can be modified to deal with protein mixtures in a solvent. The inventors then show how binary stages can be connected to form ideal cascades, most likely the most economical configuration for practicing the present invention. The inventor shows by numerical example how a cascade separation according to the present invention is performed.

In yet other embodiments, the invention is directed to multistage cascade separation systems for separating a first solute species from a second solute species in a solvent that comprise a series of interconnected stages in which each stage includes: (a) a feed for accepting a flow stream containing first solute species and second solute species in a solvent; (b) a selectively permeable membrane in communication with the feed, the selectively permeable membrane capable of preferentially rejecting the first solute species relative to the second solute species, wherein said second species is preferentially conveyed in a permeate flow to a different interconnected stage and the first solute species is preferentially conveyed in a retentate flow to yet a different interconnected stage; wherein said stages are interconnected so that each stage beyond a first stage accepts an intermixed flow stream formed by combining retentate flow and permeate flow from different stages, the intermixed flow stream containing the first and second solute species in substantially the same mass ratio of first species to second species and said species exit the system at different terminal stages.

As well, the invention encompasses a multistage cascade separation system using at each stage a membrane-containing separation step that preferentially rejects at least a first species relative to at least a second species while substantially permeating at least a third species which acts as a solvent. Such a system comprises: (a) at least two stages, wherein each stage includes a selectively permeable membrane; and (b) at least one recycle stream from one stage to another stage. All flow streams that contain the first and second species that are fed to any individual stage, whether they are a recycled permeate flow stream from another stage or a recycled retentate flow stream from another stage or fresh feed flow stream, have substantially the same mass ratio of the first species to the second species within that individual flow stream.

In certain embodiments, each stage's selectively permeable membrane is independently selected from the group consisting of an ultrafiltration membrane, microfiltration membrane, reverse osmosis membrane, and nanofiltration membrane. Selectively permeable membrane construction may be, but is limited to, polymeric, ceramic, or metal construction.

In other embodiments, at least one of the stages comprises a selectively permeable membrane that is an ultrafiltration or nanofiltration membrane and the system is operated such that the first species, second species, and solvent are in vapor phase, and wherein the vapor phase is partially or fully condensed, the resulting condensate routed to another stage in the cascade.

The system may also include at least one of the stages which contains a solvent recovery unit in addition to the selectively permeable membrane, wherein the selectively permeable membrane preferentially rejects at least the first species relative to the second species while substantially permeating solvent and the solvent recovery unit separates at least a portion of the solvent from both of said species. Preferred solvent recovery units comprise a membrane or an evaporator.

Some embodiments include stages configured for solvent addition. The solvent may be provided in a recycle stream generated by filtration or evaporation of one or more permeate streams.

In certain preferred embodiments, the cascade contains two stages, the first stage receiving a flowstream that is an intermixed feed stream and retentate recycle stream from a second stage, the first stage generating a permeate flow and retentate flow that is directed to the second stage, the second stage generating said retentate recycle stream and a permeate flow that is a cascade system product stream.

In other preferred embodiments, the cascade contains two stages, the first stage receiving a retentate stream from a second stage, the first stage generating a permeate recycle stream and a retentate flow that is a cascade system product stream, and a second stage that receives a feed stream and a permeate recycle stream from said first stage and generates a retentate recycle stream and a permeate flow that is a cascade system product stream.

The system is not limited to two stages and may, in alternative embodiments, include three, four, five or more interconnected stages.

Certain embodiments are configured such that, in any given stage, the selectively permeable membrane is operated in substantially unidirectional single pass flow operation. Solvent may, optionally, be added incrementally to any given stage during the substantially unidirectional single pass flow operation.

Certain embodiments are configured such that, in any given stage, the selectively permeable membrane is operated in substantially recycle flow (CSTR) operation.

The invention further encompasses systems and methods where an additional species is added to the multi-component mixture, the additional species being rejected by all of the selectively permeable membranes in the system such that the additional species acts to retard the permeation of first or second species. The additional species may be a colloidal particle, nanoparticle, or microparticle that preferentially interacts with either the first species or the second species. The additional species may be in the form of a liquid micelle.

In another aspect, the present invention provides a module designed for batch cascade operation, comprising: a diafilter fed from a stirred reservoir, the retentate stream generated by the diafilter being continuously returned to the stirred reservoir, and stirred reservoir volume is maintained approximately constant by addition of solvent from an exterior source wherein the total retentate stream provided by the module is the solution remaining in the stirred reservoir at the end of the operation, and the total permeate is the volume of permeate produced by the operation.

In certain embodiments, the solvent added to the reservoir is at least partially obtained by solvent removal from the permeate stream leaving the diafilter. The module may be optionally configured so that solvent is continually added to the retentate stream within the diafilter and total volumetric flow rate of retentate remains approximately constant throughout the diafilter. The diafilter may include two or more individual diafilters in series with solvent added to the emerging retentate stream of each to restore the volumetric feed rate to the next diafilter to approximately that fed to the first.

Additional solutes in addition to first and second solutes may be present and, in certain embodiments, those additional solutes may be preferentially rejected by one or more of the selectively permeable membranes. In contrast, additional solutes in addition to the second solute may be present that are preferentially permeated by one or more of the selectively permeable membranes.

In yet another aspect, the invention is directed to a separation system for separating a multicomponent mixture, the system comprising at least two stages, each said stage including a selectively permeable membrane that preferentially rejects a first species relative to a second species while substantially permeating a solvent, wherein said stages are interconnected such that each stage receives a feed stream that has substantially the same mass ratio of the first species to the second species.

Figure 40:
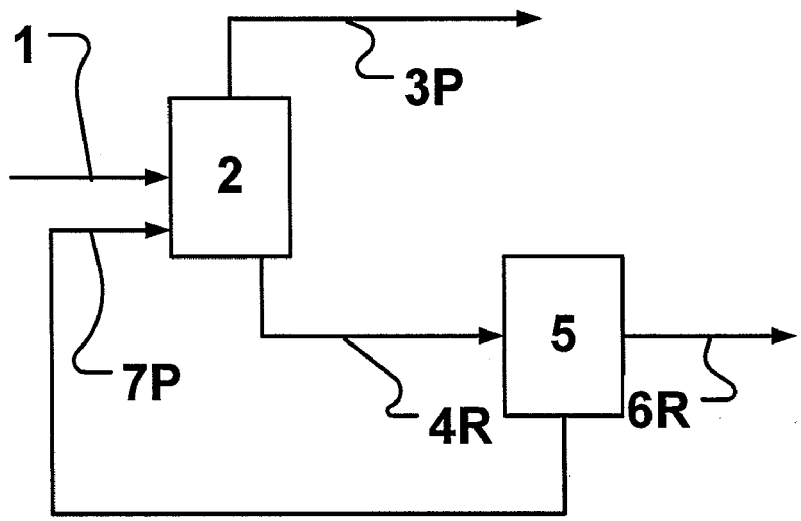
FIG. 40 illustrates a dual diafilter fractionation system having a permeate recycle feature.

Referring now to FIG. 40, a two stage cascade system is described that is characterized by a permeate recycle stream. This embodiment includes a feed stream 1 being directed to a first membrane-containing separation unit 2. An interstage flow stream 4R carries a retentate stream to a second membrane-containing separation unit 5. Interstage recycle stream 7P carries a permeate stream from unit 5 back to unit 2. Unit 2 generates a permeate product stream 3P and, as well, unit 5 generates a retentate stream that is a product stream 6R.

Figure 41:
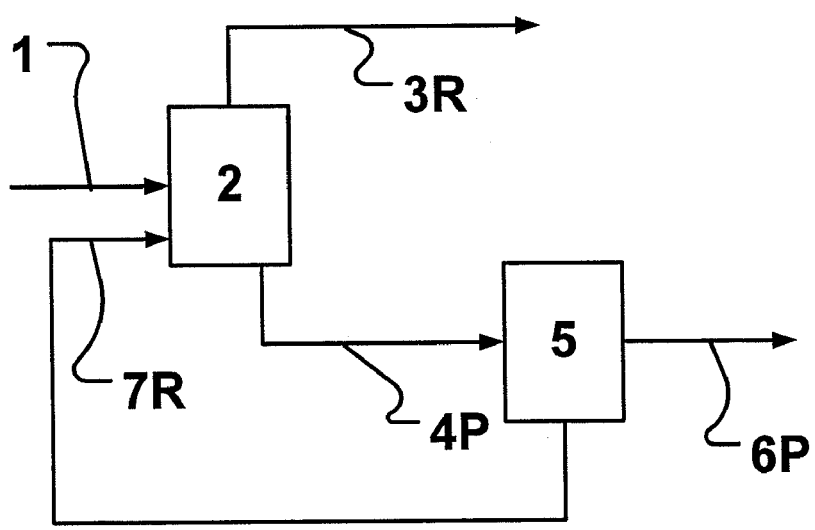
FIG. 41 illustrates a dual diafilter fractionation system having a retentate recycle feature.

In an alternative embodiment, shown in FIG. 41, a two stage cascade according to the invention is characterized by a retentate recycle feature. This embodiment includes a feed stream 1 being directed to a first membrane-containing separation unit 2. An interstage flow stream 4P carries a permeate stream to a second membrane-containing separation unit 5. Interstage recycle stream 7R carries a retentate stream from unit 5 back to unit 2. Unit 2 generates a retentate stream 3R and, as well, unit 5 generates a permeate stream that is a permeate product stream 6P.

Figure 42:
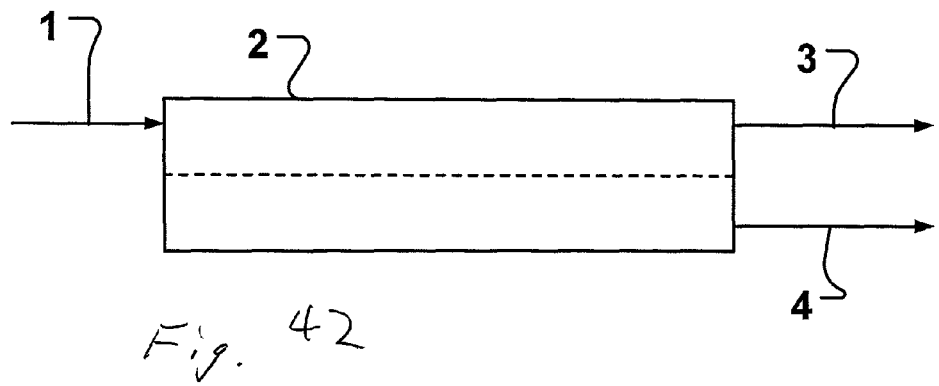
FIG. 42 provides a schematic of a single pass diafilter having a feed 1, stage membrane unit 2 containing a selectively permeable membrane, retentate stream 3 and permeate stream 4.
Figure 43:
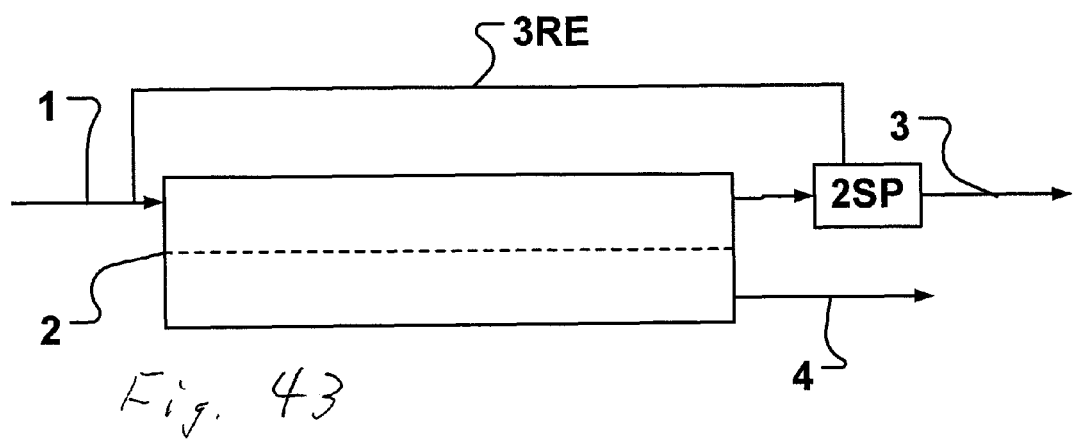
FIG. 43 illustrates a recirculation around a single stage including feed 1, stage membrane unit 2, flow splitter 2SP, recycle stream 3RE, stage retentate stream 3, stage permeate stream 4; note that if recirculation rate 3RE is large relative to product stream 3, then the retentate side approaches a CSTR in behavior.
Figure 44:
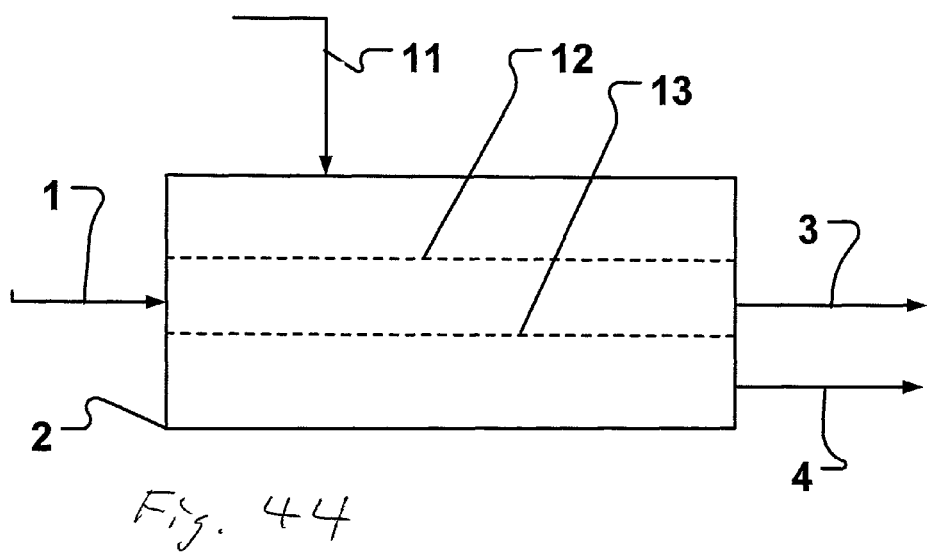
FIG. 44 illustrates single pass across a stage with continuous solvent addition including feed 1, stage membrane unit 2, stage retentate stream 3, stage permeate stream 4, solvent addition feed 11, selectively permeable membrane 13, and macroporous membrane 12.

Various stage designs are utilized in systems according to the invention. FIG. 42 illustrates a single pass diafilter having a feed 1, stage membrane unit 2 containing a selectively permeable membrane, retentate stream 3 and permeate stream 4. Alternatively, FIG. 43 depicts a recirculation around a single stage including feed 1, stage membrane unit 2, flow splitter 2SP, recycle stream 2RE, stage retentate stream 3, stage permeate stream 4; note that if recirculation rate 3RE is large relative to product stream 3, then the retentate side approaches a CSTR in behavior. Yet another stage useful in the invention is shown in FIG. 44. This single pass across a stage with continuous solvent addition features a feed 1, stage membrane unit 2, stage retentate stream 3, stage permeate stream 4, solvent addition feed 11, selectively permeable membrane 13, and macroporous membrane 12.

Figure 45:
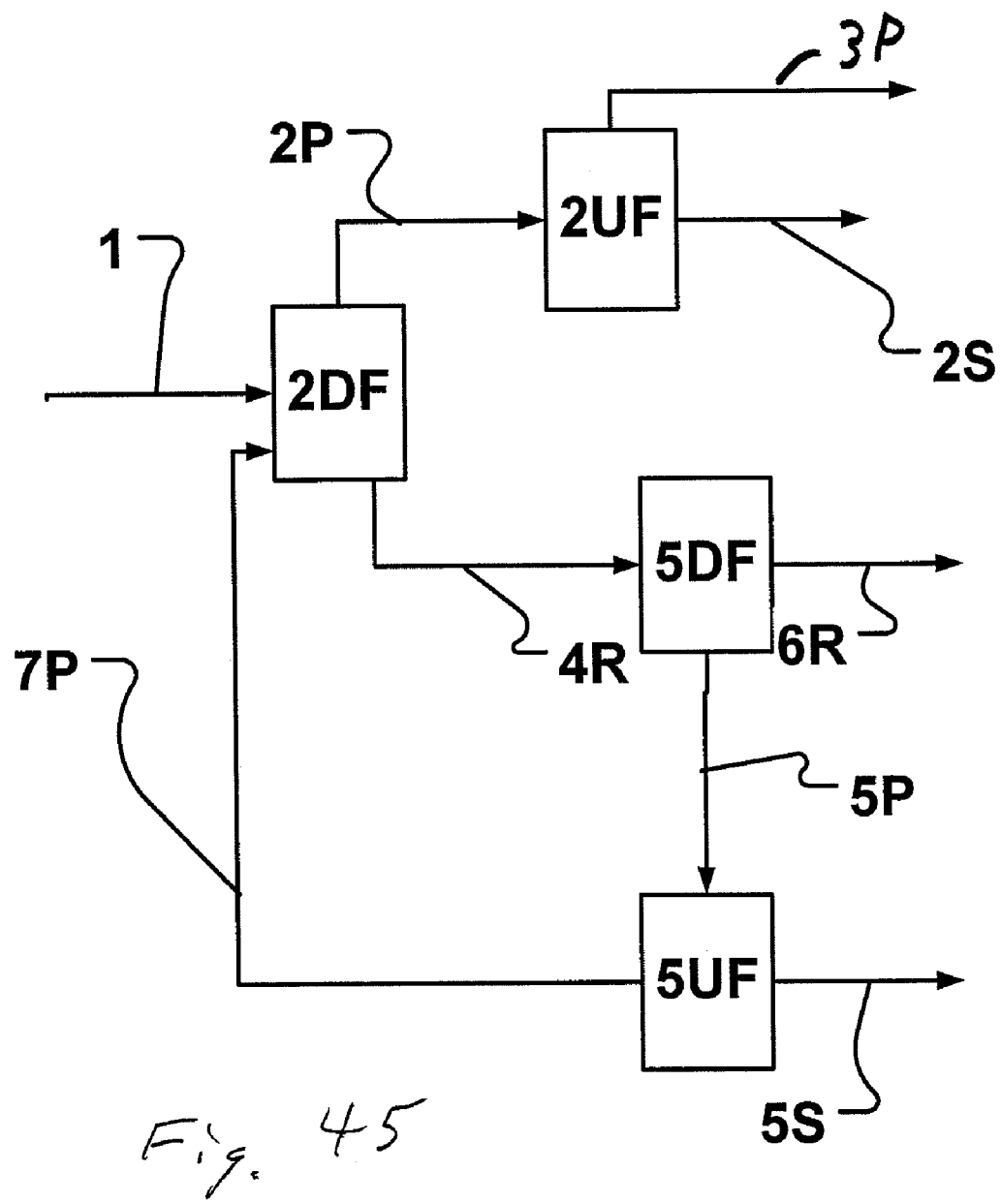
FIG. 45 depicts a two stage cascade according to the invention including diafilters and ultrafilter membranes.

FIG. 45 depicts a two stage cascade according to the invention including diafilters and ultrafilter membranes. This system includes a first membrane-containing Separation Unit 2, with two membrane units in series: 2DF and 2UF. A second membrane-containing Separation Unit 5 is also present with two membrane units in series: 5DF and 5UF. Interstage Recycle Stream 7P carries a permeate stream from 5UF back to 2DF. 2UF generates a Product Stream 3P and 5DF produces Product Stream 6R. An intrastage Stream 2P internal to Unit 2 carries permeate from 2DF to 2UF. Likewise, Intrastage Stream 5P, internal to Unit 5 carries permeate from 5DF to 5UF. Solvent Stream 2S is generated from Unit 2 and Solvent Stream 5S from Unit 5.

Figure 46:
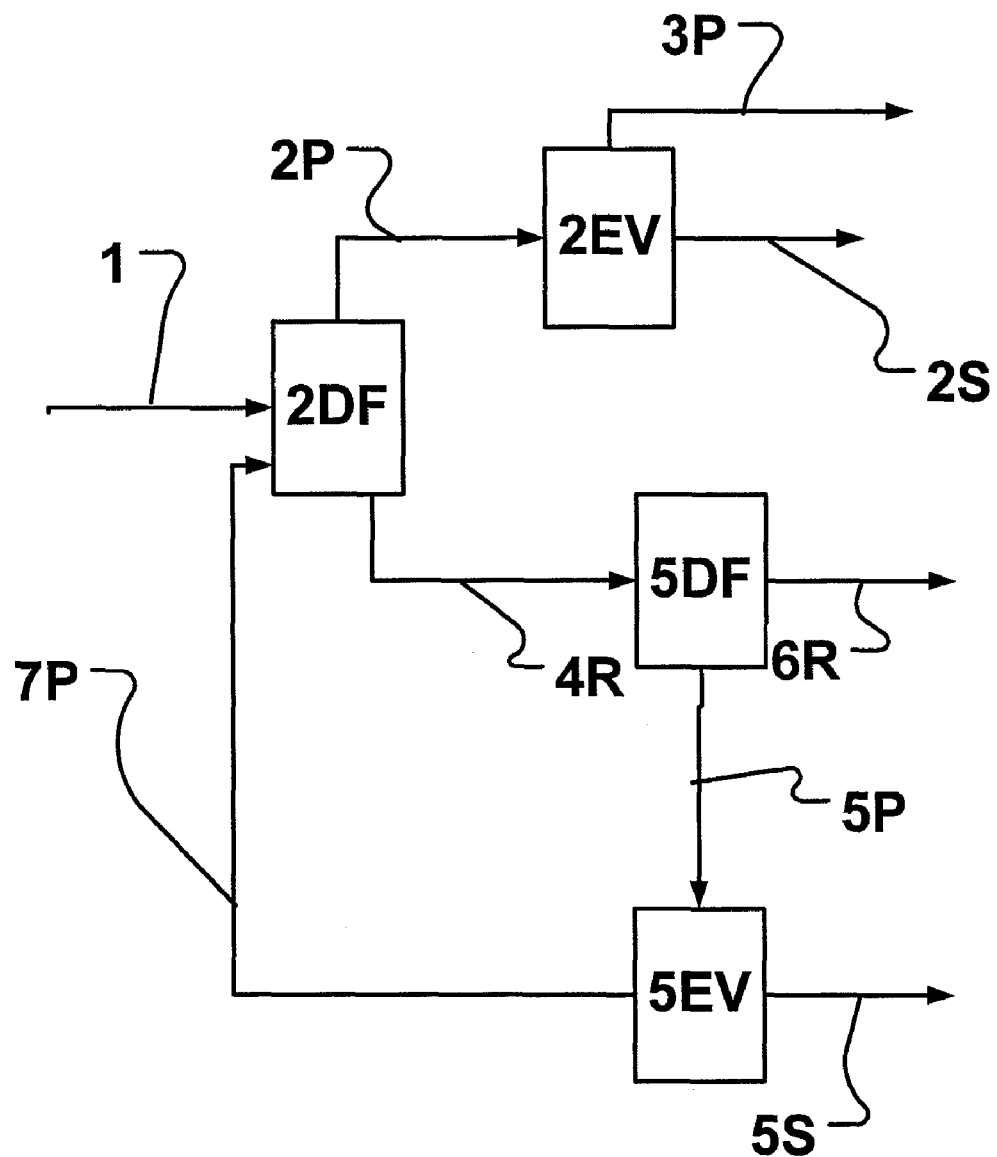
FIG. 46 illustrates an alternative embodiment two stage cascade with diafilter membrane and evaporator units.

FIG. 46 illustrates an alternative embodiment two stage cascade with diafilter membrane and evaporator units. This system includes a First Membrane-containing Separation Unit 2 with membrane unit 2DF in series with evaporator 2EV. A second Membrane-containing Separation Unit 5 is also present with membrane unit 5DF in series with evaporator 5EV. Interstage flow stream 4R carries a retentate stream from 2DF to 5DF. Interstage Recycle Stream 7P caries a permeate stream from 5EV to 2DF. Product Stream 3P is generated by 2EV and Product Stream 6R is provided by 5DF. An Intrastage Stream 2P internal to Unit 2 carries permeate from 2DF to 2EV. An Intrastage Stream 5P, internal to Unit 5 carries permeate from 5DF to 5EV. Solvent Stream 2S is generated from Unit 2 and, likewise, Solvent Stream 5S is produced from Unit 5.

As can be appreciated, the invention extends to the use of all described and claimed systems and devices, and includes a process of separating a first solute from a second solute that includes the step of directing a multicomponent mixture containing a first solute and second solute to a multistage cascade separation system that performs at each stage a membrane-containing separation step that preferentially rejects at least the first species relative to at least the second species while substantially permeating at least a third species which acts as a solvent. A preferred system for use in the process has: (a) at least two stages, wherein each stage includes a selectively permeable membrane; and (b) at least one recycle stream from one stage to another stage. All flow streams that contain the first and second species that are fed to any individual stage, whether they are a recycled permeate flow stream from another stage or a recycled retentate flow stream from another stage or fresh feed flow stream, have substantially the same mass ratio of the first species to the second species within that individual flow stream. Use of the system thereby facilitates separation of first solute from second solute.

Electro-diffusion can be used in place of solvent drag to produce selective transport if at least one of the solutes carries an electric charge, and again there are at least two ways this motive force can be used: either to replace solvent drag or to enhance it. Here one can define a sieving coefficient analogous to that for selective filtration, and the formal description of a cascade differs little from that the pressure operated system. There will now be no solvent management problem, but both electrode reactions and continuity of current must be considered. In the simplest case one can produce a field across a simple two compartment diafilter, but this is unlikely to be economic.

Accordingly, the present invention encompasses a multistage cascade separation system having at each stage an electrodiffusion device separation step that preferentially transports at least a first species relative to at least a second species.

Such a system includes: (a) at least two stages, wherein each stage includes an electrodiffusion device; and (b) at least one recycle stream from one stage to another stage. All flow streams that contain the first and second species that are fed to any individual stage, whether they are a recycled permeate flow stream from another stage or a recycled retentate flow stream from another stage or fresh feed flow stream, have substantially the same mass ratio of the first species to the second species within that individual flow stream. Each of the electrodiafiltration device comprises: (i) a feed; (ii) a retentate compartment; (iii) a permeate compartment; (iv) a selectively permeable membrane positioned between said retentate compartment and permeate compartments; and (v) a retentate/permeate channel pair positioned opposite the selectively permeable membrane. The retentate/permeate channel pair is capable of generating an electric field perpendicular to a flow direction of a filtrate flow directed through the selectively permeable membrane and the retentate/permeate channel pair selectively reinforces or hinders convection induced solute migration through the selectively permeable membrane.

In certain devices according to the invention, a plurality of retentate/permeate channel pairs are provided in a stack in which said retentate/permeate channel pairs are separated by interspaced selectively permeable membranes that are electrically conductive so that electric current flows across each retentate/permeate channel pair perpendicular to the flow direction of the filtrate flow directed through each said selectively permeable membrane. In preferred embodiments, the stack is in the form of spiral produced by rolling a single stack, the electric current provided radial across the stack during operation of the device.

Figure 35:
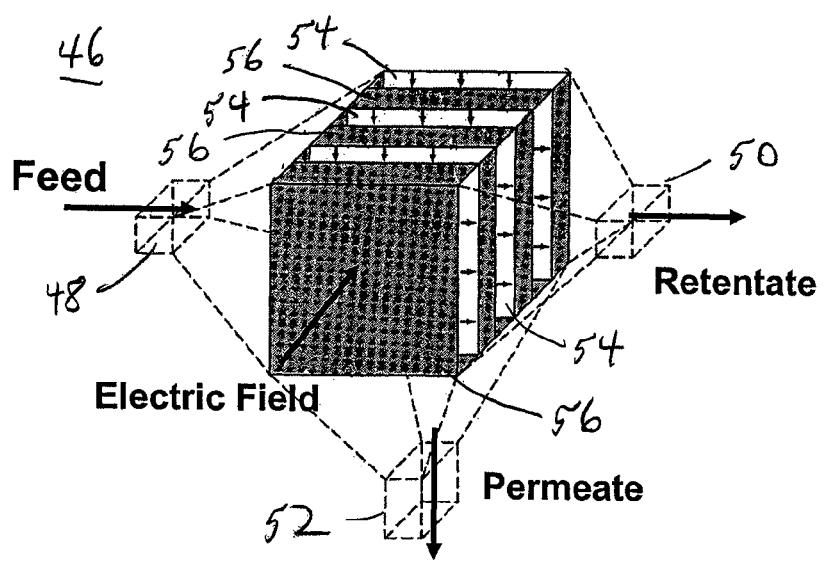
FIG. 35 is a schematic of an electro-diafiltration device according to the invention.

In one embodiment, an electro-diafiltration device as shown in FIG. 35 is provided that utilizes a multi-layer cross flow design. Here it will be important to make the layer "downstream from the permeate compartment impermeable to solutes of interest but permeable to those carrying the current. The exemplary electro-diafiltration device 46 shown in FIG. 35 includes: (a) a feed 48; (b) a retentate compartment 50; (c) a permeate compartment 52; (d) a selectively permeable membrane 54 positioned between retentate compartment 50 and permeate compartment 52; and (e) a retentate/permeate channel pair 56 positioned opposite selectively permeable membrane 54. Retentate/permeate channel pair 56 is capable of generating an electric field perpendicular to a flow direction of a filtrate flow directed through selectively permeable membrane 54 and the retentate/permeate channel pair 56 selectively reinforces or hinders convection induced solute migration through selectively permeable membrane 54. In practice, a plurality of retentate/permeate channel pairs 56 are positioned opposite a plurality of selectively permeable membranes 54 to form an alternating stack configuration. In an alternate embodiment, the stack is wound into a spiral geometry and the electric current is provided by a radial current flow.

The invention as described herein may further be modified by routine experimentation to utilize a suspension of colloidal, nano- or micro-particles added to the feed stream that preferentially interact with one of the two solutes to be separated. This provides what may be called a true moving bed (TMB) fractionation. This is considered a simpler and more advantageous alternative to the simulated moving beds of current technology.

Figure 8:
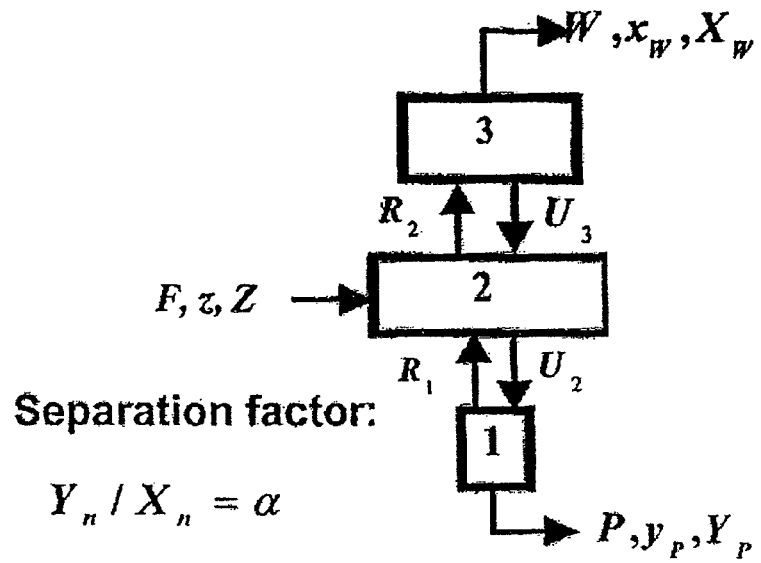
FIG. 8 illustrates a three stage ideal cascade in which feedsteam F is separated by the three stages (1, 2 and 3) into a waste stream (W) and a permeate stream (P).

The simplest complete cascade shown in FIG. 8, consists of three stages. Example 1 shows a derivation for this case. A derivation similar to that shown in example 1 can also be prepared for the two cases of shorter partial cascades comprising only two stages.

Example 1

Mathematical Description of Ideal Cascade System

Consider the simplest complete cascade shown in FIG. 8, consisting of three stages. For convenience, one may begin by working on a solvent-free basis and assume perfect mixing in the upstream compartment of each membrane module or stage. For this example, the state separation factor $\Phi$ is considered constant throughout the cascade. One may avoid blending streams of differing solute composition in accordance with ideal cascade theory and therefore require that $$X_1 = Y_3 = Z \tag{1}$$

Figure 7:
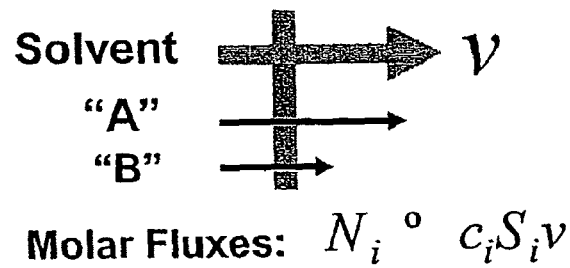
FIG. 7 depicts the mathematical definition of separability in a separation system according to the invention.

Here X is the mole ratio of solutes $\alpha$ and $\beta$ (i.e. moles $\alpha$/moles $\beta$) in the retentate; Y is the mole ratio of solutes $\alpha$ and $\beta$ in the permeate, and Z is the mole ratio of solutes $\alpha$ and $\beta$ in the feed. Also, x is the mole fraction $\alpha/(\alpha+\beta)$ in the retentate; y is the mole fraction $\alpha/(\alpha+\beta)$ in the permeate, and z is the mole fraction $\alpha/(\alpha+\beta)$ in the feed. The numerical subscripts refer to the stage within the cascade; the other symbols in the subscripts refer the definitions of the symbols in standard type. Using the definition of stage separation factor depicted in FIG. 7 ($\Phi$, where $\Phi = s_\alpha/s_\beta$ and s is the sieving factor of the indicated solute), one can complete the specification of terminal stream compositions:

$$Y_P = Y_1 = \Phi Z; \quad X_W = X_3 = Z/\Phi \tag{2,3}$$

and more generally $$Y_n = \Phi X_n = \sqrt{\Phi} Y_{n+1} \tag{4,5}.$$

One may now go on to complete the mass balances for the system as a whole:

$$F = P + W; \quad zF = y_P P + x_w W \tag{6,7}$$

or $$z = \theta y_P + (1-\theta) x_w \tag{8,9}$$

where W=waste stream (retentate); F=total moles/time of feed; and P=moles of product, and $$\theta = cut = P/F$$

and $$1-\theta = W/F$$

FIG. 4 illustrates W, F and P as they apply to a stage configuration. It now only remains to calculate the two remaining intermediate compositions by making similar balances about the top and bottom stages. These procedures are illustrated by the following specific example.

Example 2

Fractionation of $\alpha$ Lactalbumin and $\beta$-Lactoglobulin

Assume by way of example the system described in the tabular form in FIG. 10 and use $\alpha$-lactalbumin ($\alpha$ LA) as the product in a mixture with $\beta$-lactoglobulin ($\beta$ LG):

$$\Phi = 21 \text{ and } Z = 0.1071/0.441 = 0.2429 \tag{10}$$

These correspond to the system of Cheang and Zydney for their 30 kDa membrane example (Cheang, B., and A. L. Zydney, 2004, A two-stage ultrafiltration process for fractionation of whey protein isolate, *J. Mem. Sci.* 231, 159-167).

System Mass Balances

One may begin by defining the input to the system using a solvent-free feed rate of one millimole per minute. Then, in these units $$F=1; Z=0.1071/0.441=0.2429; z=0.2429/1.2429=0.1954 \quad (11,12,13).$$

One may next note that for an ideal cascade $$Y_3=X_1=Z=0.2429; y_3=x_1=z=0.1954 \quad (14,15,16)$$

and $$X_w=X_3=Y_3/21=0.01157; x_3=x_w=0.01144 \quad (17,18)$$

while $$Y_p=Y_1=21X_1=5.1009; y_p=0.8361 \quad (19,20).$$

One is now ready to calculate the α-lactalbumin yield, and this requires making two mass balances on the cascade. One should follow convention in writing one for total moles and the other for α-lactalbumin, all on a solvent-free basis:

$$F=P+W; zF=y_pP=x_wW \quad (21,22).$$

These equations can be combined to give $$z=y_p\theta+x_w(1-\theta); \theta=P/F \quad (23)$$

$$\theta=(z-x_w)/(y_p-x_w)=(0.1954-0.0144)/(0.8361-0.0144)=0.2239=P=1-W \quad (24).$$

This quantity is known as the fractional cut for the separation. The yield of β-lactoglobulin is then $$Y_\beta=\theta y_p/z=(0.2239\cdot0.8361)/0.1954=0.958 \quad (25a).$$

The yield of α-lactalbumin, obtained with a purity of 0.988 is $$Y_\alpha=(1-\theta)x_3/z=(1-0.2239)\cdot0.989/0.8046=0.954 \quad (25b)$$

Stage Mass Balances

One may now calculate the intermediate stream rates and compositions that will be needed later in calculating solvent flows. One may begin by writing from Eq. 5 that $$X_2=\sqrt{21}\cdot X_w=4.58\cdot0.01157=0.05302; x_2=0.05035 \quad (26)$$

while $$Y_2=Y_p/\sqrt{21}=5.1009/4.5825=1.1131; y_2=0.05268 \quad (27).$$

Compositions are now complete, and it remains to calculate the (solvent-free) stream rates. One may begin with stage 1 and write $$U_2=R_1+P; y_2U_2=x_1R_1+y_pP \quad (28,29)$$

where R=total moles/time of retentate and U=total moles/time of permeate (also referred to as ultrafiltrate).

It follows that $$0.5628U_2=0.1954(U_2-0.2239)+0.8361\cdot0.2239 \quad (30)$$

or $$(0.5268-0.1954)U_2=0.1872-0.1954\cdot0.2239 \quad (31)$$

$$U_2=(0.1872-0.04375)/(0.5268-0.1954)=0.4327 \quad (32).$$

Then, $$R_1=0.4327-0.2239=0.2088 \quad (33).$$

One may now turn to stage 3 and write $$R_2=U_3+W=U_3+0.7761; \quad (34)$$

$$0.05035R_2=0.1954U_3+0.01144\cdot0.7761 \quad (35)$$

$$=0.1945(R_2-0.7761)+0.00888 \quad (36).$$

Then, $$R_2=(0.1954\cdot0.7761-0.0089)/(0.1954-0.05035)=0.984 \quad (37)$$

$$U_3=0.984-0.7761=0.2080 \quad (38).$$

The above-described system is graphically-applied to the corresponding cascade in FIG. 11. This completes specification of all streams on a solvent-free basis.

Example 3A

Solvent Flows

One may now reaches a point of great flexibility; there is no a priori requirement for using any particular solute concentration or even to use the same concentrations in all stages. Only the ratio of the two proteins is important. Moreover, since the only returns to the feed stage from the product, stage 1, and waste (retentate), stage 2, stages have the same solvent-free composition as the feed, one can even operate completely in a batch mode (see, e.g., FIG. 13(B)).

This flexibility relaxes constraints on solute concentrations, and one possible strategy presents itself immediately—and that is to always operate at the maximum concentration permitted by the nature of the system. This, in turn, can be different for each stage, but there is of course an advantage to simplicity so one assumes identical concentrations for all streams in a numerical example.

The use of diafiltration is inherent in the method described herein and is an important purification step in that it removes low molecular weight impurities. Thus, one may be able to use higher than feed concentration in all stages, including the feed stage. This latter fact is because the composition within a well-mixed stage is that of the exit from the stage, $x_2$, not the feed composition z. Diafiltration through this stage will have removed a large fraction of low molecular weight impurities originating in the feed.

Solvent Flows for Uniform Solute Concentration

Assuming that the basis is one millimole of protein feed per minute, one may now calculate stream rates through the presently-described system. Beginning with the combined streams to the feed stage 2 of FIG. 11, one may write that the molar rate M of protein transport into stage 2 is $$M_F=F+U_3+R_1=1+0.2080+0.2088=1.4168 \text{ m-moles/min} \quad (39)$$

and the total molar concentration is $$c_{tot}=0.548 \text{ m-mols/L} \quad (40).$$

Then the volumetric flow rate, Q, of solution to stage 2 is $$Q_F=1.4168/0.548=2.585 \text{ L/min} \quad (41).$$

The corresponding flows of retentate and ultrafiltrate are $$Q_R=0.984/0.548=1.796 \text{ L/min} \quad (42)$$

$$Q_U=0.437/0.548=0.797 \text{ L/min} \quad (43).$$

One may next write for the rate of protein transport across the stage 2 membrane $$M=Avc[X_{\alpha L}S_{\alpha L}+(1-X_{\alpha L})S_{\beta L}]=0.4327 \text{ m-moles/min} \quad (44)$$

where A=membrane area, v=transmembrane velocity, and c=concentration
or $$Q_D = Av = 0.4327/(0.548 \cdot 0.1264) = 6.247 \text{ m-moles/min} \quad (45)$$

It follows that the amount of solvent that must be removed by the secondary membrane is $$Q_S = Q_D - Q_U = 6.247 - 0.797 = 5.5 \text{ L/min} \quad (46)$$

Flows across the other two stages can be calculated similarly. Note, however, that these are only representative numbers to illustrate the procedures that must be followed. Control of solvent flows must be determined by the designer to suit the system and process requirements.

Example 3B

Operation of a Model Diafilter with Continuous Solvent Feed

This example is directed to the operation of a model diafilter with continuous solvent feed. This situation is equivalent mathematically to the classic diafiltration, but with continuous solvent replacement. A simple mass balance gives:

$$-Vdc_i/dt = vAS_ic_i = QS_ic_i \quad (47)$$

$$-dc_i/d\tau = S_ic_i; \tau = V/Q \quad (48)$$

with $$c_i = c_{io} \text{ at } t=0 \quad (49)$$

then $$c_i/c(0) = e^{-S_i\tau} \quad (50)$$

It follows that the molar mass of "i" remaining in the volume element (retentate) at any time is $$M/M(0) = e^{-S_i\tau} \quad (51)$$

and that in the accumulated permeate is $$M_f/M_i(0) - M_i = M_i(0)[1 - e^{-S_i\tau}] \quad (52)$$

The ratio of "i" in permeate to retentate is then $$M_f/M_i = [1 - e^{-S_i\tau}]/e^{-S_i\tau} = e^{S_i\tau} - 1 \quad (53)$$

Now the solvent-free mole ratios of species "A" in an "A"-"B" mixture for permeate and retentate are respectively $$X_A = M_A/M_B; Y_A = M_A/M_B \quad (54)$$

and the global separation factor is $$\Phi_{IAglobal} = Y_A/X_A = (e^{S_A\tau} - 1)/(e^{S_B\tau} - 1) \quad (55)$$

One may now consider limiting behavior:
1) $\tau, t \to 0$:

Here $e^{S\tau} \to 1 + S_\tau$ and $\Phi_A = S_A/S_B \quad (56)$

2) $\tau, t \gg 1$:

Here $\Phi_A = e^{S_A\tau}/e^{S_B\tau} \quad (57)$

Figure 12:
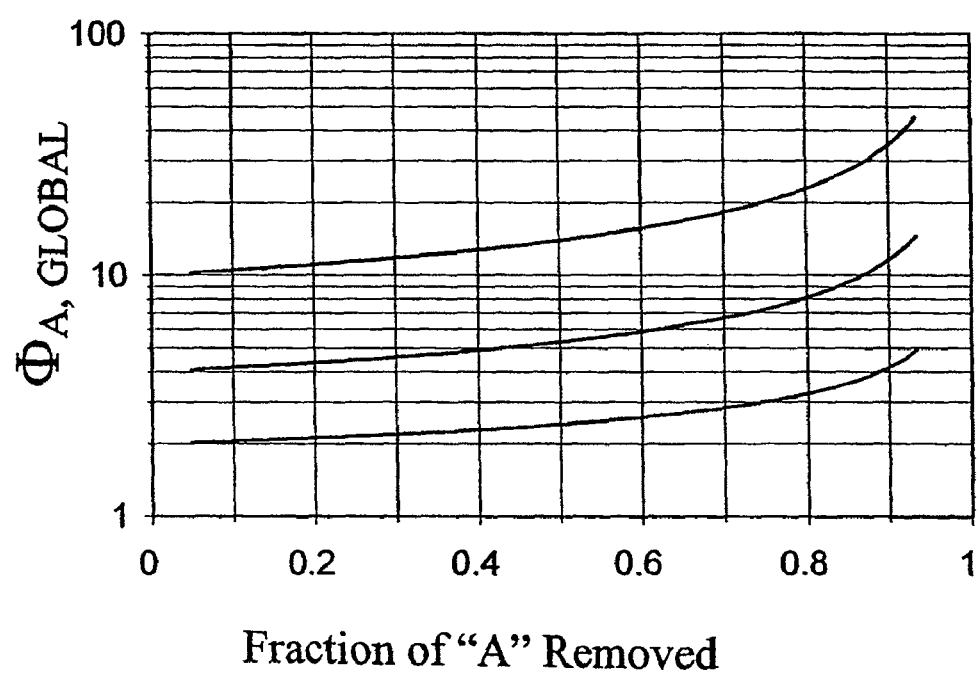
FIG. 12 illustrates the calculation of a global separation factor ($\Phi_{A, global}$) and same plotted against fraction of solute A removed.

This value can be large and representative examples of the global separation factor are shown in FIG. 12.

Separation factors vary strongly with fractional cut, and this variation must be considered in any design. This then means that for ideal cascades the proper criterion, only mixing streams of identical solvent-free composition, is difficult to select. Qualitatively similar behavior can be expected when solvent is not replaced.

Cross-Flow Sieving

Figure 14:
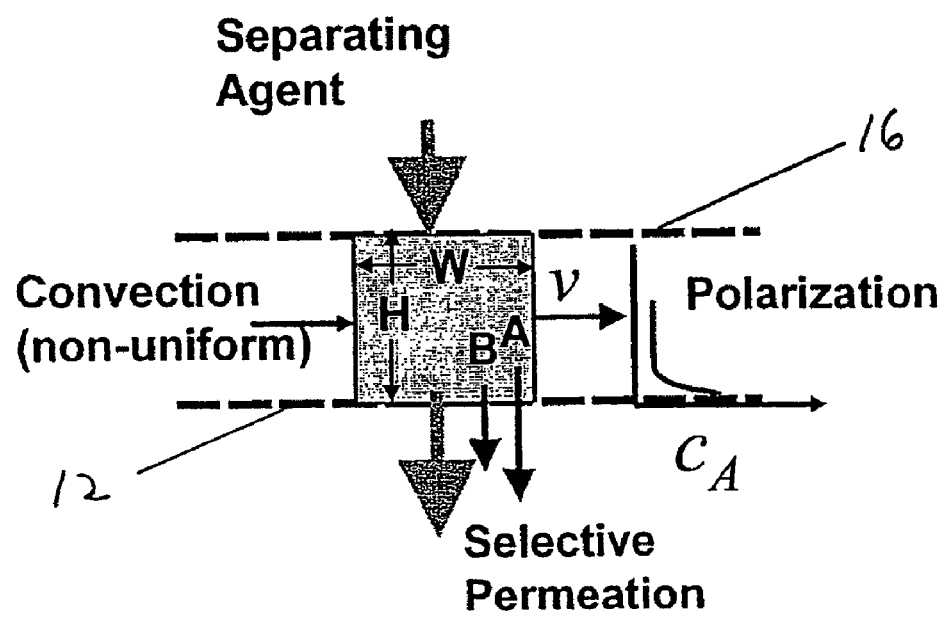
FIG. 14 illustrates cross-flow sieving in which a separating agent flows perpendicularly through a macroporous filter (16; upper dashed line) to a feed stream flow and solutes A and B contained in the feed stream flow permeate a diafilter (12; lower dashed line) in a selective manner.

Analysis of the cross-flow sieving (FIG. 14) shows two causes of variability of the sieving coefficient. One cause is polarization, which results in increase of concentration at the barrier. This is unfavorable on balance because it is strongest for the less permeable species of molecules. The other cause of variability is the cross-flow increase of effective stage separation factor. This is beneficial and militates against stirred retentate compartment.

Example 4

Semi-Continuous Batch Operation

Figure 13A:
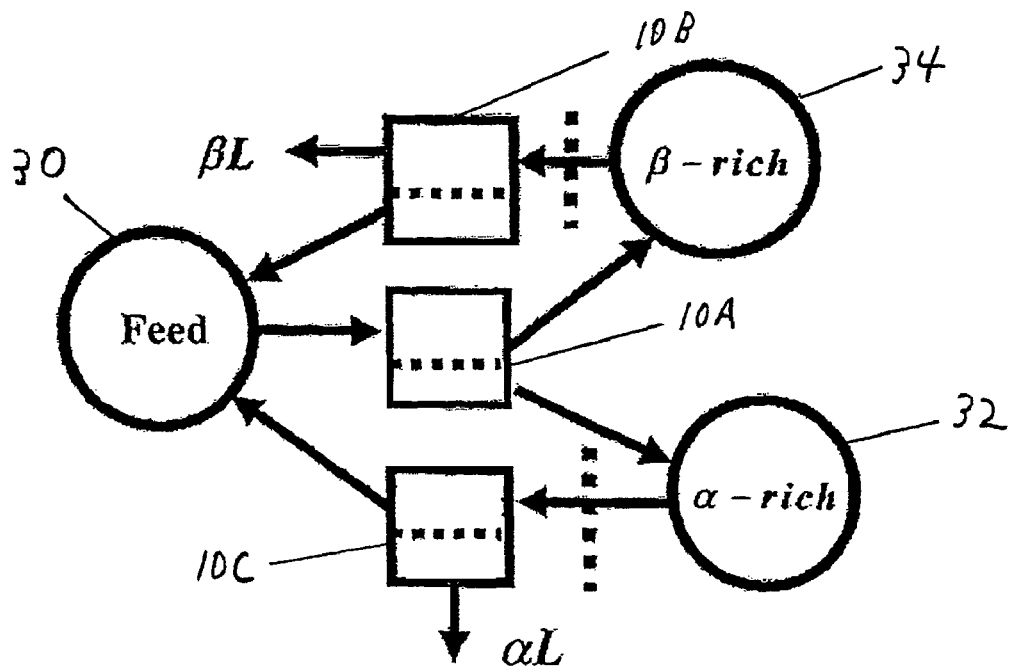
FIG. 13(A) depicts the batch operation of a cascade system for the separation of alpha-lactalbumin and beta-lactoglobulin.
Figure 13B:
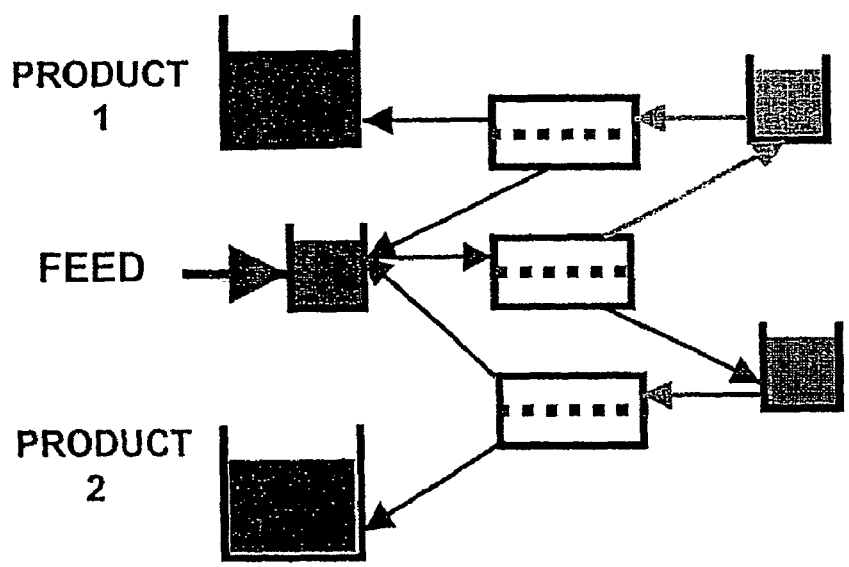
FIG. 13(B) shows batch operation of a cascade system according to the invention in generalized form.

One may operate this system as a batch process in which feed from a storage tank 30 (at left in FIG. 13(A)) is introduced to an appropriately sized diafiltration/ultrafiltration (DF/UF) stage 10A and the two output streams are fed to two additional tanks, one tank 32 for the alpha lactalbumin (α-L) rich stream, the ultrafiltrate, and one tank 34 for the beta lactalbumin (β-L) rich stream, or retentate. One can then process these two intermediate streams and direct the filtrate of the β-L rich tank 34 back to the feed tank 30 and sends the retentate out as purified β-L. Correspondingly, one sends the retentate from the α-L tank to the feed tank and the ultrafiltrate out as purified α-L. In this way, the overall process is broken down into three simpler components each related to a standard diafiltration.

To summarize Examples 1-4, the inventor demonstrates that binary ideal cascade theory can be extended to systems of two solutes in a single solvent. The basic unit or stage in the modified cascade comprises a first, diafiltration unit, combined with a second, ultrafiltration unit. The ultrafiltration unit operates on the permeate that is obtained from the diafilter. The diafiltration membrane is selective for one of the two solutes, and the ultrafiltration membrane passes only the solvent.

It is described herein that the inventor demonstrates how the filtration rates through DF and UF membranes can be controlled so that individual stages can be combined and operated to conform to ideal cascade theory for fractionation of the two solutes from one another. An example is provided using experimental data in the reviewed literature for the simplest case of a three-stage cascade. For the first time, the inventor shows that a three-stage cascade can be operated in batch mode.

This embodiment described in this example is a semi-continuous operation, with tanks used to accumulate material after any given stage, prior to feeding it to the next stage. Feed is continuous to that stage at a operating steady state condition in that stage. In Example 4, each stage is operated with a feed tank and two product tanks, one for the retentate product and one for the permeate product. All stages are not operated at the same time, however, making the operation discontinuous. This differs from the true batch operation described below, where there are two tanks. A feed tank is used as the retentate product tank and concentrations in that tank vary with time. There is a second tank to accumulate permeate, and concentrations in that tank also vary with time.

Example 5

Module Design for Membrane Cascades

This example describes the practical implementation of membrane cascades using diafiltration for the fractionation of solute pairs. Experiments are described that demonstrate the desirability of replacing solvent during the course of each diafiltration, and a parallel modeling development suggests attractive means for accomplishing this replacement. A batch process is described to achieve such separations by simple assemblies of existing equipment, and suggestions are made for designing continuous processors. Such cascades are attractive for a wide variety of solutes including native proteins, as well as commodity chemicals, and they can be applied to resolution of enantiomers through simple modifications already described in the public literature. The same techniques can be applied to multicomponent systems using the concept of key components as has long been done in distillation.

The low inherent capital costs and high throughput rates of such membrane cascades strongly suggests that they should compete successfully against a significant number of presently used chromatographic processes, and their simplicity should make then formidable competitors to simulated moving beds as well.

Figure 15:
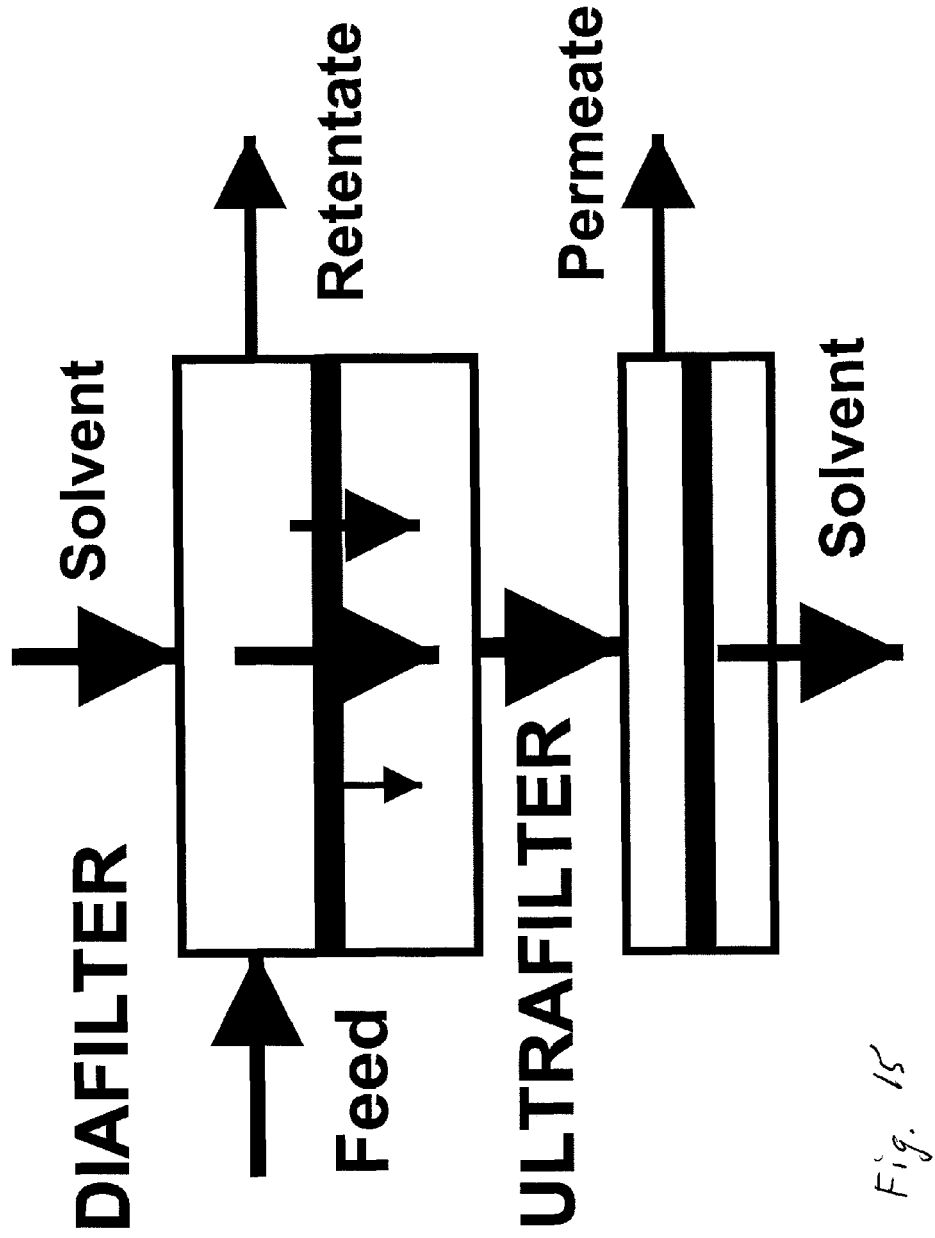
FIG. 15 displays the fundamental operation of a diafilter/ultrafilter module.

Efficient counterflow cascades of simple diafilter based modules could substantially increase the effectiveness of selective membranes for a wide variety of separations. Individual modules of such cascades, sketched in FIG. 15 consist of a combination of a diafilter, selectively permeable to one solute of a binary mixture, or one key component of a multi-component one, coupled with another filter permeable only to solvent. It was shown that an ideal cascade, defined as one in which streams to be mixed have the same proportion of key solutes, is particularly effective. This constraint is illustrated in FIG. 16. Here mole fractions and mole ratios are pseudo-binary: based only upon the two solutes or two key components of the solution. For the three-stage system shown this means that the retentate from stage 1, the permeate from stage 3, and the feed have the same proportion of the two solutes.

The inventors have shown that design of a suitable apparatus and procedure could be facilitated by breaking the overall problem down into two simpler ones: (1) specification of solvent-free separations using ideal cascade theory, and (2) design of a solvent management system to minimize solvent related costs. The first of these two sub-problems is considered at a previous point in this disclosure and will not be considered further in this example. For the second there is no such simple algorithm, and one must develop heuristic approaches that depend upon available technology and the nature of the larger process within which this fractionation is to be implemented. Solvent related costs can be quite significant.

Figure 17:
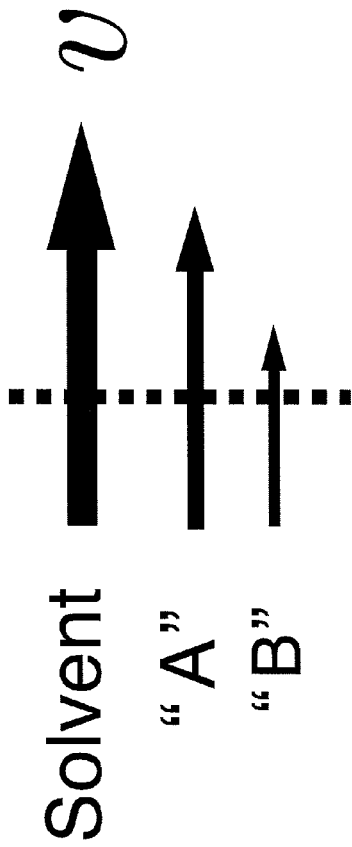
FIG. 17 provides the definitions and the basis of separability.

The discussion below is primarily concerned with these solvent related problems, and it will be based upon the simple definitions of separability illustrated in FIG. 17. Here $N_i$ is the rate at which moles of solute "i" passes through the membrane per unit exposed area, $c_i$ is the observable molar concentration of species "i", and v is the observable velocity at which solvent leaves the solution to cross the membrane. The two solutes of interest are designated "A" and "B", and $X_A$ is their molar observable ratio in the retentate compartment. The corresponding ratio in the permeate is $Y_A$, and $S_A$ is the local sieving coefficient: However, the sieving coefficients defined in this figure are not physical properties: like mass transfer coefficients they are process dependent, and observed global values can be quite different from the local values illustrated here. In particular they depend upon the flow conditions within the retentate compartment and the way in which the solvent driving the solutes across the membrane is provided. Two quite different designs are sketched in FIG. 18, and the comparison of their behavior will be an important aspect of the following discussion. Most diafilters add solvent only with the feed as indicated in the upper diagram, and it will be shown that continuing input to the retentate, as suggested in the lower diagram, offers major advantages. This claim will be investigated both experimentally and via model calculations, and its practical significance will be shown by way of specific examples.

Procedure

Figure 19:
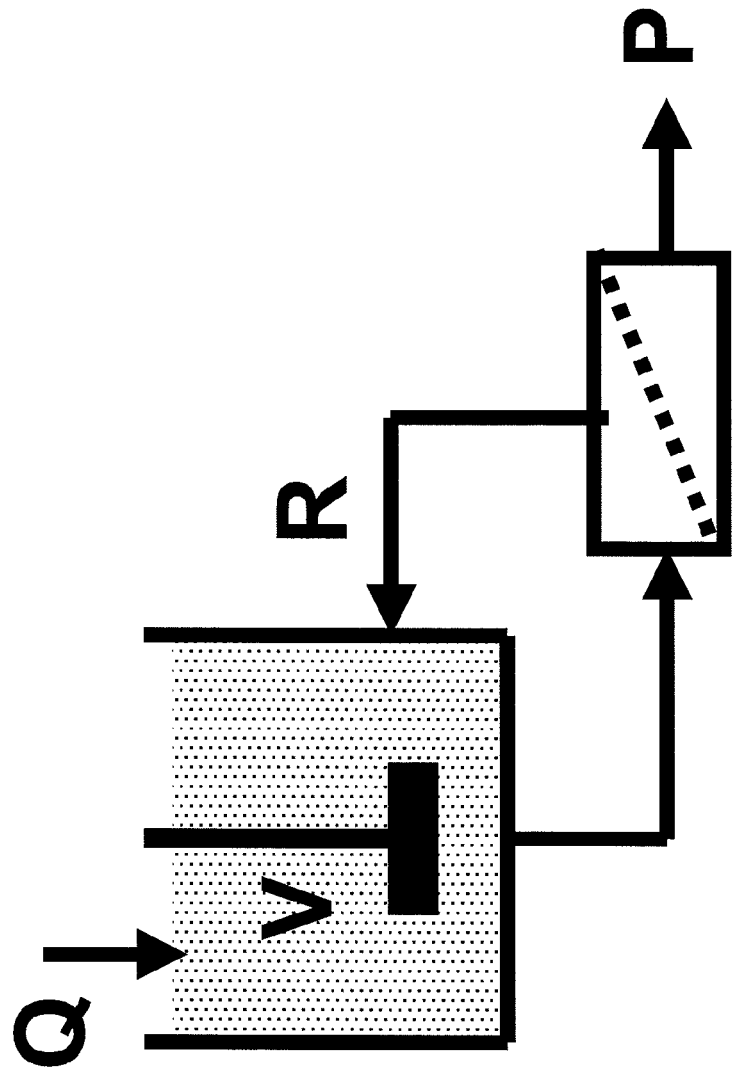
FIG. 19 provides a schematic description of the experimental system in Example 5.

The filtration unit consisted of a Millipore Pellicon XL 30 kDa membrane module. Fluid was pumped by a Cole-Parmer MasterFlex L/S variable speed pump. Total flow was controlled by pump rpm and fine control of permeate/retentate ratio by pinch clamps. The permeate and retentate flow was measured by weight over short measured time intervals. In the batch filtration experiments, the protein feed solution was filtered through the diafilter as shown in FIG. 19, with retentate returned to the feed container and permeate collected in a separate container. In the solvent replacement experiments, the same setup was used with the continuous addition of solvent to the feed container at the same rate as permeate removal. In both cases, the feed container was gently stirred with a magnetic spin bar.

The proteins were β-lactoglobulin (SigmaAldrich catalog no. L3908), and α-lactalbumin (SigmaAldrich catalog no. L5385). The proteins were 85-90% pure. The filtration buffer (solvent) was 1 mM $Na_2HPO_4$, adjusted to pH 7 and 1700 mS conductivity. The initial flow rate was set using the buffer, and actual flow rate for the protein solution was measured during the run at each sample collection. Where whey protein isolate was used, it was Bi-Pro whey protein isolate (Davisco Foods, Eden Prairie, Minn.).

Permeate and retentate samples were analyzed using a Waters Alliance HPLC with a Hamilton PRP-Infinity 4.1×50 mm column. Proteins were separated on the 4 um non-porous reverse phase styrene-divinyl benzene column packing by gradient elution starting at initial conditions 70% $H_2O$ 30% acetonitrile (ACN) 0.1% trifluoroacetic acid (TFA), with a linear gradient to 45% $H_2O$, 55% ACN 0.1% TFA over 5 minutes. There was a 2 minute hold at the end gradient composition and 5 minutes at the initial conditions before the injection of the next sample. All solvents were HPLC grade, obtained from Sigma-Aldrich; water was prepared by Milli-Q filtration system to 18 MΩ conductivity. The protein concentration was measured by integration of the absorption peaks at 280 nm, calibrated to known standards of the mixed proteins run the same day.

Theory

The inventors now provide some simple models of diafilter behavior to guide both interpretation of existing data and ultimately the design of modified devices. The starting point shall be stirred tanks from which solution is removed through a permselective membrane over the surface of which both solute composition and permeation velocity are uniform. It is then suggested how these simple models can be used to approximate the performance of more complex devices.

Stirred Tanks

Figure 20:
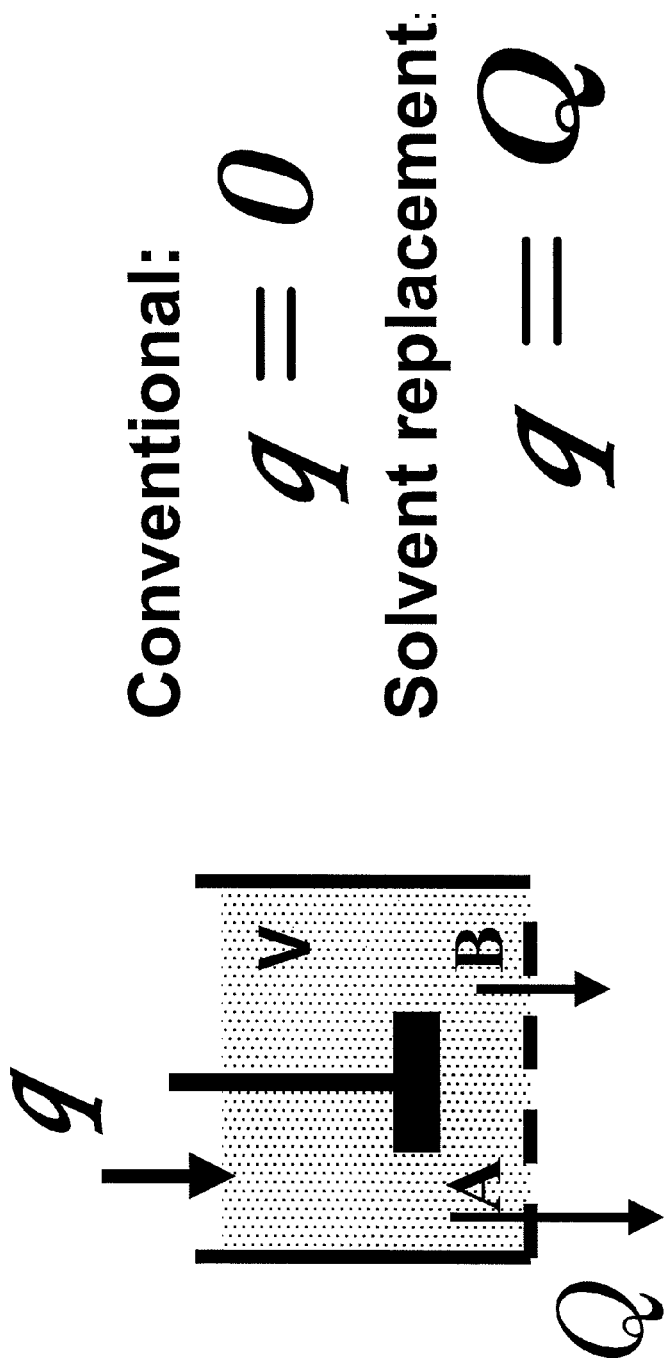
FIG. 20 illustrates a batch diafiltration from a well mixed reservoir.

Referring now to the stirred tank as shown in FIG. 20, widely used for laboratory studies, the macroscopic material balances governing it for the specific case of diafiltering aqueous solutions of solute pairs is now reviewed. To begin, the analog of conventional diafiltration in which no replacement solvent is fed to the tank is considered.

a) No Solvent Replacement

First, one may consider an initial volume F, corresponding to the feed in a diafilter, from which solution is removed by filtration at a volumetric rate Q. The initial solute concentration is $c_{i0}$, and the sieving coefficient is constant at $S_i$. The remaining volume at any time is designated as R, and it is given simply by $$R = F - \int_0^t Q(\tau)d\tau$$

The initial solute mass is $m_{i0}$.

A solute mass balance is now constructed as follows:

$$dm_i = -QS_ic_i$$
$$= \frac{d}{dt}Rc_i$$
$$= c_i\frac{dR}{dt} + R\frac{dc_i}{dt}$$
$$= -Qc_i + \left[F - \int_0^t Q(\tau)d\tau\right]\frac{dc_i}{dt}$$

where $c_i$ is solute concentration. This may be rearranged to $$\frac{1}{c_i}dc_i = -Q(1-S_i)\frac{dt}{[F - \int_0^t Q(\tau)d\tau]}$$

or $$d\ln c_i = -(1-S_i)d\ln\left[F - \int_0^t Q(\tau)d\tau\right];$$
$$\ln c_i/c_{i0} = (1-S_i)\ln\left(\frac{F}{F - \int_0^t Q(\tau)d\tau}\right)$$

It is now written more explicitly $$c_i = c_i(R)$$

and therefore that $$c_i(R) = c_0\left[\frac{F}{F - \int_0^t Q(\tau)d\tau}\right]^{(1-S_i)} = c_{i0}(F/R)^{(1-S_i)}$$

It may now be noted that the integral in the above equations need not be evaluated: one only needs to know, the instantaneous retentate volume. It must be assumed, however, that the sieving coefficient $S_i$ is time independent.

It follows from the above that the mass of solute "i" in the retentate $$m_i(R) = Rc_i(R) = Rc_{i0}(F/R)^{(1-S_i)}$$

Then the mass and concentration in the permeate P respectively $$m_i(P) = Fc_{i0} - Rc_{i0}(F/R)^{(1-S_i)}$$

$$c_i(P) = (F/P)c_{i0} - (R/P)c_{i0}(F/R)^{(1-S_i)}$$

Then the observed or global sieving coefficient is $$\bar{S}_i = c_i(P)/c_i(R) = \frac{(F/P) - (R/P)(F/R)^{(1-S_i)}}{(F/R)^{S_i}}$$

Figure 21:
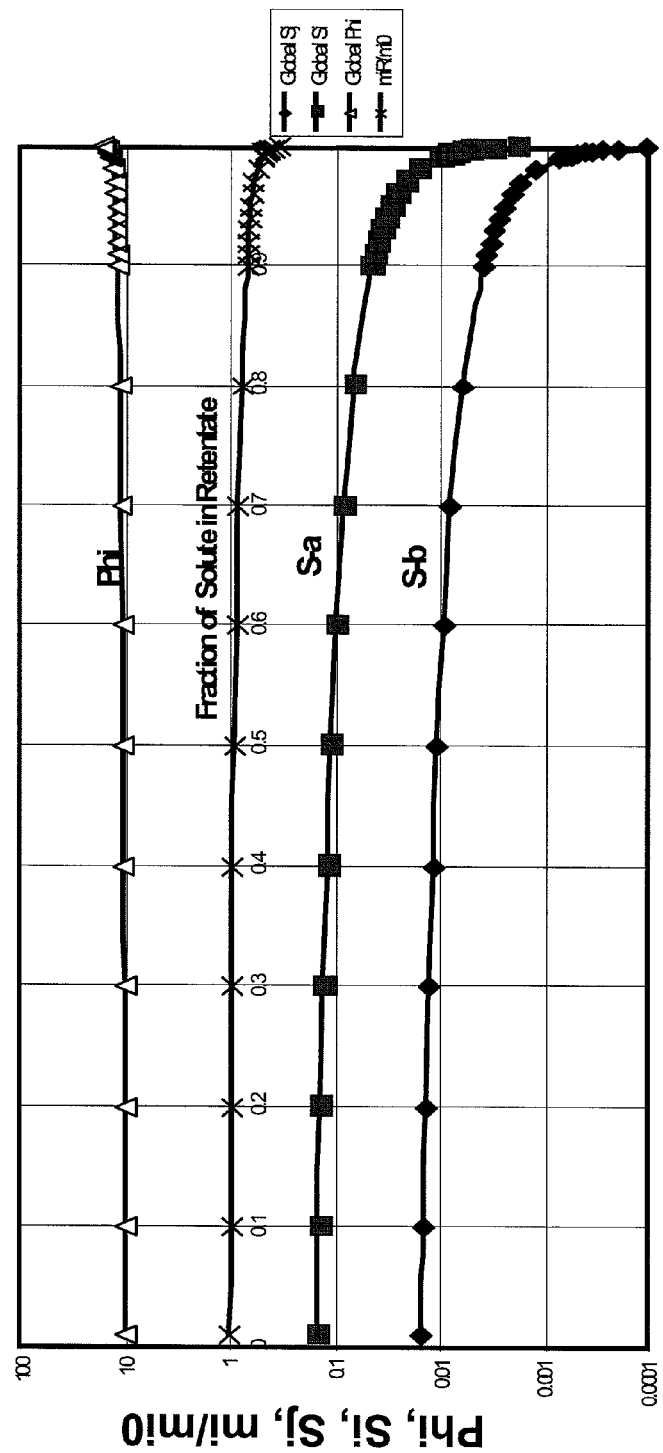
FIG. 21 shows data related to diafiltration without solvent feed.

The system behavior described by these equations is shown graphically in FIG. 21. The most important aspect of this behavior from our present standpoint is that both individual sieving coefficients and their ratio, the stage separation factor, are very insensitive to the fraction of initial volume removed even up to ratios P/F of 0.7. This insensitivity is used to advantage in the discussion below. Note also that the abscissa in this figure is the total solute yield: both the feed mass "F" and product mass "P" are for the combined solutes and on a solvent-free basis.

b) Complete Solvent Replacement

One may now consider the case of complete solvent replacement so that reservoir volume remains constant at V, or equivalently, that the volumetric replacement rate, q, is equal to the withdrawal rate Q. The mass balance now takes the form $$-Vdc_i/dt = vAS_ic_i = QS_ic_i$$

$$-dc_i/dt = S_ic_i; t = tQ/V$$

with $$c_i = c_{i0} \text{ at } t = 0$$

Then $$c_i/c(0) = e^{-S_i\tau}$$

It follows that the molar mass of "i" remaining in the volume element (retentate) at any time is $$M/M(0) = e^{-S_i\tau}$$

and that in the accumulated permeate is $$\mathcal{M}_i = M_i(0) - M_i = M_i(0)[1 - e^{-S_i\tau}]$$

The ratio of "i" in permeate to retentate is then $$\mathcal{M}_i/M_i = \frac{1 - e^{-S_i\tau}}{e^{-S_i\tau}} = e^{S_i\tau} - 1$$

Now the solvent-free mole ratios of species "A" in an "A"-"B" mixture for permeate and retentate are respectively $$X_A = M_A/M_B; Y_A = \mathcal{M}_A/\mathcal{M}_B$$

and the global separation factor $$\Phi_{A,glob} = Y_A/X_A = (e^{S_A\tau} - 1)/(e^{S_B\tau} - 1)$$

One may now look at limiting behavior:

1) $\tau, t \to 0$:

Here $e^{S_\tau} \to 1 + S_\tau$ and $\Phi_{A,glob} = \Phi_{A,loc} = S_A/S_B$

This is the value implicit in the literature.

2) $\tau, t \gg 1$:

Here $\Phi_{A,glob} = e^{S_A\tau}/e^{S_B\tau} = e^{(S_A - S_B)\tau}$

Figure 24:
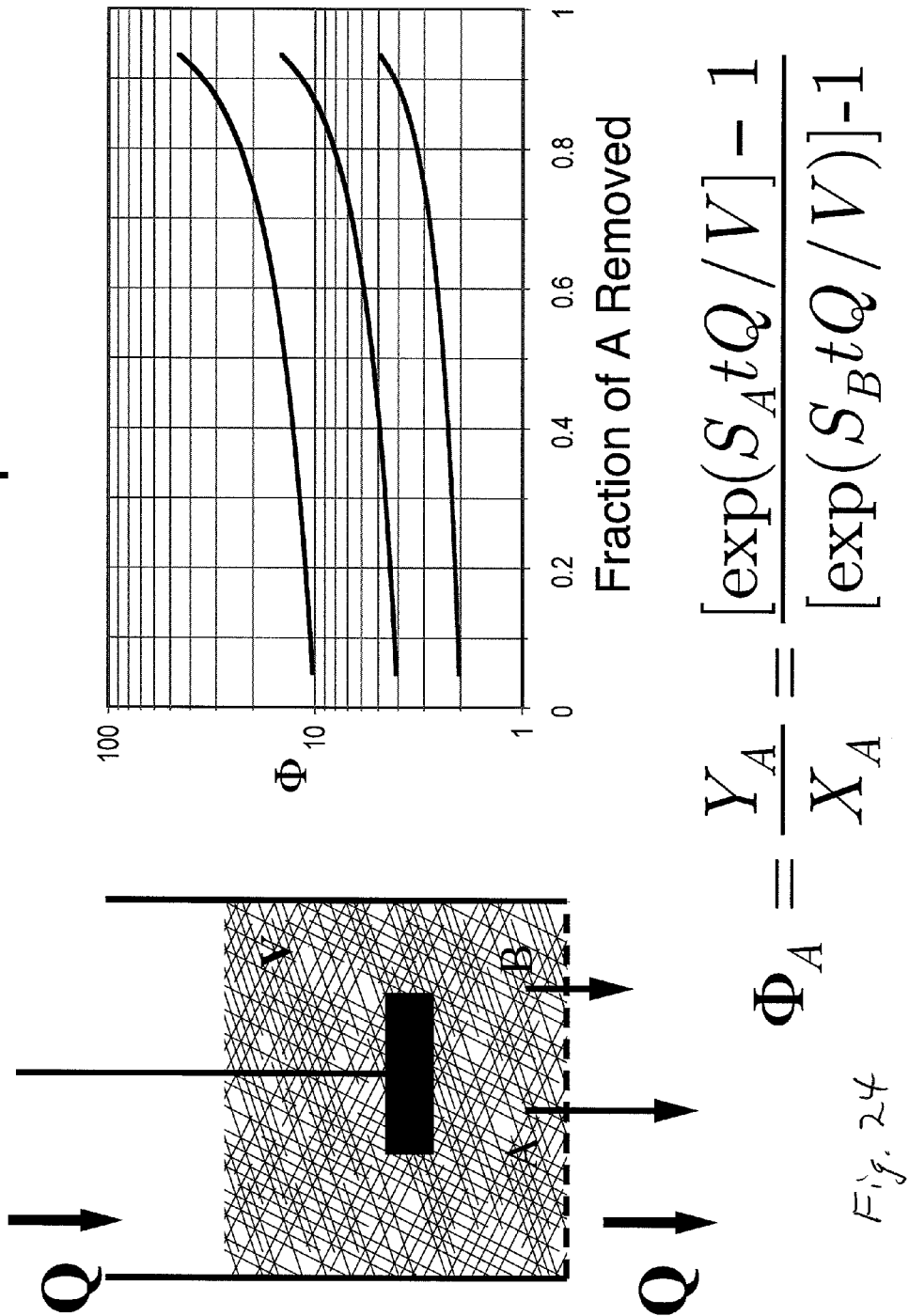
FIG. 24 illustrates the effects of solvent replacement.

As shown in FIG. 24, the increase of global separation factors predicted by this equation can be very large. Note here that the abscissa of the inset graph here is the yield of solute "A".

It is thus found that both global sieving coefficients and separation factors are predicted to increase strongly with fractional cut, and it should be possible to use this variation to advantage in module design. The primary purpose of this discussion is to demonstrate the validity of this prediction in a real system. It also means that for ideal cascades the proper criterion, mixing only streams of identical solvent-free composition, becomes a bit more complicated: one must know tQ/V.

c) Data Analysis

One must now face the problem of determining sieving coefficients from measurements of solute concentration as functions of time, and solving this problem begins with local values. This may be done several different ways:

1) Basic definition:

$$S_i = c_{iP}/c_{iR}$$

2) Macroscopic mass balance on feed reservoir:

$$V dc_{iF}/dt = -QS_i c_{iF}$$

$$c_{iF}/c_{iF}(0) = \exp\left[-(S_i/V_{res})\int_0^t Q \, dt\right]$$

$$= \exp[(S_i/V_{res}) \cdot 60I]$$

$$= \exp[\text{Arg} \cdot I]$$

$$S_i = \text{Arg} \cdot V_{res}/60 \text{ ml}$$

Where Arg is the quantity provided in Table 1.

3) The identity:

$$c_{iP} = S_i c_{iF}$$

so that one can replace $c_{iF}$ by $c_{iP}$ in the above exponential. Approach 1 is the most obvious, but it is also the most sensitive to error since it does not depend upon averaging individual values. This problem is immediately apparent on examination of the data presented.

Experimental

Two kinds of data will be provided here: batch operations using the Pellicon units in conventional diafiltration mode and a more complex operation in the apparatus sketched in FIG. 20, with "q" equal to "Q". The second set is made as a test of the solvent replacement model of FIG. 24.

Values of the sieving coefficients will be obtained directly from (1) as the ratio of permeate and feed species concentrations, and via methods (2) and (3) as well.

Batch Experiments:

Two preliminary investigations of batch filtration behavior were made as background for the simulations of solvent replacement discussed in the next section.

The first investigation was performed to determine the effects of trans-membrane solvent flux on local sieving coefficients for α-lactalbumin ("A") and β-lactoglobulin ("B"). This series covered almost four orders of magnitude of solvent flux, and, although the coefficients did increase, the extent was found to be quite small. Results are summarized in FIG. 22. The most likely cause of the increase is concentration polarization at the upstream membrane surface, and the very small effect observed suggests that there is excellent lateral mixing. Note that the dispersion of the data is significant compared to the small slope of the trend line. The second investigation was made to determine the effects of fractional cut, and the results are illustrated in FIG. 23. Again the effect is small relative to dispersion of the data. This is expected from the theoretical analysis summarized in FIG. 21.

Figure 22:
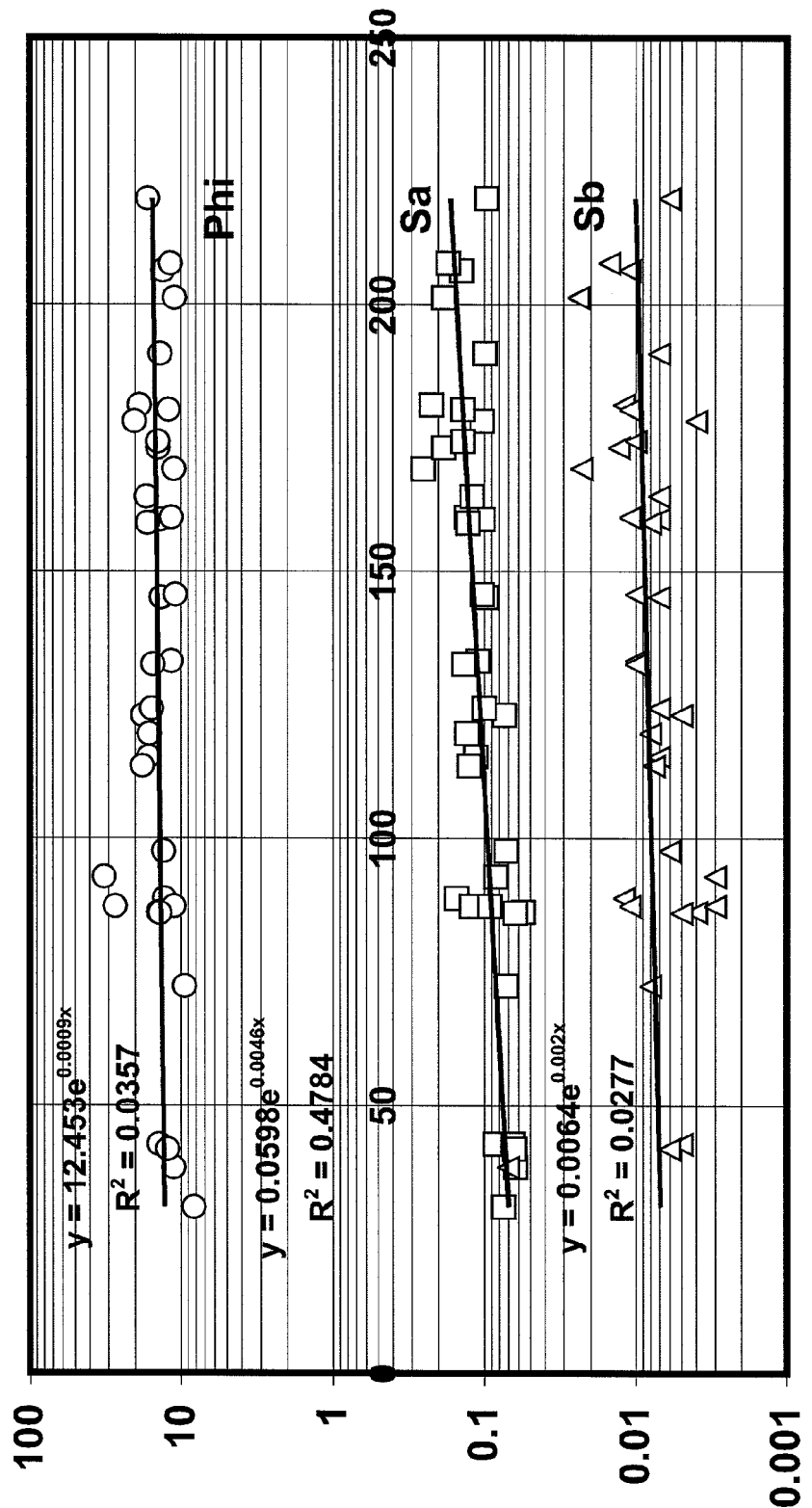
FIG. 22 provides data related to the effects of permeate flux.
Figure 23:
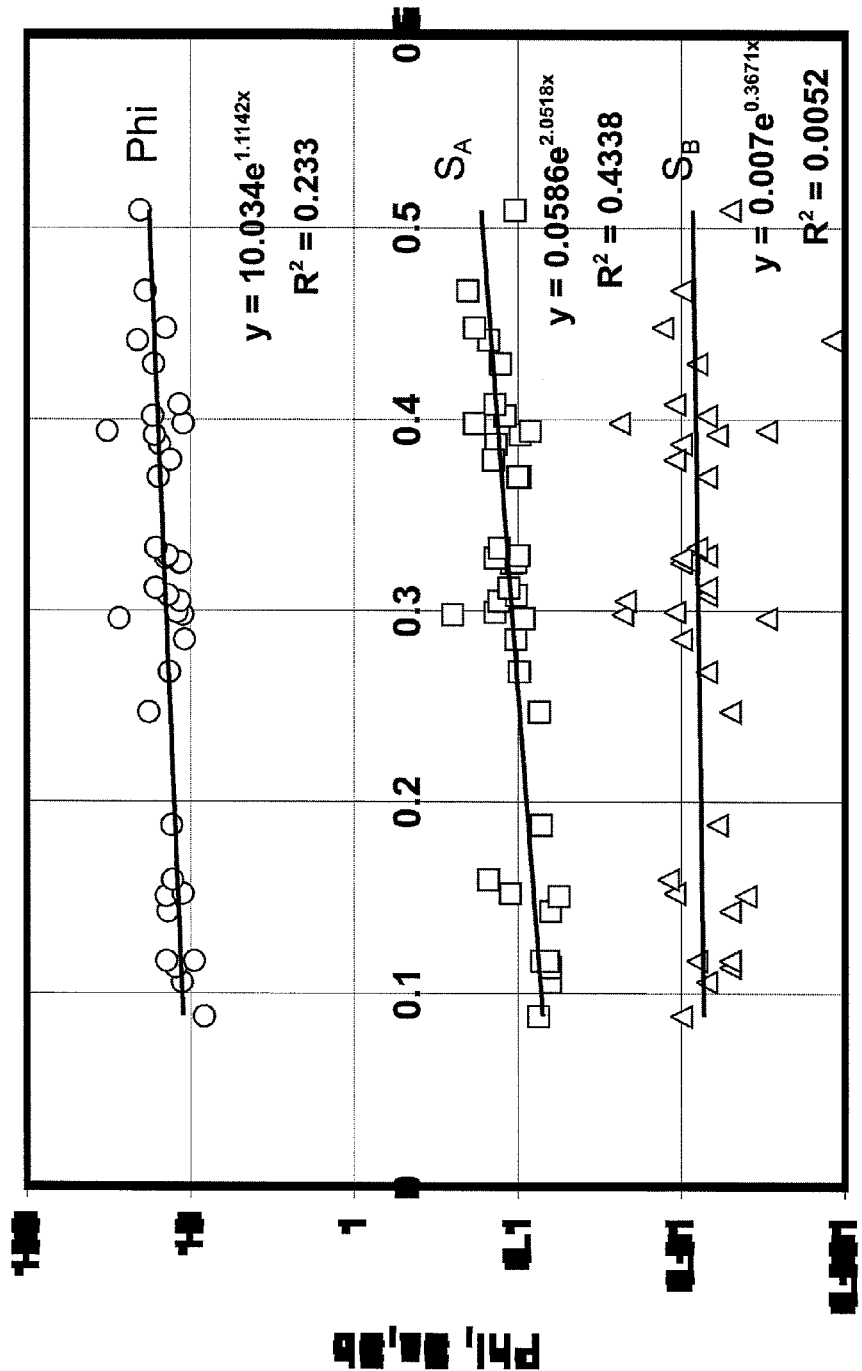
FIG. 23 shows data related to the effects of fractional cut.

There is probably some confounding of the two effects described in FIGS. 22 and 23, but the data scatter makes this point moot for the present. In any event the combined effect is small.

The practical significance of these findings is that the experimental apparatus sketched in FIG. 19 should act very much like the model shown in FIG. 20, with q equal to zero.

Solvent Replacement Experiments:

A very substantial number of runs were now made in the apparatus of FIG. 19, with Q equal to P, to investigate the effects of solvent replacement, and the goal was to determine the utility of a redesigned diafilter described later in this discussion. The primary measured values were solute concentrations in the reservoir, permeate and retentate streams, and flow rates of these streams, as a function of time, operating temperature and trans-membrane pressure drop. Temperatures were maintained via ice baths and ranged from about 2 to 9 centigrade.

Figure 25:
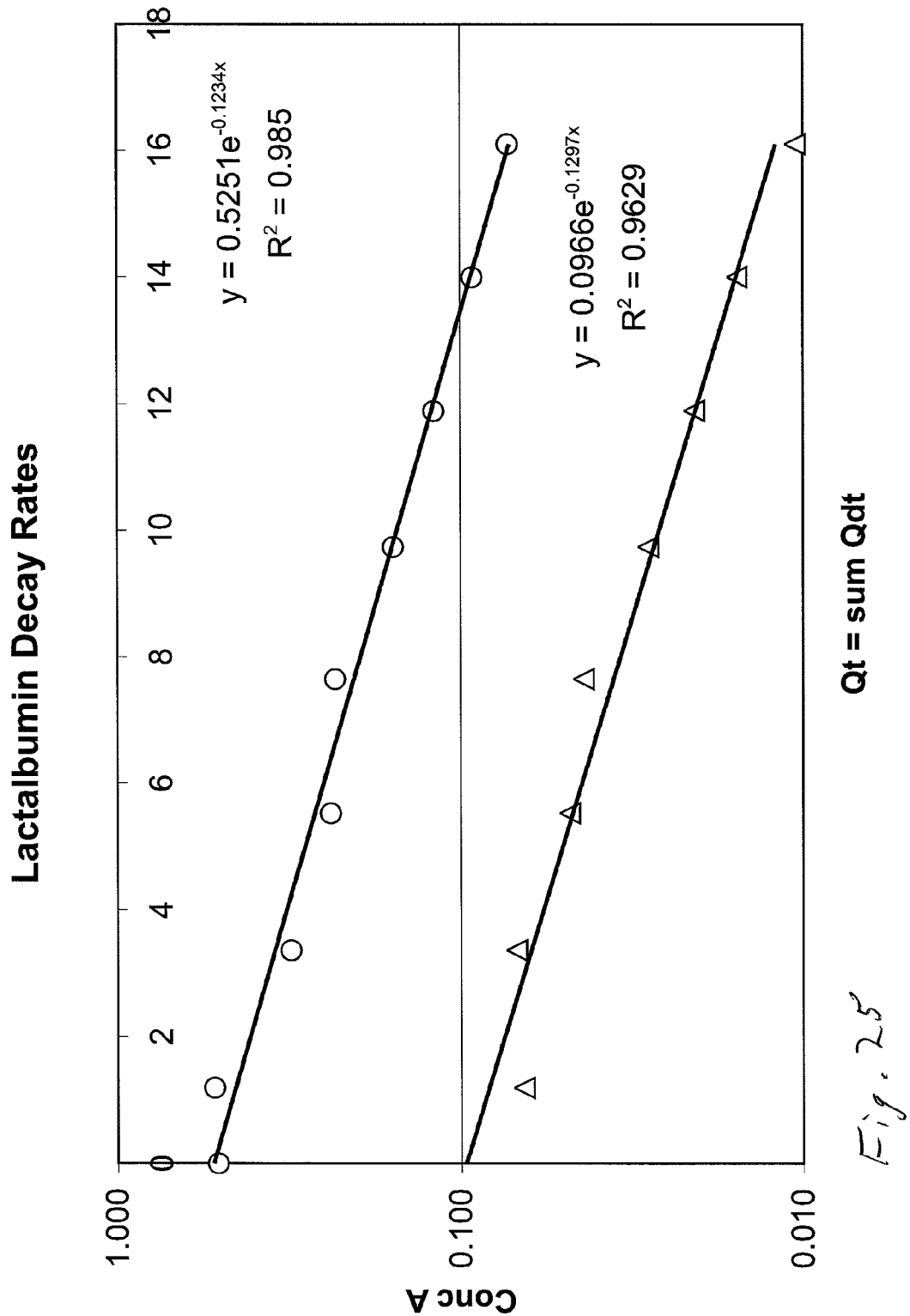
FIG. 25 provides data related to alpha-lactalbumin decay rates.
Figure 26:
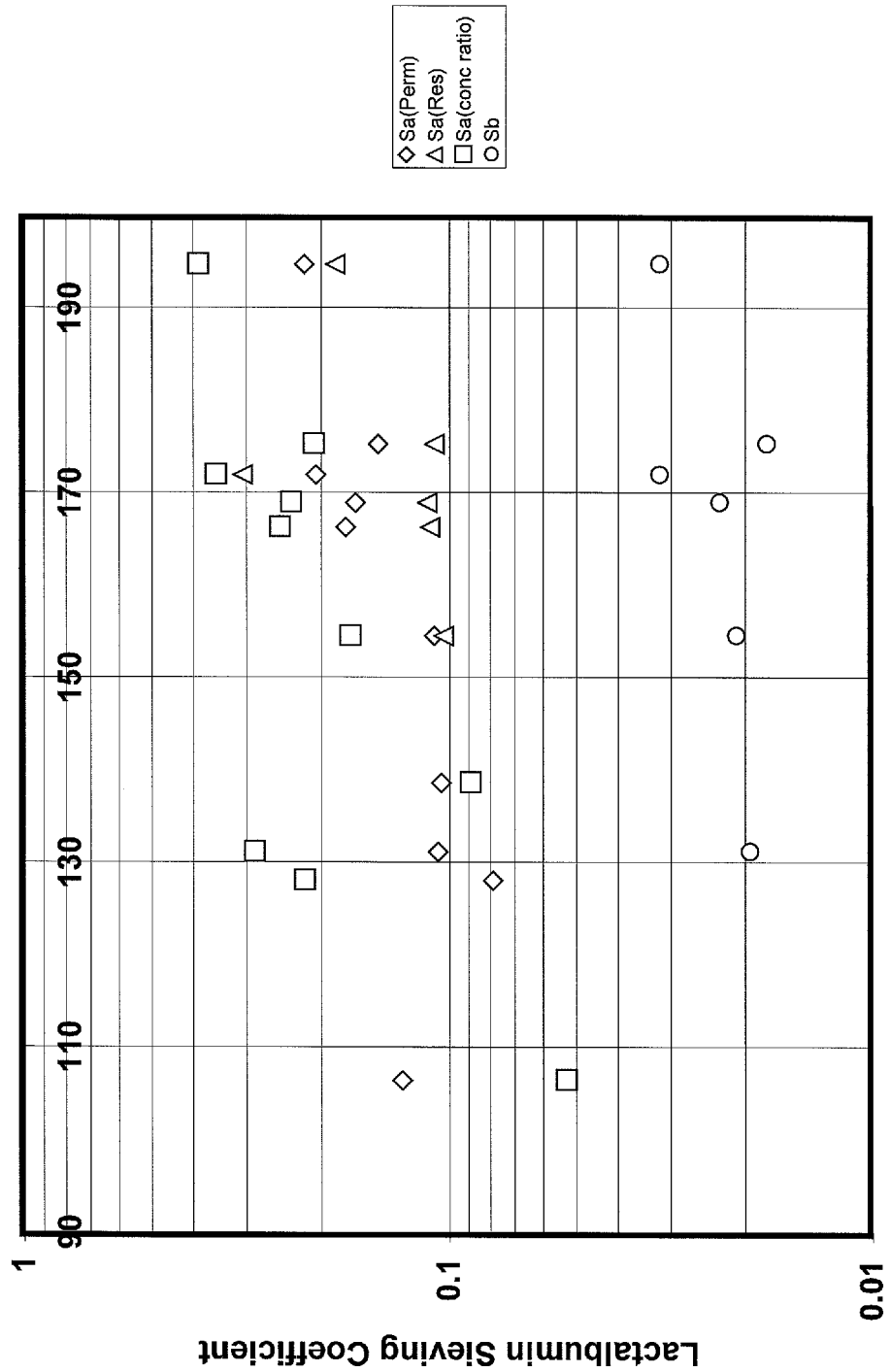
FIG. 26 shows data related to local sieving coefficients versus permeate flux (i.e., Observed Sieving Factors).

A sample of the data from which these decay rates were determined is shown in FIG. 25, and a summary of all the calculated sieving coefficients is given in FIG. 26. Series 1 ("Sa(Res)") and 2 ("Sa(Perm)") in this latter figure are made from decay rates of reservoir and permeate solute concentrations of α-lactalbumin, respectively, and series 3 ("Sa(conc ratio)") is made from the ratios of α-lactalbumin reservoir concentration to that in the permeate. Series 4 represents ratios of permeate ("Sb") to retentate compositions for β-lactoglobulin. FIG. 26 shows all results obtained for this series except for three preliminary runs where techniques were still being developed. It may be seen from FIG. 26 that the decay rate of permeate concentration provides the most consistent predictions, followed by decay in the reservoir. Concentration ratios suffer from sampling errors in the measurement of lactalbumin concentrations, and reservoir concentrations appear to be most susceptible. The cause is believed to be incomplete mixing. However, both permeate and reservoir concentrations do decay exponentially as expected.

Filtration rates of the more permeable solute, α-lactalbumin, were of greatest interest, and the plot of FIG. 25 is characteristic. Shown here are instantaneous reservoir and permeate concentration of α-lactalbumin as a function of accumulated permeate volume. This volume is that at the end of the time in question determined as the sum of incremental volumes, estimated as the product of recorded flow rate and incremental time. Table 1 shows the correlations from which Series 1 and 2 were made. Here the coefficient and arguments are for correlations of the for $$c_i = \text{Coeff} \cdot [-\text{Arg} \cdot t]$$

$$\text{Arg} = (Q/V)$$

Where "Q" is trans-membrane flow rate and "V" is the total volume of permeate collected over filtration time "t".

TABLE 1

Summary of α-lactalbumin Correlations

| Run | Reservoir Coeff. | Arg min$^{-1}$ | $\hat{R}^2$ | Permeate Coeff. | Arg min$^{-1}$ | $\hat{R}^2$ |
|---|---|---|---|---|---|---|
| 1 | — | — | — | 0.373 | −0.1271 | 0.9452 |
| 2 | 0.561 | −0.036 | 0.461 | 0.128 | −0.0942 | 0.961 |
| 3 | — | — | — | 0.0551 | −0.1248 | 0.9705 |
| 4 | 0.472 | −0.0494 | 0.9683 | 0.0438 | −0.154 | 0.982 |
| 5 | 0.5104 | −0.1326 | 0.9876 | 0.1447 | −0.2091 | 0.9961 |
| 6 | 0.4677 | −0.2214 | 0.9951 | 0.2025 | −0.2616 | 0.9971 |
| 7 | 0.4331 | −0.3655 | 0.9692 | 0.1952 | −0.2456 | 0.9938 |
| 8 | 0.5409 | −0.1346 | 0.9914 | 0.1549 | −0.1984 | 0.9869 |
| 9 | 0.5116 | −0.1296 | 0.9658 | 0.1603 | −0.1755 | 0.9887 |
| 10 | 0.5251 | −0.1234 | 0.9850 | 0.0966 | −0.1297 | 0.9629 |

It is important to note that in the great majority of analyses the concentrations dropped exponentially with accumulated permeate volume, as predicted by the above analysis.

A similar analysis was not possible for the β-lactoglobulin as the measurements of concentration were subject to considerable random error: concentrations used were too low compared with the sources of random error. Averages over the various time periods were used instead. The average value over all runs was 0.023.

It may be seen that these results are not significantly different from those of the batch runs shown in FIGS. 22 and 23, and once again sieving coefficients increase slowly with trans-membrane solvent flux.

Discussion

The most important result is the pronounced effect of solvent replacement to increase global separation factors relative to the local values. The inventors first illustrate this point by showing the progressive increase of global separation factors with extent of solvent replacement. They next describe the behavior of a three-stage cascade for fractionating mixtures of the whey proteins α-lactalbumin and β-lactoglobulin. They then show in this representative situation that solvent replacement effectively doubles the stage separation factor relative to local values and that insensitivity to local values makes it quite easy to predict the degree of improvement obtained. They then consider means to obtain a satisfactory design to provide reasonably uniform solvent replacement with presently available technology. Three three specific examples are now considered.

1: The Effect of Solute Depletion on Global Separation Factors

Here the inventors examine the effects of solute depletion for a diafilter that just replaces solvent lost across the membrane at all points, and they start with the equation developed above:

$$\Phi_{A,glob} = e^{(S_A - S_B)\tau}$$

and we consider three specific examples. These correspond to local separation factors, $\Phi_{A,loc}$, of 10, 20 and 40 respectively. The results of calculation are shown graphically in FIG. 13 as $\Phi_{A,glob}/\Phi_{A,loc}$ vs. the fraction of entering species, "A", that has permeated the membrane. They show that the effect of solute depletion, the well known cross-flow effect, is substantial as expected. They also show that the magnitude of $\Phi_{A,glob}/\Phi_{A,loc}$ is only very slightly dependent upon the magnitude of $\Phi_{A,loc}$. In fact considering the scatter of sieving coefficient data seen to date, the effect is negligible over the wide range shown in the figure. This greatly simplifies separator design.

2: Whey Cascades

Figure 28:
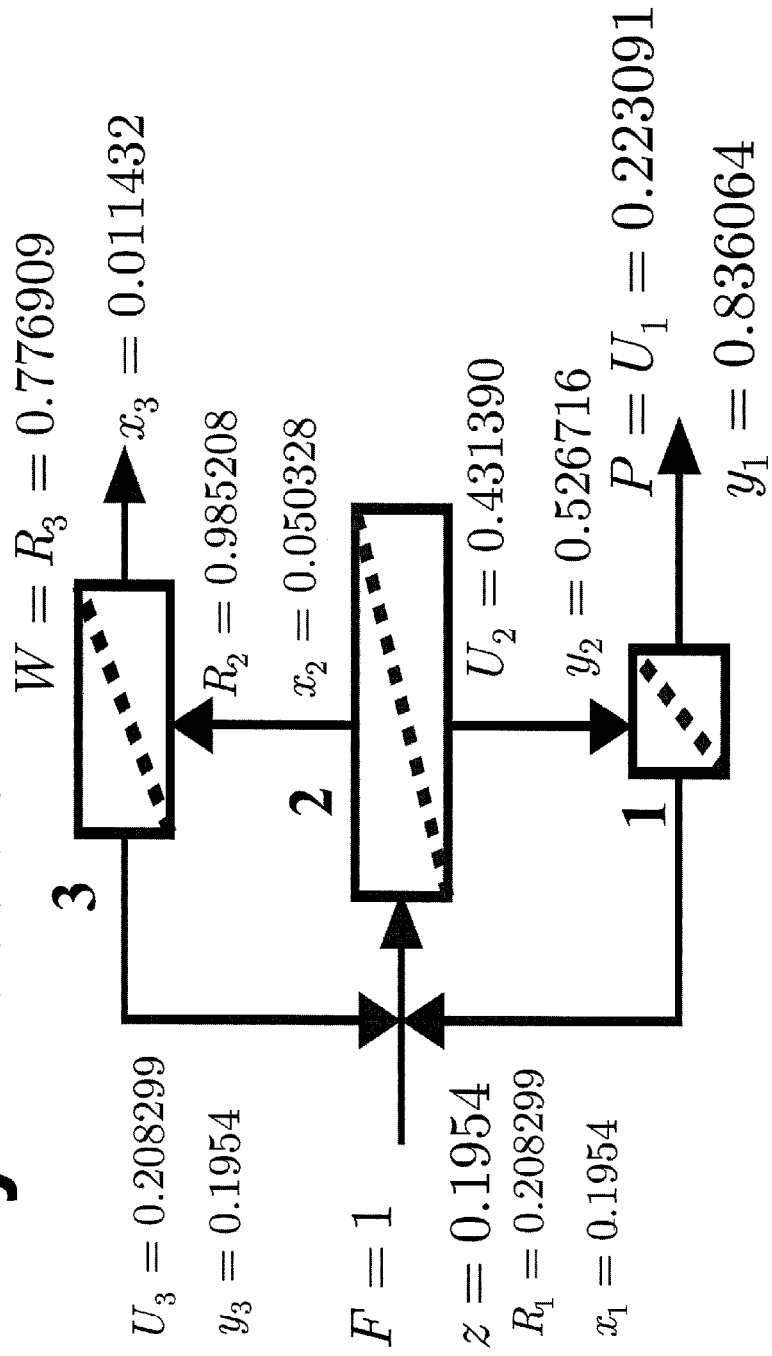
FIG. 28 provides a schematic of a whey cascade with related calculations.

The inventors now build upon the above example by revisiting the fractionation of α-lactalbumin/β-lactoglobulin separation described in FIG. 28. They begin by calculating mole ratios and mole fractions of the device shown, assuming a global separation factor $\Phi_{A,glob}$ of 21 and a feed mole fraction of α-lactalbumin of 0.1954 with the reminder β-lactoglobulin. They thus build directly on data and analyses reported previously and proceed as follows:

$$X_1 = Y_3 = Z = 0.1954/0.8046 = 0.242854 \text{ GIVEN}$$

$$x_1 = y_3 = z = 0.1954$$

$$Y_1 = \Phi X_1 = 21 \cdot 0.242854 = 5.09994$$

$$y_1 = Y_1/(1 + Y_1) = 0.836064$$

$$X_3 = Y_3/\Phi = 0.242854/21 = 0.011564$$

$$x_3 = X_3/(1 + X_3) = 0.011432$$

$$X_2 = X_3 \cdot \sqrt{\Phi} = 0.011564 \cdot 4.582576 = 0.052993$$

$$x_2 = X_2/(1 + X_2) = 0.050328$$

$$Y_2 = Y_3 \cdot \sqrt{\Phi} = 0.242854 \cdot 4.582576 = 1.112897$$

$$= \Phi X_2 = 1.112853$$

$$= Y_1/\sqrt{\Phi} = 1.112898$$

$$y_2 = Y_2/(1 + Y_2) = 0.526716$$

The inventors keep this large number of digits to facilitate comparisons by the reader and to show that the cascade is truly ideal.

Next they recalculate the mole balances, and begin with the overall balances:

$$F = P + W; zF = y_1 P + x_3 W$$

$$W = P\left[\frac{y_1 - z}{z - x_3}\right] = P\left[\frac{0.836064 - 0.1954}{0.1954 - 0.011432}\right]$$

$$= \left[\frac{0.640664}{0.183968}\right]$$

$$= 3.482475P$$

$$P = 0.223091; W = 0.776909$$

We next make balances about stage 1:

$$U_2 = P + R_1; 0.526716 U_2 = 0.836064P + 0.1954 R_1$$

$$R_1 = \left[\frac{0.836064 - 0.526716}{0.526716 - 0.1954}\right]$$

$$P = \frac{0.309348}{0.331316} \cdot 0.223091 = 0.208299$$

$$U_2 = P + R_1 = 0.208299 + 0.223091 = 0.431390$$

and stage 3:

$$R_2 = U_3 + W; x_2 R_2 = y_3 U_3 + x_3 W = x_2(U_3 + W)$$

$$U_3 = W\left[\frac{x_2 - x_3}{y_3 - x_2}\right]$$

$$= 0.776909\left[\frac{0.050326 - 0.011432}{0.1954 - 0.050326}\right]$$

$$= 0.208299$$

$$R_2 = 0.208287 + 0.776909 = 0.985208$$

This completes the mole balances for the system, and it only remains to determine the fraction of α-lactalbumin $f_i$ permeating each stage "i":

$$f_1 = f_2 = f_3 = 0.820871$$

The identity of these fractions for the three stages is one of the simplifying features of ideal cascades, and here the large number of digits carried emphasizes this point.

Figure 27:
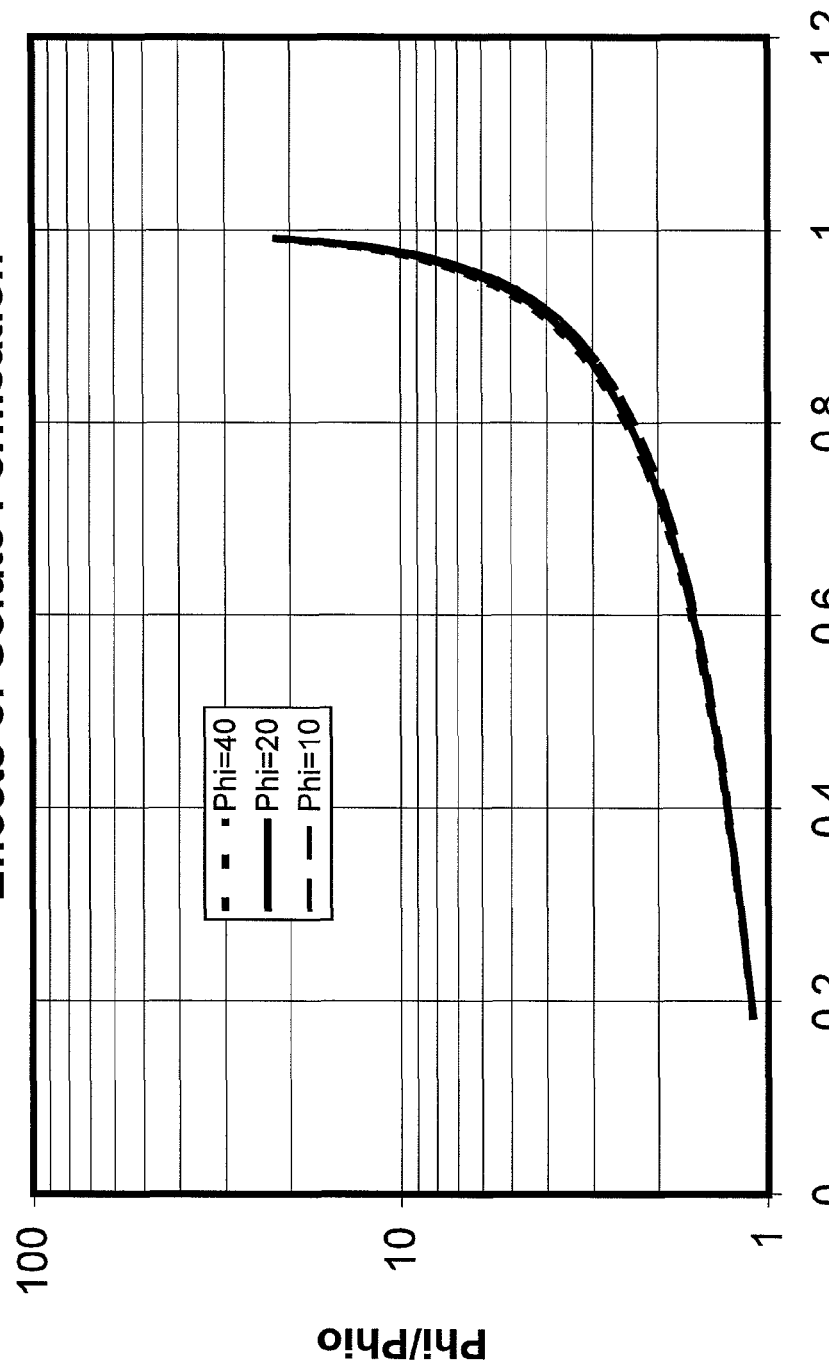
FIG. 27 illustrates the insensitivity of global separation factors to local values.

It is now a simple matter to determine the local separation factors producing this separation from the Ex. 1 and specifically the behavior shown in FIG. 27 summarizes the key results. It may be seen here that $$\Phi_{local} = \Phi_{global}/2.6 = 21/2.6 = 8.1$$

Figure 29:
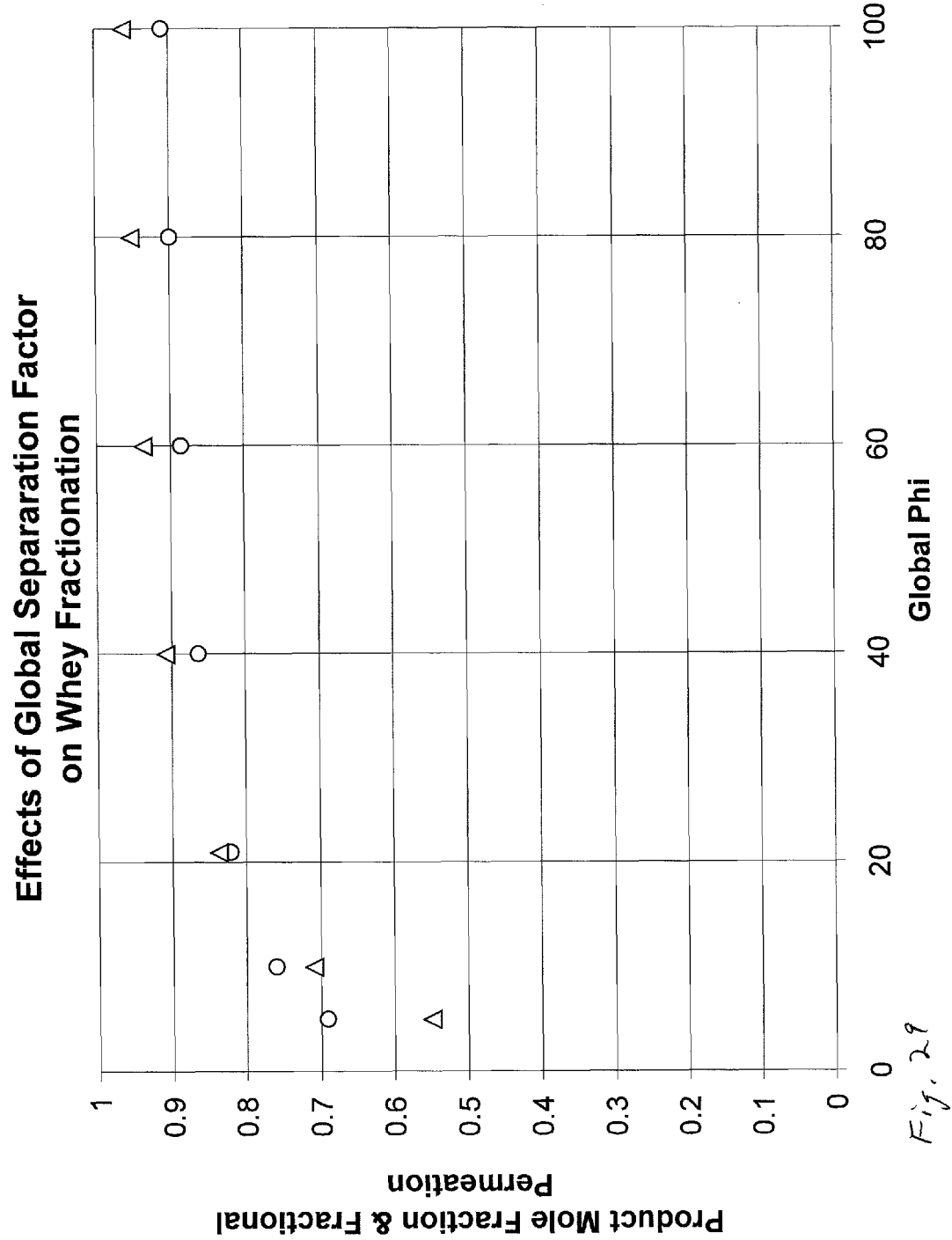
FIG. 29 illustrates the effects of the global separation factor on whey fractionation.

A brief look at the above data shows that the assumption of 21 for the global separation factor is actually conservative. FIG. 27 also shows that the extent of amplification of separation factors produced by solvent replacement is very insensitive to their magnitude. In FIG. 29, it may be seen that both product purity and fractional permeation increase with the global separation factor. The behavior shown here is for the whey protein separation with feed mole fraction, $z$, of 0.1954.

It remains however to implement solvent replacement in a suitable device, and the inventors now turn to this problem.

3. Module Design

The inventors now extend the discussion of solvent management to a clear demonstration of the importance of solvent replacement during diafiltration, and then provide ways to implement this principle in a practical setting.

Figure 30:
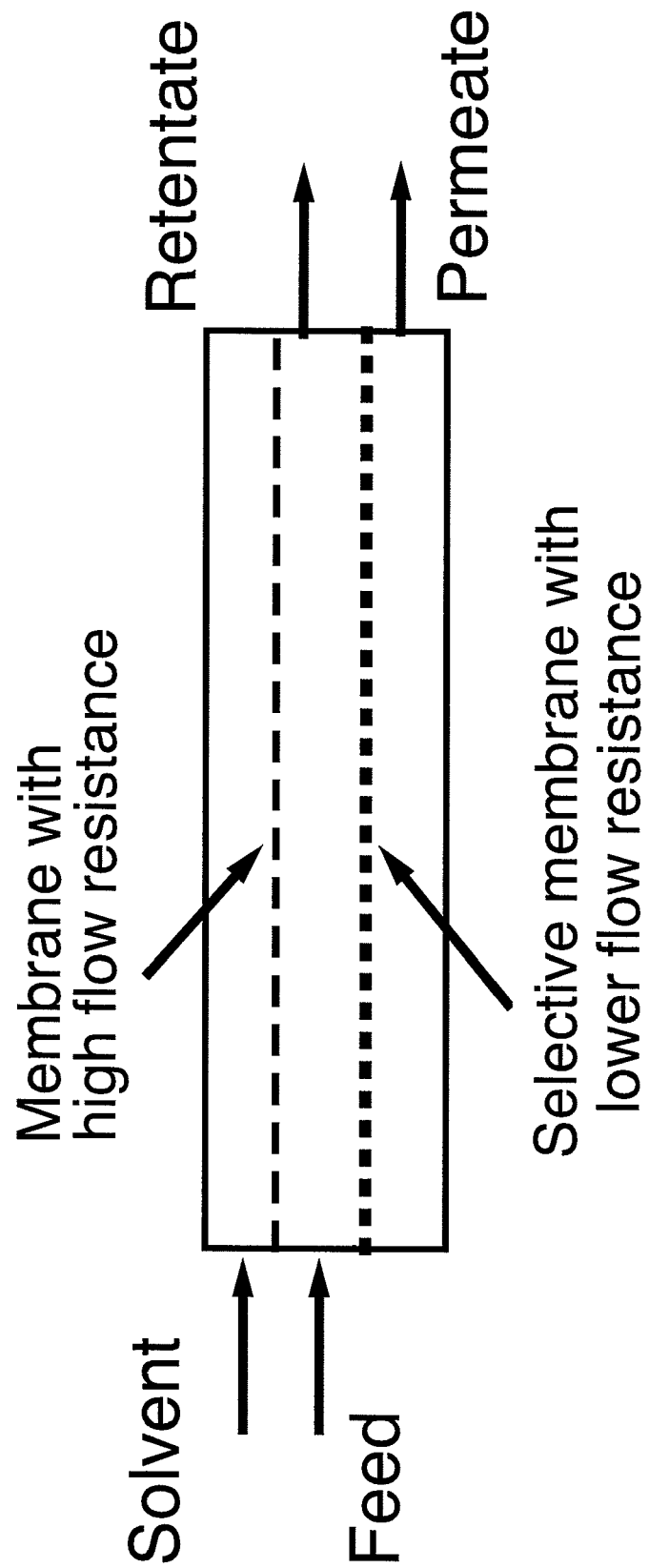
FIG. 30 provides a schematic of a modified diafilter to improve global separation factors.
Figure 31:
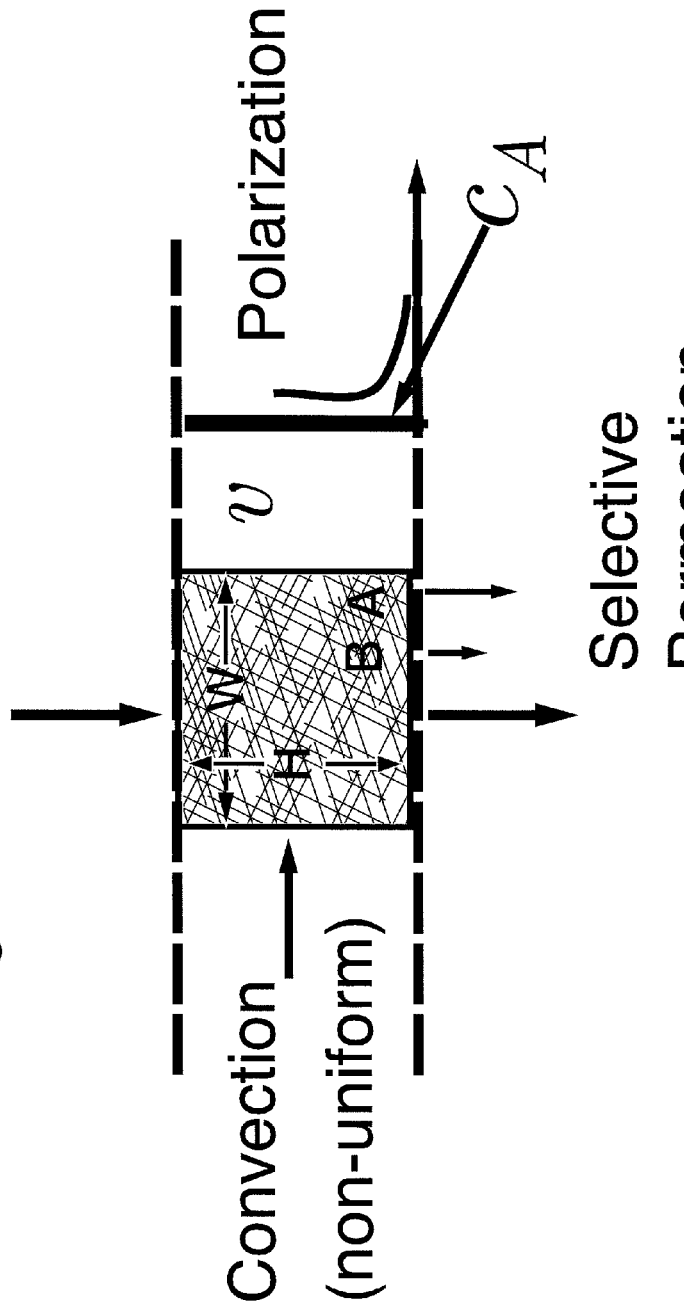
FIG. 31 illustrates the effects of cross-flow sieving.

They begin by noting that the Pellicon filter appears to provide a close approximation of rectilinear flow, and therefore that the addition of one additional channel as suggested in FIGS. 30 and 31 can produce a direct mathematical analog of the transient operation shown in FIG. 24: one need only replaced time by position in the flow direction divided by mean velocity. Such a device would then follow the above theory for solvent replacement reasonably well. One would however, have to consider convective dispersion in the flow direction. In any event, this device, simple conceptually, does not appear to be currently available.

For the immediate future then we must seek alternatives, and there are at least two. For large installations, where multiple filters are be used one can arrange individual; diafilters in series, with solvent addition ahead of each unit. As the number of such units increases system behavior will approximate continuous solvent addition ever more closely.

Figure 32:
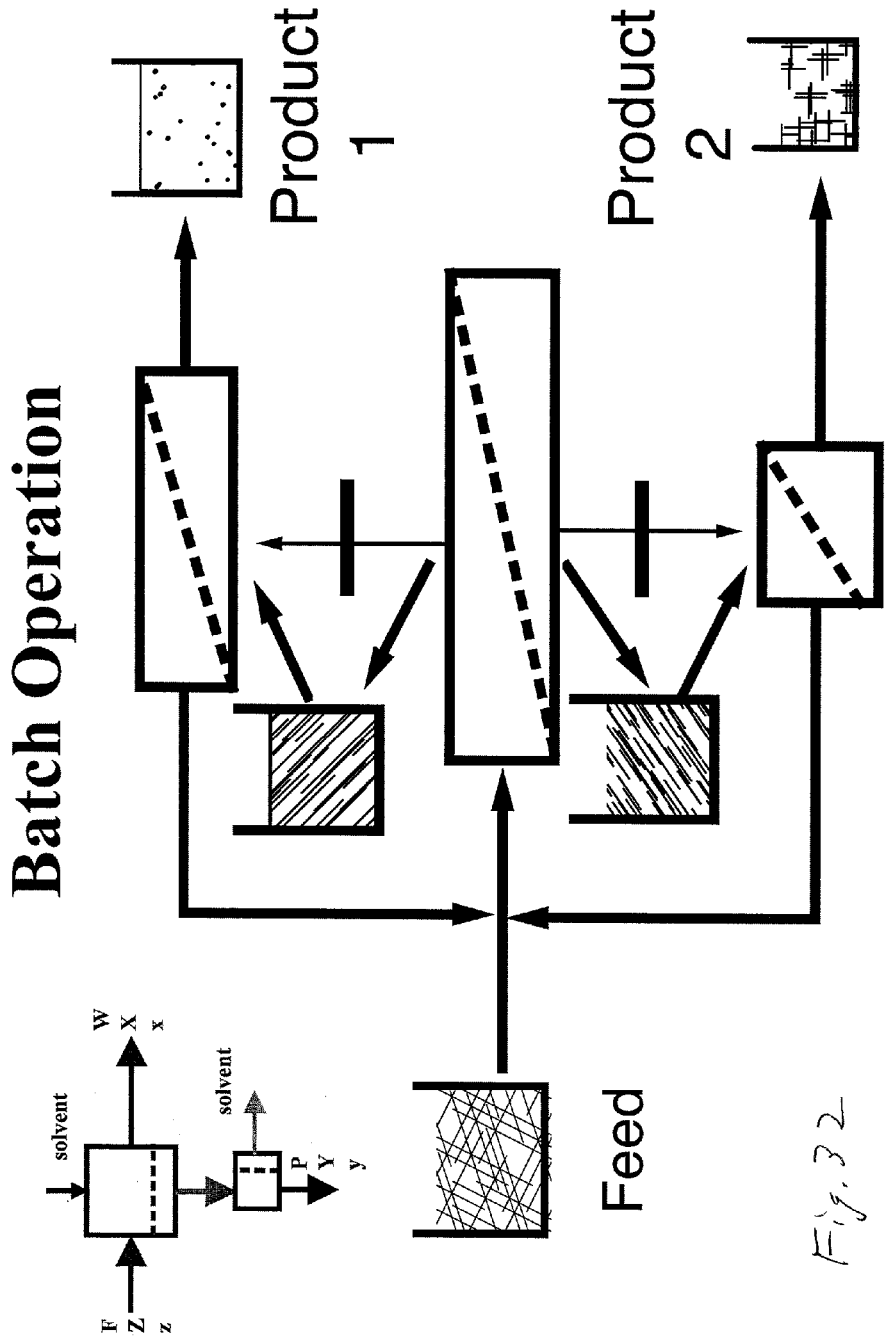
FIG. 32 shows a a Three-stage Batch Cascade according to the invention.
Figure 33:
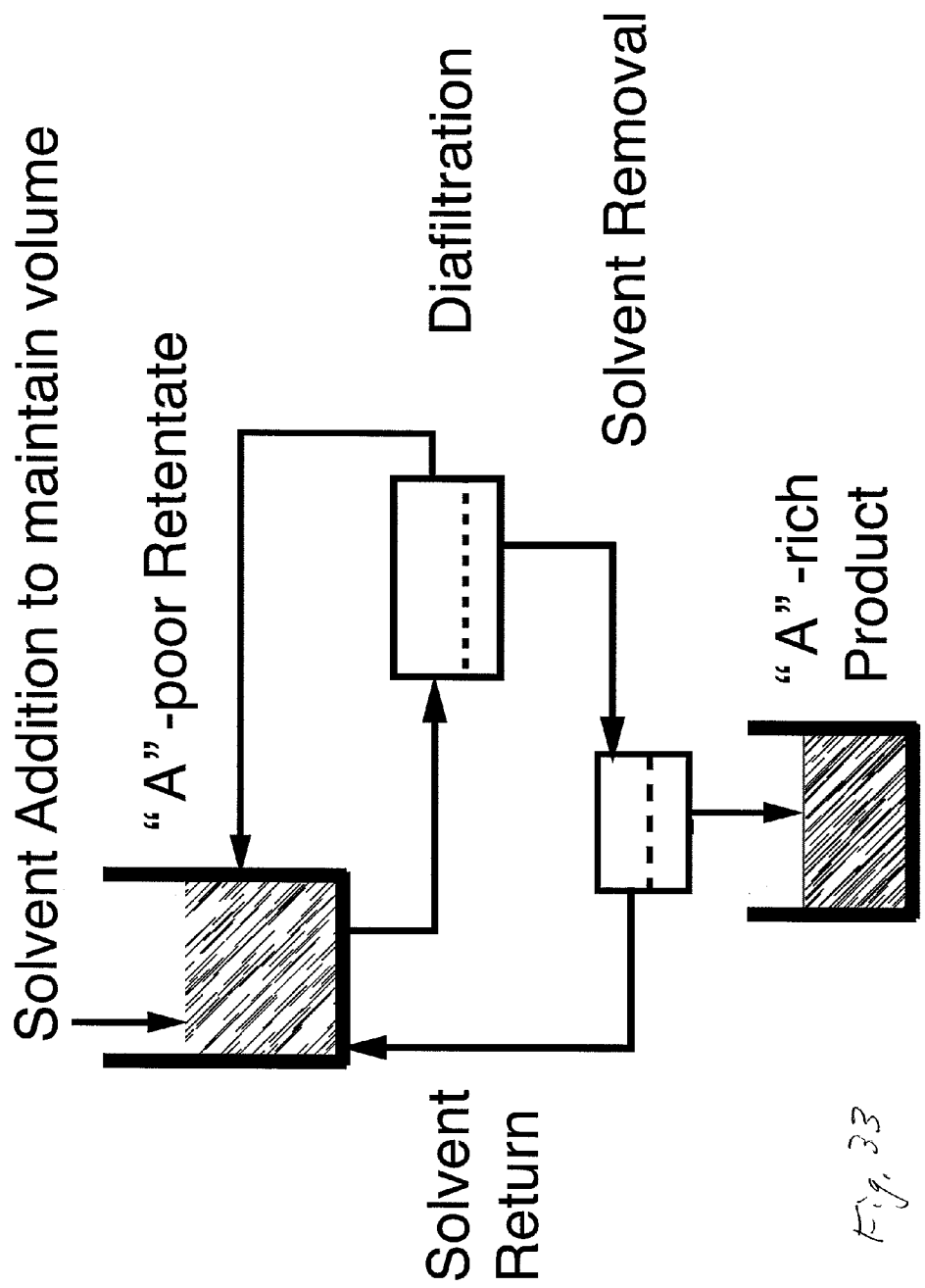
FIG. 33 depicts a proposed Batch Diafiltration for Major Amplification of Global Separation Factors.

However, there is one very attractive possibility for the batch operations most widely used to date and as shown in FIG. 32. One can then use the same batch system used in this program, modified only to recycle solvent. The result, sketched in FIG. 33 is even more flexible than that that used in this study as one can add additional solvent as suggested in the figure. One can then maintain optimum solute concentration throughout, and, potentially more important, obtain an additional cross-flow effect in the diafilter shown. This latter possibility could significantly increase effective selectivity even further. The effective separation factor is estimated to be on the order of 8.1 squared or about 65.

Conclusion

The above described experimental data and transport modeling show both the benefits of continuous solvent addition during diafiltration and simple means for achieving this type of operation. These benefits are expressed by showing that global stage separation factors are significantly higher than local values and that the degree of improvement increases with the magnitudes of the local values. Combining batch operation of the type suggested in FIG. 33 can increase separations factors by more than an order of magnitude.

The simplicity of achieving this benefit in batch processing is particularly important for the short term as at present continuous processing is rare if achieved at all. Adapting existing designs for continuous solvent addition will require a non-trivial redesign of existing diafilters, but no great difficulties are anticipated. The additional membrane need not have any selectivity, but it will be important that the pressures in the solvent compartment are always higher than in the retentate space, and it will be highly desirable that the pressure drops across this new membrane not vary widely.

The only limitations to equipment productivity are provided by concentration polarization and the mechanical strength of the membrane supports and housing. The data presented here show no major effects of trans-membrane flux over four orders of magnitude, and there is no indication that we have been approaching any practical limit. This and the essential simplicity of the basic designs suggest that membrane cascades should be formidable competitors to both chromatographic processes and simulated moving beds.

Membrane cascades are particularly attractive where stage separation factors are large, and there are many such applications already of commercial interest. The whey protein separation used here is a good example for low-cost biologicals, and there are at least two promising examples among the therapeutic proteins: multimers and degradation products.

Membrane filters have already been shown effective for resolution of enantiomers through reversible complexing of one component with a non-permeating additive, and this principle can certainly be extended—perhaps even to such larges-scale applications as the fructose-glucose fractionation. Here colloidal adsorbents might replace soluble additives.

Example 6

Improved Batch Diafiltration

Figure 34:
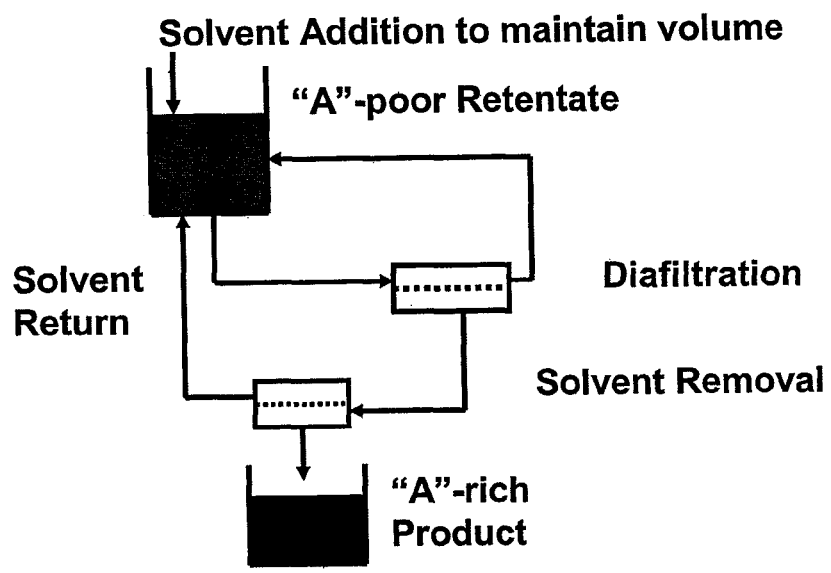
FIG. 34 illustrates a Batch Operation according to the invention.

In this example, the contents of a feed reservoir are diafiltered via an external membrane filter selective for one of two solutes to be separated. The retentate is returned to the reservoir, and the permeate is pumped through second filter which is permeable only to solvent. The retentate from this second filter is removed as product, and the recovered solvent is returned to the reservoir. Additional solvent is fed to the reservoir as needed to maintain reservoir volume approximately constant. FIG. 34 illustrates the above-described device.

The combination of reservoir and a conventional diafilter is equivalent to a diafiltration with continuous solvent addition. As operation proceeds the global separation factor increases steadily from an initial value equal to the separation factor of the diafilter in accordance with the theory in Example 5.

In the simplest embodiment of this design, the diafilter is conventional in the sense that no solvent is added except through the feed stream. Here, the increase in global separation factor will increase indefinitely as the fraction of desired solute in the permeate is increased, and the extent of the improvement depends upon the mass balances for the cascade as a whole. For the whey protein separation of the example in our manuscript the global separation factor was more than twice the local value.

Further improvement of the separation can be obtained by using a diafilter with continuous solvent replacement. It will then have a global separation factor greater than the local values, and this enhanced separation factor will be the local value for the combined unit.

The global separation factor for this system is expected to be better than the square of the improvement obtained with a conventional diafilter. One could then expect something well in excess of 40 compared to the local value of 10 assumed for the whey protein example.

Example 7

Electro-Diafiltration

A membrane cascade can be comprised of two or more stages that utilize electro-diffusion in place of solvent drag to produce selective transport. Electro-diffusion can be used in place of solvent drag to produce selective transport if at least one of the solutes carries an electric charge, and again there are at least two ways this motive force can be used: either to replace solvent drag or to enhance it. Here one can define a sieving coefficient analogous to that for selective filtration, and the formal description of a cascade differs little from that the pressure operated system. There will now be no solvent management problem, but both electrode reactions and continuity of current must be considered. In the simplest case one can produce a field across a simple two compartment diafilter, but this is unlikely to be economic.

In one embodiment, an electro-diafiltration device as shown in FIG. 35 is provided that utilizes a multi-layer cross flow design. Here it will be important to make the layer continued until approximately 10 times the feed volume had been collected as permeate. Table 2 provides a summary of data collected in this experiment.

TABLE 2

| Run | Whey Protein Isolate | βLacto-globulin g/L | αLactal-bumin g/L | TMP | Feed mL | Buffer During Filtration mL | Avg Flux L/m² hr | SA C ratio | Phi loc |
|---|---|---|---|---|---|---|---|---|---|
| A |  | 3.007 | 0.696 | 20.5 | 100 | 990.4 | 154.6 | 0.17 | 8.7 |
| B |  | 3 | 0.7 | 21.5 | 100 | 971.8 | 194.8 | 0.39 | 17.6 |
| C | 3.803 |  |  | 21 | 100 | 956.9 | 106.4 | 0.05 | 10.4 |

"downstream from the permeate compartment impermeable to solutes of interest but permeable to those carrying the current. The exemplary electro-diafiltration device 46 shown in FIG. 35 includes: (a) a feed 48; (b) a retentate compartment 50; (c) a permeate compartment 52; (d) a selectively permeable membrane 54 positioned between retentate compartment 50 and permeate compartment 52; and (e) a retentate/permeate channel pair 56 positioned opposite selectively permeable membrane 54. Retentate/permeate channel pair 56 is capable of generating an electric field perpendicular to a flow direction of a filtrate flow directed through selectively permeable membrane 54 and the retentate/permeate channel pair 56 selectively reinforces or hinders convection induced solute migration through selectively permeable membrane 54. In practice, a plurality of retentate/permeate channel pairs 56 are positioned opposite a plurality of selectively permeable membranes 54 to form an alternating stack configuration. In an alternate embodiment, the stack is wound into a spiral geometry and the electric current is provided by a radial current flow.

Example 8

True Moving Bed Fractionation

The invention as described herein may further be modified by routine experimentation to utilize a suspension of colloidal, nano- or micro-particles added to the feed stream that preferentially interact with one of the two solutes to be separated. This provides what may be called a true moving bed (TMB) fractionation. This is considered a simpler and more advantageous alternative to the simulated moving beds of current technology.

The ideal cascade constraint now becomes more complex, but in many situations one can probably consider the retentate fluids to be in equilibrium with the particulate phase. One may then operate the fractionation by mixing streams only of the same solute ratios and maintain near constant total solute concentration.

Example 9

Batch Diafiltration of β-Lactoglobulin, and α-Lactalbumin 100 g of protein solution consisting of either pure β-Lactoglobulin, α-Lactalbumin and sodium phosphate buffer or whey protein isolate and buffer was filtered at constant transmembrane pressure through a tangential flow filter with surface area of 50 square cm. Permeate enriched in A was collected. Solvent (buffer) was added to the feed tank at the same rate as the permeate was collected. Retentate was returned to the feed tank enriched in component B. Solvent addition

Example 10

Batch Diafiltration

Finite Element Calculation

A. Background

An improved batch diafiltration system was described in previous examples, and an exemplary embodiment of such is shown in FIG. 34. In such an embodiment, the contents of a feed reservoir are diafiltered via an external membrane filter selective for one of the two solutes to be separated. The retentate is returned to the reservoir and the permeate is pumped to a second filter which is permeable only to solvent. Additional solvent is fed to the reservoir to maintain volume approximately constant. The combination of reservoir and a conventional diafilter is equivalent to a DF with continuous solvent addition. In certain cases, no solvent is added except that in the feed. The global separation factor ("GSF") will then increase indefinitely as the fraction of the desired solute in the permeate is increased. As described herein, further improvement may be obtained by solvent replacement.

In certain embodiments, the second filter (the UF filter) in the improved batch diafiltration can be readily replaced with alternate units to recover solvent such as evaporation, freeze concentration or absorption.

B. Calculations

In this example, finite element calculation is used to calculate the global separation factor (GSF) for multicomponent systems in specific cases studies. In an initial example of this methodology, a batch run was divided into 960 equal time increments with fluxes and mass balances calculated at each time increment. Different operating strategies may be used, such as constant reservoir volume, constant solvent addition rate, constant concentration of a selected solute in the retentate, etc, and the separation factors compared. The presently analyzed multicomponent system consisted of glucose, maltose, maltotriose, NaCL and water. For initial calculations, constant values were assumed for the following parameters, however it should be noted the method allows these values to vary with time, concentration, or other factors. The diafiltration membrane was assumed to have a constant water flux of 120 liter per square-meter per hour. The sieving factors for the four solutes are assumed to be constant and to have the following values

| glucose | 0.60 | Solute A, goal to move to permeate |
| maltose | 0.10 | Solute B, goal to move to retentate |
| maltotriose | 0.02 | Mainly in Retentate |
| sodium chloride | 0.95 | Mainly in Permeate |

Molar flux of any solute is calculated as Ni=Ci Si v
Ci is defined as mol/liter solvent Batch Example 1 and Comparative Batch Example 2 are now described. A reservoir initial volume of 18038 liters of water was assumed. To this was added 10 kg-moles each of glucose, maltose, and maltotriose, as well as 1 kg-mol of NaCl. In example batch-1 the feed was diafiltered in the system of the improved batch diafiltration as described in Example 5. That is, sufficient water or solvent was returned to the reservoir at each time step (either from a UF unit, an evaporation unit, or as fresh water), such that the volume of solvent in the reservoir remained constant.

FIG. 36 illustrates the results obtained as diamonds. In comparative example batch-2 the feed was diafiltered in a system with a different operating strategy. The strategy was that of adding a small amount of water to the reservoir at each time increment sufficient to maintain the concentration of maltose constant. FIG. 36 show these results as squares.

In certain batch cases, different membrane areas were considered. In both examples and all cases, run time was 8 hours. For example 1, ten different cases were calculated. These cases had different membrane areas, varying between 0.39 $m^2$ and 400 $m^2$. The larger areas give more flow of solvent into the permeate and hence also more flow of solutes into the permeate. Hence the larger areas required greater volumes of diafiltration water to be added. For the 100 $m^2$ area, a total of 96,000 liters of water was added as diafiltration reservoir makeup to maintain volume. For example 2, seven different cases were calculated. These cases had different membrane areas, varying between 3.15 $m^2$ and 150 $m^2$. A portion of the diafiltration water was replaced. For the 100 $m^2$ area case, a total of 86,400 liters of water was added as diafiltration reservoir makeup to maintain constant maltose concentration in the reservoir.

As illustrated in FIG. 36, the yield—purity tradeoff is unaffected. The retentate side tradeoff is that, in diafiltration, increasing the extent of diafiltration will tend to decrease the yield of the more retained solute (maltose here) in the retentate reservoir, but increase the purity in the reservoir as more of the permeable solute, glucose, is washed out. the permeate side tradeoff: is that, in diafiltration, increasing the extent of diafiltration will tend to increase the yield of the more permeable solute (maltose here) in the permeate pool, but decrease the purity in the permeate pool as more of the less permeable solute, maltose, is washed into the permeate. Example 1 and Example 2 show no difference in this tradeoff, as shown in FIG. 36.

Figure 37:
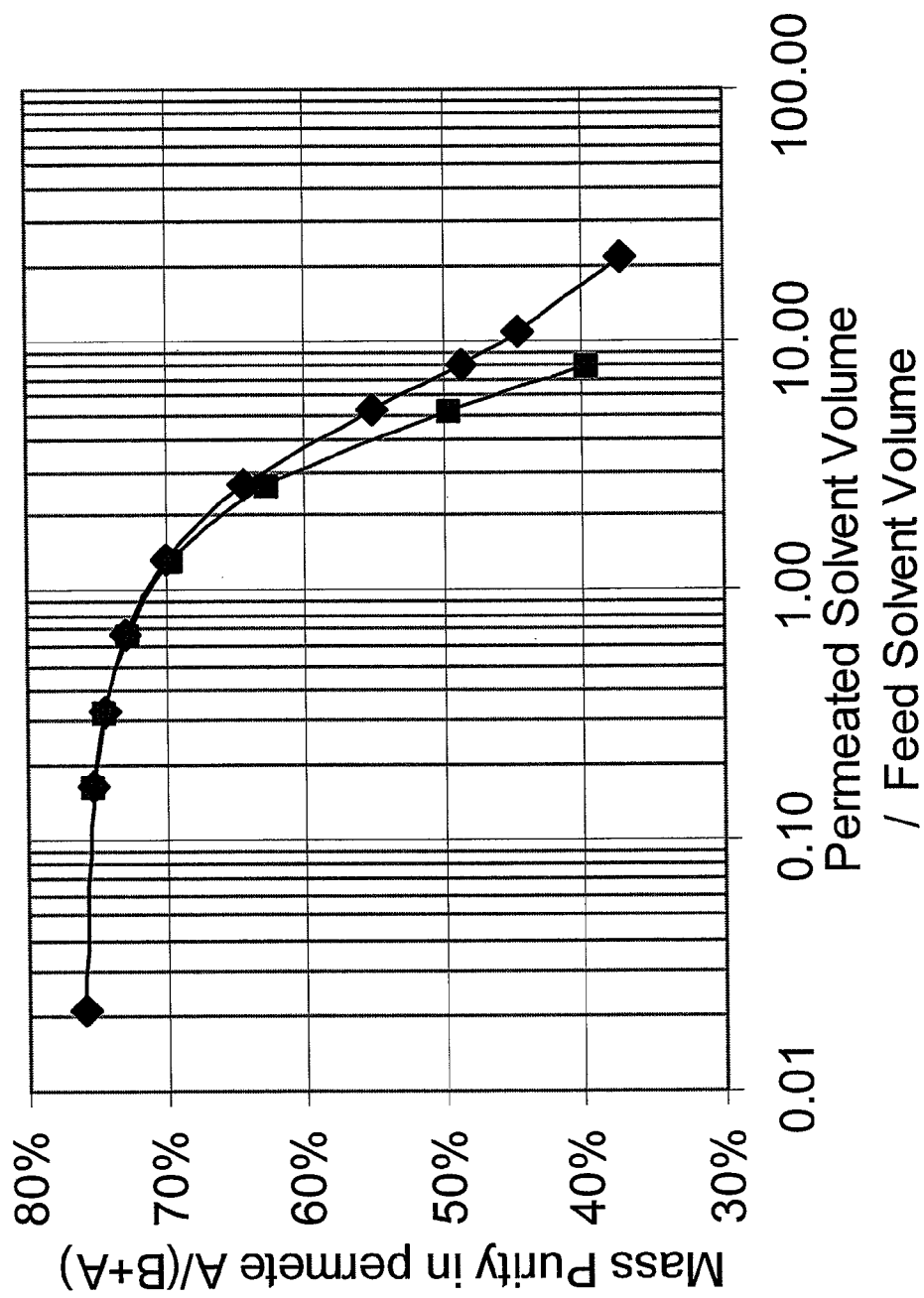
FIG. 37 illustrates that a constant volume reservoir gives better permeate purity of A than constant maltose concentration; however, note that the yield for constant volume case is less.

FIG. 37 illustrates that Constant Volume Reservoir (diamonds) gives better permeate purity of A than constant maltose concentration (red); however yield for the constant volume case is less.

Figure 38:
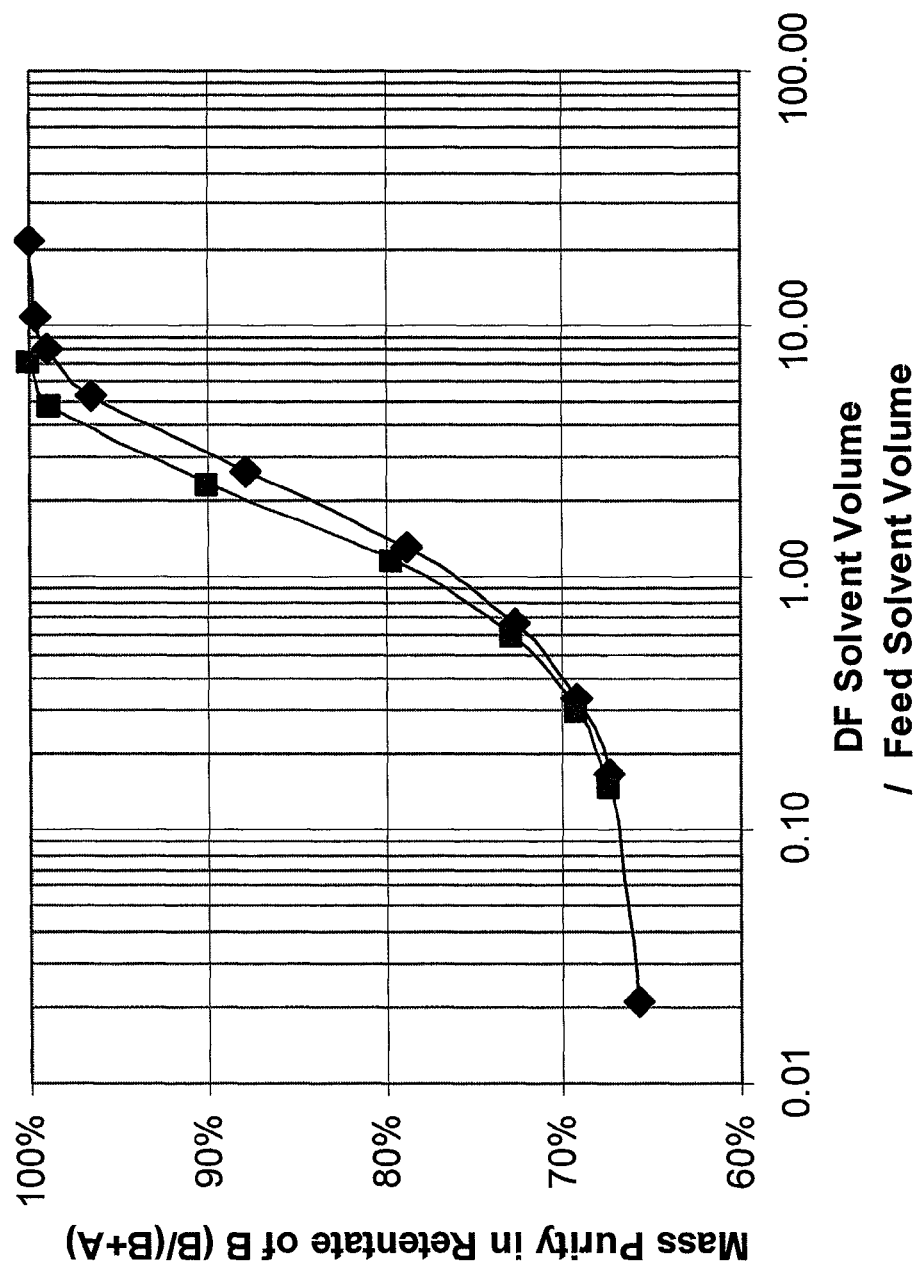
FIG. 38 provides data showing that constant maltose concentration gives better retentate purity of B (maltose) than constant volume reservoir; however, yield for the constant maltose concentration case is less.

FIG. 38 conveys that Constant maltose concentration (squares) gives better retentate purity of B (maltose) than Constant Volume Reservoir (diamonds); however yield for the constant maltose concentration case is less. (refer to slide 14)

C. Conclusions

Constant volume in the reservoir gives different performance from constant maltose concentration in the reservoir, for a given amount of solvent permeation. (Solvent permeation is determined by membrane area, solvent flux, and time).

For constant volume in the reservoir (as compared to constant B concentration), for any given solvent permeation extent: (a) permeate purity of A is greater; (b) yield of A in the permeate is less; (c) retentate purity of B is lower; (d) yield of B in the retentate is more. Accordingly, constant volume in reservoir gives better A purity in the permeate for a given membrane area. This conclusion is in line with the calculations and experimental data of Examples 5 and 9 for whey proteins.

Example 11

Iterative Numerical Computational Method for a Multicomponent Multistage Separation System where Each Stage Contains a Selectively Permeable Membrane This example describes the iterative numerical computational method and applies this methodology to: a single pass per stage, Ideal cascade (A') versus a single pass per stage, Non-ideal cascade (A); and a High Recirculation inside stage, Ideal cascade (B') versus a High Recirculation inside stage, Non-ideal cascade (B').

A. Calculation Overview

Step 1 involves the preparing calculation methods for each individual stage. Each stage may be single pass cross flow or recirculation around the stage. In certain cases, recirculation case may be simplified to limiting case of large recirculation rates. The solute flow is defined by equations provided in Example 5 above. Accordingly, solvent flow is related to flux and area. Solvent flux in turn is related to membrane choice, system history and cleaning, applied pressure, factors related to solutes, concentration, temperature, crossflow recirculation rate, and buffer levels.

Step 2 is then links stage flows, solute feeds, solvent feeds, product streams and interstage recycles to form a cascade system.

Step 3 involves setting conditions for the test.

Step 4 is the generation of an initial condition from an open loop model without recycles connected.

Step 5 is converging recycle flows from the initial condition.

Step 6 is the examination of output to see if cascade is non-ideal or ideal. In practice, the results here will almost always be non-ideal from initial conditions. Non-ideal results represent counter examples showing large number of possible choices that do not meet operating conditions. The ease of generating non-ideal results and the difficulty in generating ideal results indicates the unobviousness of the invention.

Step 7 involves adjusting one or more conditions from a selected set of parameters for the cascade. The adjustment may be based on a search convergence strategy or may be heuristic or otherwise defined for varying the parameters. Parameters chosen in 3-stage examples that follow are to vary the area of each membrane unit in the cascade and also solvent makeup to each stage. One stage area is fixed to define overall mass balance.

Step 8 then converges recycle flows for the multistage cascade from adjusted conditions and, finally, step 9 calls for repeating Steps 6-8 until cascade is ideal or near ideal.

In terms of calculations for each individual stage, each stage may be either single pass cross flow, or recirculation. For single pass cross flow stage, the stage is divided into equal increments for calculation. Using the equations provided above, solute transport at each increment is determined. A mass balance is then performed across each increment. The results from the prior increment is used as input for the next increment. The number of increments should be sufficient to give approximation to plug flow passage over membrane element. In the example that follows, the single stage example uses 25 increments. The multistage example uses 8 increments For recirculation stages, limiting case of high recirculation flow, the set of equations is solved for CSTR solvent and solute mass balance to obtain equation describing performance across the entire stage. In this case, the analytical solution means that there are no increments but that the recirculation stage is represented as a single calculation.

Alternatively, a batch recirculation stage example is provided here that utilized calculations based on 1000 increments.

In order to provide exemplary illustrations of the present computational method, the following system parameters were adopted for which steps 1-9 were carried out:

| Component | Identity | Desired Flow |
|---|---|---|
| First Component "B" | glucose | largely permeates |
| Second Component "A" | maltose | largely retained |
| Third Component | water | solvent |
| Additional Component | maltotriose | largely retained |
| Additional Component | NaCl | largely retained |

The following Molar Sieving Factors were used for the above-identified components:

|  | Stage 1 | Stage 2 | Stage 3 |
|---|---|---|---|
| Glucose | 0.900 | 0.900 | 0.900 |
| Maltose | 0.100 | 0.100 | 0.100 |
| Maltotriose | 0.020 | 0.020 | 0.020 |
| NaCl | 0.990 | 0.990 | 0.990 |

Feed parameters for Examples A, A' and B, B' were, respectively:

| Water | 100 | g-mol/second |
|---|---|---|
| Glucose | 10 | g-mol/second |
| Maltose | 10 | g-mol/second |
| Maltotriose | 10 | g-mol/second |
| NaCl | 1 | g-mol/second |
| Water | 28.623 | US gallon/minute |
| Glucose | 14,286 | lb/hr |
| Maltose | 27,143 | lb/hr |
| Maltotriose | 40,001 | lb/hr |
| NaCl | 460 | lb/hr |

Figure 39:
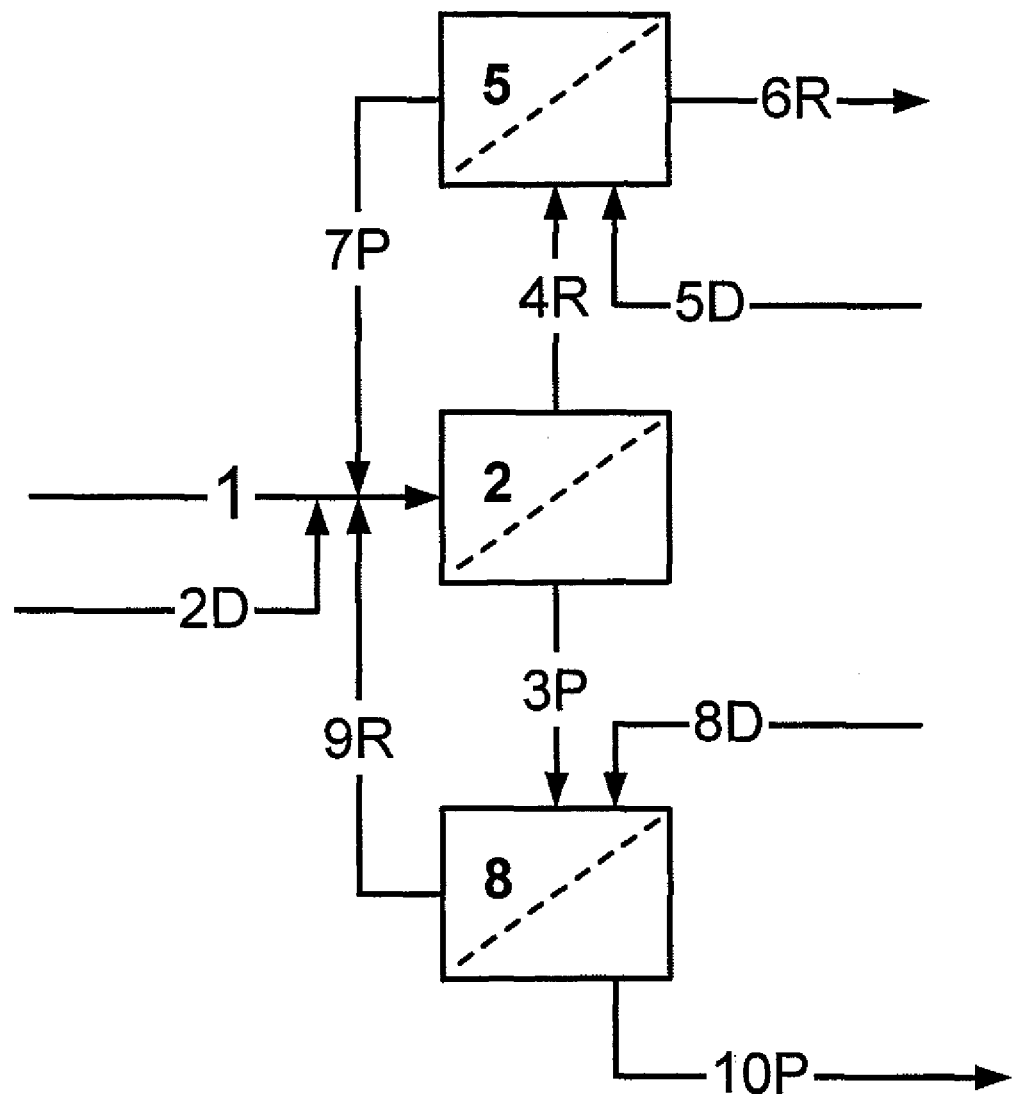
FIG. 39 depicts a theoretical sugar fractionation system according to the invention.

D. Calculations for the a Single Pass Per Stage, Ideal Cascade (A') Versus a Single Pass Per Stage, Non-Ideal Cascade (A)—Three-Stage Systems with Each Stage Containing a Single Pass, Diafilter Membrane Referring now to FIG. 39, the feed stream 1 contained the above described composition of components for the A/A' example. Feed stream 1 was directed to a first membrane-containing separation unit 2. Retentate stream 4R then flowed to second membrane-containing separation unit 5. A product stream 6R was produced at unit 5 and a permeate stream 7P was returned to be intermixed with feed stream 1. Permeate stream 3P produced by unit 2 was directed to a third membrane-containing separation unit 8 which produced a second product stream 10P. A retentate stream 9R was routed back to be intermixed with feed stream 1. The three stages, units 2, 5, and 8, each contain a single diafilter membrane.

A fixed amount of membrane area was provided that could be divided between the three membrane units stages and was sufficient to obtain a total solvent permeation rate of 662 mole/second. This included recycles. A fixed amount of DF water of 182.4 mole/second was provided that could be divided between the three stages. This DF water is applied as streams 2D, 5D, and 8D. Table 3 provides the conditions utilized in this system.

TABLE 3

| | Solvent Flowrate Through Membrane | | | | Solvent Added for Diafiltration | | | |
|---|---|---|---|---|---|---|---|---|
| | Stage | | | | Stage | | | |
| | 1st | 2nd | 3rd | Total | 1st | 2nd | 3rd | Total |
| | Sketch | | | | | | | |
| | Unit 8 mol/s | Unit 2 mol/s | Unit 5 mol/s | mol/s | Unit 8 mol/s | Unit 2 mol/s | Unit 5 mol/s | mol/s |
| 8-1 | 220 | 222 | 220 | 662 | 0.0 | 180.0 | 2.4 | 182.4 |
| 8-2 | 260 | 300 | 102 | 662 | 0.0 | 180.0 | 2.4 | 182.4 |
| 8-3 | 120 | 222 | 320 | 662 | 0.0 | 180.0 | 2.4 | 182.4 |
| 8-4 | 220 | 222 | 220 | 662 | 0.0 | 100.0 | 82.4 | 182.4 |
| 8-5 | 120 | 222 | 320 | 662 | 0.0 | 100.0 | 82.4 | 182.4 |
| 8-6 | 150 | 362 | 150 | 662 | 0.0 | 100.0 | 82.4 | 182.4 |
| 8-7 | 261 | 300 | 101 | 662 | 0.0 | 100.0 | 82.4 | 182.4 |

The following surface areas applied to the test runs:

| 8-1 | Equal Area | 100% of DF flow to Feed Stage (2nd Stage) |
|---|---|---|
| 8-2 | Bias Stage 1 | 100% of DF flow to Feed Stage (2nd Stage) |
| 8-3 | Bias Stage 3 | 100% of DF flow to Feed Stage (2nd Stage) |
| 8-4 | Equal Area | 100% of DF flow to Feed Stage (2nd Stage) |
| 8-5 | Bias Stage 3 | 40% DF to 3rd stage, 60% DF to 2nd Stage |
| 8-6 | Bias Stage 2 | 40% DF to 3rd stage, 60% DF to 2nd stage |
| 8-7 | Ideal | 40% DF to 3rd stage, 60% DF to 2nd stage |

For the present cascade to be ideal, the ratio of glucose to maltose in the two streams recycled to Stage 2 must be the same, and they must be the same as the feed stream to Stage 2. As shown in Table 4, only case 8-7 meets the ideal cascade criteria here. The value of 1.00 results from the fact that the molar ratio of glucose to maltose in the feed is 1.00. Other feeds will dictate other ratios for an ideal cascade criteria to be met.

TABLE 4

| Molar Ratio of Glucose/Maltose | | | |
|---|---|---|---|
| | Stage | | |
| | 1st | 2nd | 3rd |
| | Sketch | | |
| Case | Unit 8 | Unit 2 | Unit 5 |
| 8-1 | 0.40 | 1.000 | 5.508 |
| 8-2 | 1.54 | 1.000 | 2.554 |
| 8-3 | 8.96 | 1.000 | 9.989 |
| 8-4 | 0.34 | 1.000 | 4.34 |
| 8-5 | 8.64 | 1.00 | 9.35 |
| 8-6 | 8.36 | 1.00 | 6.07 |
| 8-7 | 1.00 | 1.00 | 1.00 |

In all cases, the yield of maltose in the retentate is above 96%, as set forth in Table 5 below. Often, economic analysis shows that additional yield above this is of modest incremental value. In all cases, the purity of the glucose permeate stream is greater than 96% molar purity, expressed as glucose/(glucose+maltose). The feed has a purity of 50%. Only in the ideal case is the purity of the maltose high also, near 96%. (and the correlated yield of the glucose is high also only in the ideal case)

TABLE 5

| | Retentate Product | | Permeate Product | |
| --- | --- | --- | --- | --- |
| Case | Maltose Yield | Maltose Purity M/(M + G) | Glucose Yield | Glucose Purity G/(M + G) |
| 8-1 | 98.5% | 77.8% | 71.9% | 97.9% |
| 8-2 | 97.8% | 89.5% | 88.5% | 97.6% |
| 8-3 | 99.7% | 60.5% | 35.0% | 99.2% |
| 8-4 | 98.0% | 81.7% | 78.0% | 97.5% |
| 8-5 | 99.7% | 62.1% | 39.2% | 99.1% |
| 8-6 | 99.4% | 68.0% | 53.3% | 99.0% |
| 8-7 | 96.4% | 95.7% | 95.6% | 96.4% |

As well, an additional benefit of the ideal cascade is illustrated in Table 6 below, specifically in case 8-7; the NaCl is removed from the retentate effectively and most surprisingly. This example illustrates the improved characteristics and advantages provided by an ideal or near ideal cascade for fractionating multi-component systems.

TABLE 6

| | Retentate Solute Molar Flowrates | | | |
| --- | --- | --- | --- | --- |
| Case | Glucose mol/s | Maltose mol/s | Maltotriose mol/s | NaCl mol/s |
| 8-1 | 2.808 | 9.846 | 9.994 | 0.225 |
| 8-2 | 1.150 | 9.779 | 9.992 | 0.081 |
| 8-3 | 6.496 | 9.970 | 9.999 | 0.581 |
| 8-4 | 2.201 | 9.804 | 9.992 | 0.172 |
| 8-5 | 6.080 | 9.965 | 9.999 | 0.537 |
| 8-6 | 4.675 | 9.945 | 9.998 | 0.393 |
| 8-7 | 0.437 | 9.639 | 9.987 | 0.027 |

E. Calculations for the a High Recirculation Inside Stage, Ideal Cascade (B') Versus a High Recirculation Inside Stage, Non-Ideal Cascade (B')—Three-Stage Systems with Each Stage Containing a Single Pass, Diafilter Membrane The parameters of this example are substantially the same as in subsection E. above, but, significantly, differ in that this subsection considers a high recirculation rate around each membrane stage, such that performance of the individual stage retentate side approaches CSTR behavior.

The components and feed rates were identical to those in subsection E. Diafiltration solvent addition rates were:

| Stage 1 | 0 mol/s |
| Stage 2 | 100 mol/s |
| Stage 3 | 62 mol/s |

Stage Solvent Permeate Rates (roughly an equal area cascade) were:

| Stage 1 | 200 mol/s |
| Stage 2 | 235.8 mol/s |
| Stage 3 | 200 mol/s |

A/B molar ratios were:
Feed=1.000
Stage 1 retentate (9R)=1.628
Stage 3 permeate (7P)=2.133

Table 7, below, illustrates the results of a cascade based on the above input. It is apparent that this cascade is not ideal

TABLE 7

| Non Ideal, CSTR | FEED | PERM | RET |
| --- | --- | --- | --- |
| PURITY B/(B + A) | 50.0% | | 80.8% |
| PURITY A/(B + A) | | 93.6% | |
| IMPURITY D/Solutes | 3.2% | 8.8% | 0.9% |
| YIELD OF B | | | 94.7% |

In contrast to the above, a High Recirculation inside stage, Ideal cascade example is now described.

The feed rates and components parameters were as in the preceding example. Diafiltration solvent addition rates were:

| Stage 1 | 0 mol/s |
| Stage 2 | 100 mol/s |
| Stage 3 | 62 mol/s |

Stage Solvent Permeate Rates (roughly an equal area cascade) were:

| Stage 1 | 225.75 mol/s |
| Stage 2 | 305.0 mol/s |
| Stage 3 | 105.0 mol/s |

A/B molar ratios were:
Feed=1.000
Stage 1 retentate (9R)=1.009
Stage 3 permeate (7P)=1.000

Table 8 below summarizes the calculated data for this case and shows that this cascade is ideal. Purity of both the retentate AND the permeate are greater than in the non-ideal case.

TABLE 8

| | FEED | PERM | RET |
| --- | --- | --- | --- |
| PURITY B/(B + A) | 50.0% | | 90.0% |
| PURITY A/(B + A) | | 95.8% | |
| IMPURITY D/Solutes | 3.2% | 8.4% | 0.4% |
| YIELD OF B | | | 90.1% |

Figure 47:
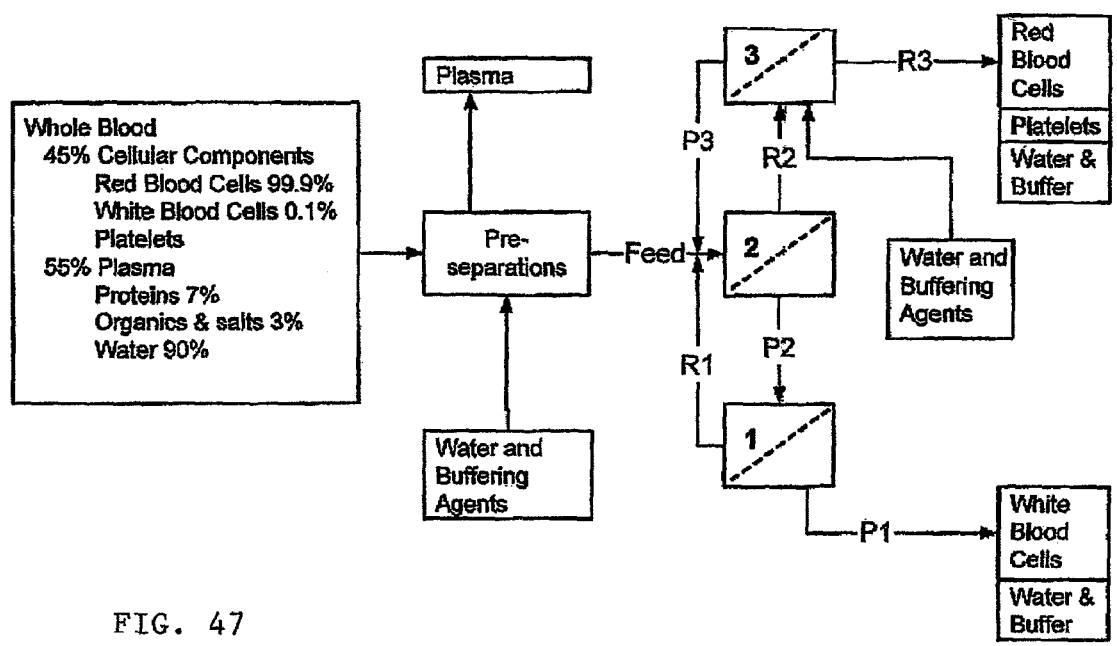
FIG. 47 depicts an exemplary embodiment of the present invention in which three diafiltration units are utilized in the separation of red blood cells from white blood cells.

The system and method described here can be used for separation of different kinds of soluble molecules. Even though the examples described refer to such biomolecules as proteins, one of ordinary skill will know how to use the technology described herein for separation of both biological and non-biological materials, including but not limited to, petrochemicals, stereoisomers (e.g., diastereomers or enantiomers), plasmids, viruses, organelles and whole cells. FIG. 47 illustrates an exemplary application of the present invention to a fractionate blood cellular components, namely, the fractionation of red blood cells and platelets from white blood cells.

Unless defined otherwise, all technical and scientific terms used herein have the same meanings as commonly understood by one of ordinary skill in the art to which this invention belongs. All references cited herein are hereby incorporated by reference in their entirety and for all purposes as if fully set forth herein. It is understood that the invention is not limited to the embodiments set forth herein for illustration, but embraces all such forms thereof as come within the scope of the description provided.

What is claimed is:

1. A multistage cascade separation system using at each stage a membrane-containing separation step that preferentially rejects at least a first species relative to at least a second species while substantially permeating at least a third species which acts as a solvent, the system comprising at least three stages, wherein each stage comprises a housing defining a chamber, a selectively permeable membrane forming at least part of a barrier dividing the chamber into a first and a second compartment, the selectively permeable membrane capable of preferentially rejecting at least the first species relative to the second species while substantially permeating solvent such that the first compartment contains the retentate of the selectively permeable membrane and the second compartment contains the permeate of the selectively permeable membrane, and a feed for accepting a flow stream comprising the first, second and third species in communication with the first compartment, wherein:
   (a) the first stage feed is capable of accepting a flow stream at least partially from a source outside of the system, and the first stage further comprises two conduits, the first conduit capable of carrying the retentate from the first compartment to the feed of the second stage, and the second conduit capable of carrying the permeate from the second compartment of the first stage to the feed of the third stage;
   (b) the second stage further comprises a recirculation conduit capable of carrying the permeate from the second compartment of the second stage to the feed of the first stage, and a product conduit capable of removing retentate from the first compartment from the system; and
   (c) the third stage further comprises a recirculation conduit capable of carrying the retentate from the first compartment to the feed of the first stage, and a product conduit capable of removing permeate from the second compartment from the system.

2. The system according to claim 1 wherein each stage's selectively permeable membrane is independently selected from the group consisting of an ultrafiltration membrane, microfiltration membrane, reverse osmosis membrane, and nanofiltration membrane.

3. The system according to claim 2 wherein the selectively permeable membrane is of polymeric, ceramic, or metal construction.

4. The system according to claim 1 wherein at least one of the stages comprises a selectively permeable membrane that is an ultrafiltration or nanofiltration membrane.

5. The system according to claim 1, wherein one or both of the second and third stages further comprises a solvent recovery unit that is in communication with the second compartment such that it is capable of recovering solvent from the permeate contained in the second compartment.

6. The system according to claim 5 wherein the solvent recovery unit is an ultrafilter membrane or an evaporator in communication with the second compartment of the stage of which it is a part.

7. The system according to claim 1 wherein one or more of the selectively permeable membranes is further capable of selectively rejecting a first group of solutes in addition to the first species.

8. The system according to claim 7, wherein one or more of the selectively permeable membranes is further capable of preferentially permeating a second group of solutes in addition to the second species and the solvent.

9. The system according to claim 1 wherein one or more of the selectively permeable membranes is further capable of preferentially permeating additional solutes in addition to the second species and the solvent.

10. The system according to claim 1 further comprising a fluid flow stream within one or more of the recirculation conduits, wherein all of the fluid flow streams that contain the first and second species that are being fed to any individual stage, whether they are a recycled permeate flow stream from another stage or a recycled retentate flow stream from another stage or fresh feed flow stream, have substantially the same mass ratio of the first species to the second species within that individual flow stream.

11. The system according to claim 10 wherein the fluid flow stream further comprises a liquid micelle.

12. A multi-stage cascade separation system using at each stage a membrane-containing separation step that preferentially rejects at least a first species relative to at least a second species while substantially permeating at least a third species which acts as a solvent, the system comprising two stages, wherein each stage comprises a housing defining a chamber, a selectively permeable membrane forming at least part of a barrier dividing the chamber into a first and a second compartment, the selectively permeable membrane capable of preferentially rejecting at least the first species relative to the second species while substantially permeating solvent such that the first compartment contains the retentate of the selectively permeable membrane and the second compartment contains the permeate of the selectively permeable membrane, and a feed for accepting a flow stream comprising the first, second and third species in communication with the first compartment, wherein:
   (a) the first stage feed is capable of accepting a flow stream at least partially from a source outside of the system, and the first stage further comprises a conduit capable of carrying the permeate from the second compartment of the first stage to the feed of the second stage, and a product conduit capable of removing retentate in the first compartment from the system; and
   (b) the second stage further comprises a recirculation conduit capable of carrying the retentate from the first compartment to the feed of the first stage, and a product conduit capable of removing permeate from the second compartment from the system;
   wherein one or both of the stages further comprises a solvent recovery unit that is in communication with the second compartment such that it is capable of recovering solvent from the permeate contained in the second compartment the recovery unit provided with an exit conduit for the removal solvent.

13. The system according to claim 12 wherein the solvent recovery unit is an ultrafilter membrane or an evaporator in communication with the second compartment of the stage of which it is a part.

14. A multi-stage cascade separation system using at each stage a membrane-containing separation step that preferentially rejects at least a first species relative to at least a second species while substantially permeating at least a third species which acts as a solvent, the system comprising two stages, wherein each stage comprises a housing defining a chamber, a selectively permeable membrane forming at least part of a barrier dividing the chamber into a first and a second compartment, the selectively permeable membrane capable of preferentially rejecting at least the first species relative to the second species while substantially permeating solvent such that the first compartment contains the retentate of the selectively permeable membrane and the second compartment contains the permeate of the selectively permeable membrane, and a feed for accepting a flow stream comprising the first, second and third species in communication with the first compartment, wherein:
(a) the first stage feed is capable of accepting a flow stream at least partially from a source outside of the system, and the first stage further comprises a conduit capable of carrying the retentate from the first compartment to the feed of the second stage, and a product conduit capable of removing permeate from the second compartment from the system; and
(b) the second stage further comprises a recirculation conduit capable of carrying the permeate from the second compartment to the feed of the first stage, and a product conduit capable of removing retentate in the first compartment from the system;

wherein one or both of the stages further comprises a solvent recovery unit that is in communication with the second compartment such that it is capable of recovering solvent from the permeate contained in the second compartment the recovery unit provided with an exit conduit for the removal solvent.

15. The system according to claim 14 wherein the solvent recovery unit is an ultrafilter membrane or an evaporator in communication with the second compartment of the stage of which it is a part.

* * * * *